(12) United States Patent
Kondo et al.

(10) Patent No.: US 6,658,155 B1
(45) Date of Patent: Dec. 2, 2003

(54) ENCODING APPARATUS

(75) Inventors: Tetsujiro Kondo, Tokyo (JP); Naoki Fujiwara, Tokyo (JP); Kenji Takahashi, Kanagawa (JP); Naoki Kobayashi, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/528,493

(22) Filed: Mar. 17, 2000

(30) Foreign Application Priority Data

Mar. 25, 1999 (JP) .......................... P11-080866

(51) Int. Cl.$^7$ .............................. G06K 9/36; G06K 9/32; H04N 7/12; H04N 11/20
(52) U.S. Cl. .................. 382/238; 382/298; 375/240.12; 348/441
(58) Field of Search ................................. 382/238, 232, 382/239, 298, 299, 300, 240; 348/415.1, 409.1, 441; 375/240.12; 386/112

(56) References Cited

U.S. PATENT DOCUMENTS 5,912,708 A * 6/1999 Kondo et al. ............ 348/415.1
6,438,267 B1 * 8/2002 Kondo et al. ................ 382/252

FOREIGN PATENT DOCUMENTS

| EP | 0 820 195 A2 | 1/1998 | ............ H04N/7/26 |
| EP | 0 820 196 A2 | 1/1998 | ............ H04N/7/26 |
| EP | 0 820 197 A2 | 1/1998 | ............ H04N/7/26 |
| EP | 0 820 198 A2 | 1/1998 | ............ H04N/7/26 |
| EP | 0 825 776 A2 | 2/1998 | ............ H04N/7/26 |
| EP | 0 891 101 A1 | 1/1999 | ............ H04N/7/32 |
| EP | 0 892 558 A1 | 1/1999 | ............ H04N/7/32 |

OTHER PUBLICATIONS

U.S. patent application Ser. No. 09/213,460, filed Dec. 17, 1998.

* cited by examiner

Primary Examiner—Wenpeng Chen
(74) Attorney, Agent, or Firm—Bell, Boyd & Lloyd, LLC

(57) ABSTRACT

In an upper-layer image memory, the higher four bits of an upper-layer image stored so far are updated by the use of a four-bit pixel value input from a pixel-value update circuit, and the lower four bits of the upper-layer image are updated by the use of a four-bit class code input from a class-code selection circuit.

45 Claims, 32 Drawing Sheets

● : UPPER-LAYER PIXEL POSITIONS

○ : LOWER-LAYER PIXEL POSITIONS
(ORIGINAL-IMAGE PIXEL POSITIONS)

UPPER-LAYER IMAGE

LOWER-LAYER IMAGE

FOCUS AREA
(area)

PREDICTION TAP
(taps)

ENCODING APPARATUS

BACKGROUND OF THE INVENTION

1. Field of the Invention

The present invention relates to encoding apparatuses.

2. Description of the Related Art

A technology has been developed in which an upper-layer image formed of pixels having a smaller amount of information than pixels constituting the original image is generated and a lower-layer image which is almost the same as the original image is generated from the upper-layer image. The assignee of the present invention has proposed the technology in Unexamined Japanese Patent Publication No. Hei-8-206552 and in the corresponding U.S. application Ser. No. 893,202, filed on Jul. 15, 1997, now U.S. Pat. No. 6,477,278, which is hereby incorporated by reference.

In the applications, a pixel value of the lower-layer image is obtained by calculating a prediction expression formed of a linear combination of the pixel values of prediction taps where an aimed-at pixel of the upper-layer image is placed at the center and the prediction coefficients corresponding to the class code into which the aimed-at pixel is classified. The class code of an aimed-at pixel is determined from the pixel values of class taps formed of the aimed-at pixel and pixels disposed in its vicinity.

Therefore, to generate an upper-layer image which allows a lower-layer image almost the same as the original image to be generated, it is ideal that pixel values and class codes (prediction coefficients) are made more appropriate at the same time.

To make both pixel values and class codes (prediction coefficients) more appropriate at the same time, however, it is necessary to change the pixel values of all pixels in the upper-layer image at the same time. This requires a vast amount of calculations. Therefore, it is practically impossible to make both pixel values and class codes (prediction coefficients) more appropriate at the same time.

When pixel values are made more appropriate after class codes (prediction coefficients) are made more appropriate, for example, since the class codes are determined from the pixel values of an aimed-at pixel and other pixels, the class codes made more appropriate in advance are changed. It is impossible that either pixel values or class codes are fixed and then the other is made more appropriate.

SUMMARY OF THE INVENTION

Accordingly, it is an object of the present invention to generate an upper-layer image (signal) which allows the original image (original signal) to be recovered, by making both pixel values (sample values) and prediction coefficients more appropriate without being affected by each other.

The foregoing object is achieved in one aspect of the present invention through the provision of an image-signal conversion apparatus for converting an original-image signal to an output-image signal having a smaller amount of information than the original-image signal, including intermediate-image-signal generation means for generating an intermediate-image signal having the same amount of information as the output-image signal, from the original-image signal; intermediate-image storage means for storing the pixel value of each pixel of the intermediate-image signal, the pixel value being linked to each class code; prediction-coefficient storage means for storing a prediction coefficient linked to each class code; prediction-coefficient update means for generating, according to the intermediate-image signal, the class code linked to an aimed-at pixel in the intermediate-image signal, and the original-image signal, a more-appropriate prediction coefficient linked to the class code, and for updating the prediction coefficient linked to each class code, stored in the prediction-coefficient storage means; class-code update means for selecting a more appropriate class code linked to the aimed-at pixel in the intermediate-image signal, according to the intermediate-image signal, the prediction coefficient linked to the class code linked to the pixel value of the aimed-at pixel in the intermediate-image signal, and the original-image signal, and for updating the class code linked to the pixel value of the aimed-at pixel in the intermediate-image signal, stored in the intermediate-image storage means; and determination means for determining the intermediate-image signal as the output-image signal when a predetermined condition is satisfied.

The foregoing object is achieved in another aspect of the present invention through the provision of an image-signal conversion apparatus for converting an original-image signal to an output-image signal having a smaller amount of information than the original-image signal, including intermediate-image-signal generation means for generating an intermediate-image signal having the same amount of information as the output-image signal, from the original-image signal; intermediate-image storage means for storing the pixel value of each pixel of the intermediate-image signal, the pixel value being linked to each class code; prediction-coefficient storage means for storing a prediction coefficient linked to each class code; prediction-coefficient update means for generating, according to the intermediate-image signal, the class code linked to an aimed-at pixel in the intermediate-image signal, and the original-image signal, a more-appropriate prediction coefficient linked to the class code, and for updating the prediction coefficient linked to each class code, stored in the prediction-coefficient storage means; pixel-value update means for generating a more-appropriate pixel value of a focus pixel in the intermediate-image signal, according to the prediction coefficient linked to the class code linked to an aimed-at pixel selected based on the focus pixel in the intermediate-image signal, at least one aimed-at pixel selected based on the focus pixel in the intermediate-image signal, and the original-image signal, and for updating the pixel value of the focus pixel, stored in the intermediate-image storage means; and determination means for determining the intermediate-image signal as the output-image signal when a predetermined condition is satisfied.

The foregoing object is achieved in still another aspect of the present invention through the provision of an image-signal conversion method for converting an original-image signal to an output-image signal having a smaller amount of information than the original-image signal, including an intermediate-image-signal generation step of generating an intermediate-image signal having the same amount of information as the output-image signal, from the original-image signal; an intermediate-image storage step of storing the pixel value of each pixel of the intermediate-image signal, the pixel value being linked to each class code; a prediction-coefficient storage step of storing a prediction coefficient linked to each class code; a prediction-coefficient update step of generating, according to the intermediate-image signal, the class code linked to an aimed-at pixel in the intermediate-image signal, and the original-image signal, a more-appropriate prediction coefficient linked to the class code, and of updating the prediction coefficient linked to each class code, stored in the prediction-coefficient storage step; a class-code update step of selecting a more appropriate class code linked to the aimed-at pixel in the intermediate-image signal, according to the intermediate-image signal, the prediction coefficient linked to the class code linked to the pixel value of the aimed-at pixel in the intermediate-image signal, and the original-image signal, and of updating the class code linked to the pixel value of the aimed-at pixel in the intermediate-image signal, stored in the intermediate-image storage step; and a determination step of determining the intermediate-image signal as the output-image signal when a predetermined condition is satisfied.

The foregoing object is achieved in yet another aspect of the present invention through the provision of an image-signal conversion method for converting an original-image signal to an output-image signal having a smaller amount of information than the original-image signal, including an intermediate-image-signal generation step of generating an intermediate-image signal having the same amount of information as the output-image signal, from the original-image signal; an intermediate-image storage step of storing the pixel value of each pixel of the intermediate-image signal, the pixel value being linked to each class code; a prediction-coefficient storage step of storing a prediction coefficient linked to each class code; a prediction-coefficient update step of generating, according to the intermediate-image signal, the class code linked to an aimed-at pixel in the intermediate-image signal, and the original-image signal, a more-appropriate prediction coefficient linked to the class code, and of updating the prediction coefficient linked to each class code, stored in the prediction-coefficient storage step; a pixel-value update step of generating a more-appropriate pixel value of a focus pixel in the intermediate-image signal, according to the prediction coefficient linked to the class code linked to an aimed-at pixel selected based on the focus pixel in the intermediate-image signal, at least one aimed-at pixel selected based on the focus pixel in the intermediate-image signal, and the original-image signal, and of updating the pixel value of the focus pixel, stored in the intermediate-image storage step; and a determination step of determining the intermediate-image signal as the output-image signal when a predetermined condition is satisfied.

The foregoing object is achieved in still yet another aspect of the present invention through the provision of a recording medium for storing a computer-controllable program for converting an original-image signal to an output-image signal having a smaller amount of information than the original-image signal, the program including an intermediate-image-signal generation step of generating an intermediate-image signal having the same amount of information as the output-image signal, from the original-image signal; an intermediate-image storage step of storing the pixel value of each pixel of the intermediate-image signal, the pixel value being linked to each class code; a prediction-coefficient storage step of storing a prediction coefficient linked to each class code; a prediction-coefficient update step of generating, according to the intermediate-image signal, the class code linked to an aimed-at pixel in the intermediate-image signal, and the original-image signal, a more-appropriate prediction coefficient linked to the class code, and of updating the prediction coefficient linked to each class code, stored in the prediction-coefficient storage step; a class-code update step of selecting a more appropriate class code linked to the aimed-at pixel in the intermediate-image signal, according to the intermediate-image signal, the prediction coefficient linked to the class code linked to the pixel value of the aimed-at pixel in the intermediate-image signal, and the original-image signal, and of updating the class code linked to the pixel value of the aimed-at pixel in the intermediate-image signal, stored in the intermediate-image storage step; and a determination step of determining the intermediate-image signal as the output-image signal when a predetermined condition is satisfied.

The foregoing object is achieved in a further aspect of the present invention through the provision of a recording medium for storing a computer-controllable program for converting an original-image signal to an output-image signal having a smaller amount of information than the original-image signal, the program including an intermediate-image-signal generation step of generating an intermediate-image signal having the same amount of information as the output-image signal, from the original-image signal; an intermediate-image storage step of storing the pixel value of each pixel of the intermediate-image signal, the pixel value being linked to each class code; a prediction-coefficient storage step of storing a prediction coefficient linked to each class code; a prediction-coefficient update step of generating, according to the intermediate-image signal, the class code linked to an aimed-at pixel in the intermediate-image signal, and the original-image signal, a more-appropriate prediction coefficient linked to the class code, and of updating the prediction coefficient linked to each class code, stored in the prediction-coefficient storage step; a pixel-value update step of generating a more-appropriate pixel value of a focus pixel in the intermediate-image signal, according to the prediction coefficient linked to the class code linked to an aimed-at pixel selected based on the focus pixel in the intermediate-image signal, at least one aimed-at pixel selected based on the focus pixel in the intermediate-image signal, and the original-image signal, and of updating the pixel value of the focus pixel, stored in the intermediate-image storage step; and a determination step of determining the intermediate-image signal as the output-image signal when a predetermined condition is satisfied.

The foregoing object is achieved in a still further aspect of the present invention through the provision of an information-signal conversion apparatus for converting an original-information signal to an output-information signal having a smaller amount of information than the original-information signal, including intermediate-information-signal generation means for generating an intermediate-information signal having the same amount of information as the output-information signal, from the original-information signal; intermediate-information storage means for storing the sample value of each sample of the intermediate-information signal, the sample value being linked to each class code; prediction-coefficient storage means for storing a prediction coefficient linked to each class code; prediction-coefficient update means for generating, according to the intermediate-information signal, the class code linked to an aimed-at sample in the intermediate-information signal, and the original-information signal, a more-appropriate prediction coefficient linked to the class code, and for updating the prediction coefficient linked to each class code, stored in the prediction-coefficient storage means; class-code update means for selecting a more appropriate class code linked to the aimed-at sample in the intermediate-information signal, according to the intermediate-information signal, the prediction coefficient linked to the class code linked to the sample value of the aimed-at sample in the intermediate-information signal, and the original-information signal, and for updating the class code linked to the sample value of the aimed-at sample in the intermediate-information signal, stored in the intermediate-information storage means; and determination means for determining the intermediate-information signal as the output-information signal when a predetermined condition is satisfied.

The foregoing object is achieved in a yet further aspect of the present invention through the provision of an information-signal conversion apparatus for converting an original-information signal to an output-information signal having a smaller amount of information than the original-information signal, including intermediate-information-signal generation means for generating an intermediate-information signal having the same amount of information as the output-information signal, from the original-information signal; intermediate-information storage means for storing the sample value of each sample of the intermediate-information signal, the sample value being linked to each class code; prediction-coefficient storage means for storing a prediction coefficient linked to each class code; prediction-coefficient update means for generating, according to the intermediate-information signal, the class code linked to an aimed-at sample in the intermediate-information signal, and the original-information signal, a more-appropriate prediction coefficient linked to the class code, and for updating the prediction coefficient linked to each class code, stored in the prediction-coefficient storage means; sample-value update means for generating a more-appropriate sample value of a focus sample in the intermediate-information signal, according to the prediction coefficient linked to the class code linked to an aimed-at sample selected based on the focus sample in the intermediate-information signal, at least one aimed-at sample selected based on the focus sample in the intermediate-information signal, and the original-information signal, and for updating the sample value of the focus sample, stored in the intermediate-information storage means; and determination means for determining the intermediate-information signal as the output-information signal when a predetermined condition is satisfied.

The foregoing object is achieved in a still yet further aspect of the present invention through the provision of an information-signal conversion method for converting an original-information signal to an output-information signal having a smaller amount of information than the original-information signal, including an intermediate-information-signal generation step of generating an intermediate-information signal having the same amount of information as the output-information signal, from the original-information signal; an intermediate-information storage step of storing the sample value of each sample of the intermediate-information signal, the sample value being linked to each class code; a prediction-coefficient storage step of storing a prediction coefficient linked to each class code; a prediction-coefficient update step of generating, according to the intermediate-information signal, the class code linked to an aimed-at sample in the intermediate-information signal, and the original-information signal, a more-appropriate prediction coefficient linked to the class code, and of updating the prediction coefficient linked to each class code, stored in the prediction-coefficient storage step; a class-code update step of selecting a more appropriate class code linked to the aimed-at sample in the intermediate-information signal, according to the intermediate-information signal, the prediction coefficient linked to the class code linked to the sample value of the aimed-at sample in the intermediate-information signal, and the original-information signal, and of updating the class code linked to the sample value of the aimed-at sample in the intermediate-information signal, stored in the intermediate-information storage step; and a determination step of determining the intermediate-information signal as the output-information signal when a predetermined condition is satisfied.

The foregoing object is achieved in a different aspect of the present invention through the provision of an information-signal conversion method for converting an original-information signal to an output-information signal having a smaller amount of information than the original-information signal, including an intermediate-information-signal generation step of generating an intermediate-information signal having the same amount of information as the output-information signal, from the original-information signal; an intermediate-information storage step of storing the sample value of each sample of the intermediate-information signal, the sample value being linked to each class code; a prediction-coefficient storage step of storing a prediction coefficient linked to each class code; a prediction-coefficient update step of generating, according to the intermediate-information signal, the class code linked to an aimed-at sample in the intermediate-information signal, and the original-information signal, a more-appropriate prediction coefficient linked to the class code, and of updating the prediction coefficient linked to each class code, stored in the prediction-coefficient storage step; a sample-value update step of generating a more-appropriate sample value of a focus sample in the intermediate-information signal, according to the prediction coefficient linked to the class code linked to an aimed-at sample selected based on the focus sample in the intermediate-information signal, at least one aimed-at sample selected based on the focus sample in the intermediate-information signal, and the original-information signal, and of updating the sample value of the focus sample, stored in the intermediate-information storage step; and a determination step of determining the intermediate-information signal as the output-information signal when a predetermined condition is satisfied.

The foregoing object is achieved in a still different aspect of the present invention through the provision of a recording medium for storing a computer-controllable program for converting an original-information signal to an output-information signal having a smaller amount of information than the original-information signal, the program including an intermediate-information-signal generation step of generating an intermediate-information signal having the same amount of information as the output-information signal, from the original-information signal; an intermediate-information storage step of storing the sample value of each sample of the intermediate-information signal, the sample value being linked to each class code; a prediction-coefficient storage step of storing a prediction coefficient linked to each class code; a prediction-coefficient update step of generating, according to the intermediate-information signal, the class code linked to an aimed-at sample in the intermediate-information signal, and the original-information signal, a more-appropriate prediction coefficient linked to the class code, and of updating the prediction coefficient linked to each class code, stored in the prediction-coefficient storage step; a class-code update step of selecting a more appropriate class code linked to the aimed-at sample in the intermediate-information signal, according to the intermediate-information signal, the prediction coefficient linked to the class code linked to the sample value of the aimed-at sample in the intermediate-information signal, and the original-information signal, and of updating the class code linked to the sample value of the aimed-at sample in the intermediate-information signal, stored in the intermediate-information storage step; and a determination step of determining the intermediate-information signal as the output-information signal when a predetermined condition is satisfied.

The foregoing object is achieved in a yet different aspect of the present invention through the provision of a recording medium for storing a computer-controllable program for converting an original-information signal to an output-information signal having a smaller amount of information than the original-information signal, the program including an intermediate-information-signal generation step of generating an intermediate-information signal having the same amount of information as the output-information signal, from the original-information signal; an intermediate-information storage step of storing the sample value of each sample of the intermediate-information signal, the sample value being linked to each class code; a prediction-coefficient storage step of storing a prediction coefficient linked to each class code; a prediction-coefficient update step of generating, according to the intermediate-information signal, the class code linked to an aimed-at sample in the intermediate-information signal, and the original-information signal, a more-appropriate prediction coefficient linked to the class code, and of updating the prediction coefficient linked to each class code, stored in the prediction-coefficient storage step; a sample-value update step of generating a more-appropriate sample value of a focus sample in the intermediate-information signal, according to the prediction coefficient linked to the class code linked to an aimed-at sample selected based on the focus sample in the intermediate-information signal, at least one aimed-at sample selected based on the focus sample in the intermediate-information signal, and the original-information signal, and of updating the sample value of the focus sample, stored in the intermediate-information storage step; and a determination step of determining the intermediate-information signal as the output-information signal when a predetermined condition is satisfied.

The foregoing object is achieved in a still yet different aspect of the present invention through the provision of a signal for carrying a computer-controllable program for converting an original-information signal to an output-information signal having a smaller amount of information than the original-information signal, the program including an intermediate-information-signal generation step of generating an intermediate-information signal having the same amount of information as the output-information signal, from the original-information signal; an intermediate-information storage step of storing the sample value of each sample of the intermediate-information signal, the sample value being linked to each class code; a prediction-coefficient storage step of storing a prediction coefficient linked to each class code; a prediction-coefficient update step of generating, according to the intermediate-information signal, the class code linked to an aimed-at sample in the intermediate-information signal, and the original-information signal, a more-appropriate prediction coefficient linked to the class code, and of updating the prediction coefficient linked to each class code, stored in the prediction-coefficient storage step; a class-code update step of selecting a more appropriate class code linked to the aimed-at sample in the intermediate-information signal, according to the intermediate-information signal, the pre-diction coefficient linked to the class code linked to the sample value of the aimed-at sample in the intermediate-information signal, and the original-information signal, and of updating the class code linked to the sample value of the aimed-at sample in the intermediate-information signal, stored in the intermediate-information storage step; and a determination step of determining the intermediate-information signal as the output-information signal when a predetermined condition is satisfied.

The foregoing object is achieved in a further different aspect of the present invention through the provision of a signal for carrying a computer-controllable program for converting an original-information signal to an output-information signal having a smaller amount of information than the original-information signal, the program including an intermediate-information-signal generation step of generating an intermediate-information signal having the same amount of information as the output-information signal, from the original-information signal; an intermediate-information storage step of storing the sample value of each sample of the intermediate-information signal, the sample value being linked to each class code; a prediction-coefficient storage step of storing a prediction coefficient linked to each class code; a prediction-coefficient update step of generating, according to the intermediate-information signal, the class code linked to an aimed-at sample in the intermediate-information signal, and the original-information signal, a more-appropriate prediction coefficient linked to the class code, and of updating the prediction coefficient linked to each class code, stored in the prediction-coefficient storage step; a sample-value update step of generating a more-appropriate sample value of a focus sample in the intermediate-information signal, according to the prediction coefficient linked to the class code linked to an aimed-at sample selected based on the focus sample in the intermediate-information signal, at least one aimed-at sample selected based on the focus sample in the intermediate-information signal, and the original-information signal, and of updating the sample value of the focus sample, stored in the intermediate-information storage step; and a determination step of determining the intermediate-information signal as the output-information signal when a predetermined condition is satisfied.

DESCRIPTION OF THE PREFERRED EMBODIMENTS

An encoder according to the present invention will be described below by referring to FIG. 1. It is assumed that the original image input to the encoder 1 has an eight-bit pixel value for each pixel, and an upper-layer image generated by the encoder 1 also has an eight-bit information value (pixel data) for each pixel.

An aimed-at pixel refers to a pixel specified for identifying a position without changing its pixel value. A focus pixel refers to a pixel specified for identifying a position, with its value being updated.

Figure 1:
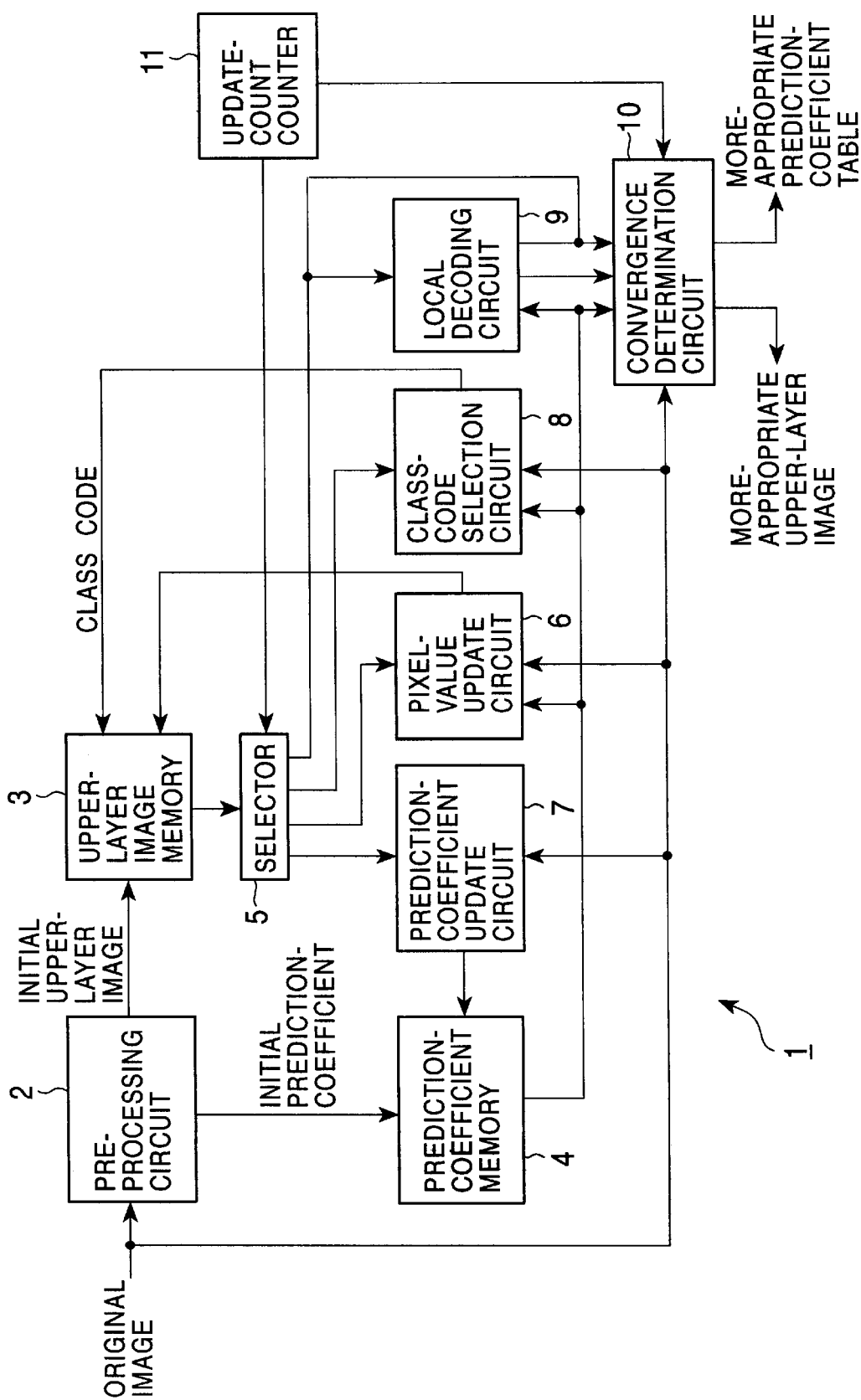
FIG. 1 is a block diagram of a first example structure of an encoder according to the present invention.

As shown in FIG. 1, in the encoder 1, the original image is sent to a pre-processing circuit 2, a pixel-value update circuit 6, a prediction-coefficient update circuit 7, a class-code selection circuit 8, and a convergence 9 determination circuit 10. The pre-processing circuit 2 generates an initial upper-layer image by the use of the received original image and stores it in an upper-layer image memory 3. The pre-processing circuit 2 also generates an initial prediction-coefficient table and stores it in a prediction-coefficient memory 4.

The upper-layer image memory 3 outputs the stored upper-layer image to a selector 5. The upper-layer image memory 3 also updates the higher four bits at the most significant bit (MSB) side of the stored upper-layer image, by the use of a pixel value (having four bits) input from the pixel-value update circuit 6, and updates the lower four bits at the least significant bit (LSB) side of the stored upper-layer image, by the use of a class code (having four bits) input from the class-code selection circuit 8.

The prediction-coefficient memory 4 sends the stored prediction-coefficient table to the pixel-value update circuit 6, the class-code selection circuit 8, a local decoding circuit 9, and the convergence determination circuit 10. The prediction-coefficient memory 4 updates the stored prediction-coefficient table, by the use of a prediction-coefficient set input from the prediction-coefficient update circuit 7.

The selector 5 outputs the upper-layer image input from the upper-layer image memory 3 to any one of the local decoding circuit 9, the convergence determination circuit 10, the pixel-value update circuit 6, the prediction-coefficient update circuit 7, and the class-code selection circuit 8 according to an control signal input from an update-count counter 11.

The pixel-value update circuit 6 updates pixel values (the higher four bits at the MSB side of the pixel data) of the upper-layer image input from the selector 5, with the use of the original image and a prediction-coefficient set, and outputs them to the upper-layer image memory 3. The prediction-coefficient update circuit 7 generates a prediction-coefficient set with the use of the original image and the upper-layer image input from the selector 5, and outputs it to the prediction-coefficient memory 4.

The class-code selection circuit 8 select an appropriate prediction-coefficient set in the prediction-coefficient table stored in the prediction-coefficient memory 4 for each pixel of the upper-layer image input from the selector 5, and outputs the class code (having four bits) corresponding to the prediction-coefficient set to the upper-layer image memory 3.

The local decoding circuit 9 generates a lower-layer image with the use of the upper-layer image input from the selector 5 and a prediction-coefficient set stored in the prediction-coefficient memory 5, and outputs it to the convergence determination circuit 10.

The convergence determination circuit 10 calculates the s/n ratio of the lower-layer image input from the local decoding circuit 9 to the original image, obtains the increase between the s/n ratio and that calculated at the previous time, and outputs the upper-layer image input from the selector 5 and a prediction-coefficient table input from the prediction-coefficient memory 4 when it is determined that the s/n-ratio increase converges. The convergence determination circuit 10 also outputs the upper-layer image input from the selector 5 and the prediction-coefficient table input from the prediction-coefficient memory 4 when it receives a control signal from the update-count counter 11.

In the present embodiment, the convergence determination circuit 10 determines convergence according to the s/n-ratio increase. The determination can be made according to an s/n-ratio increase rate or according to an error instead of the s/n ratio.

The update-count counter 11 outputs a control signal to the selector 5 when the convergence determination circuit 10, the pixel-value update circuit 6, the prediction-coefficient update circuit 7, or the class-code selection circuit 8 finishes processing, and counts the times the control signal is output. When the count reaches a predetermined value, the update-count counter 11 outputs a control signal to the convergence determination circuit 10.

The operation of the encoder 1 will be described below by referring to a flowchart shown in FIG. 2. Encoding starts, for example, when the original image is input to the encoder 1. In a step S1, the pre-processing circuit 2 performs pre-processing with the use of the input original image.

Figure 3:
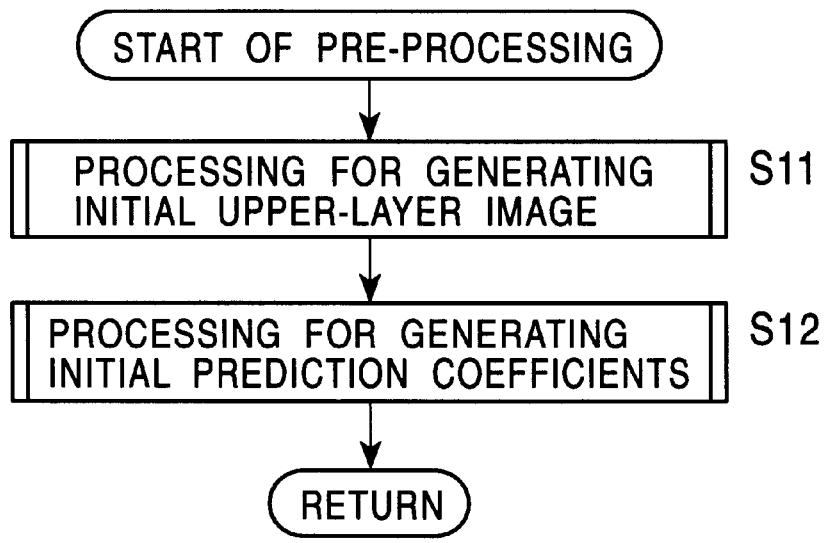
FIG. 3 is a flowchart of the operation of a pre-processing circuit 2 shown in FIG. 1.
Figure 4:
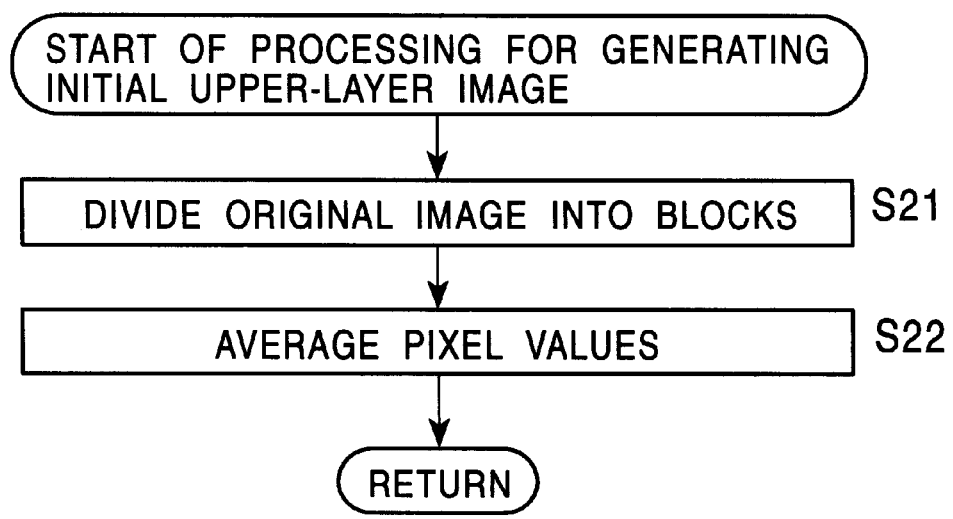
FIG. 4 is a flowchart of detailed processing executed in a step S11 shown in FIG. 3.
Figure 5:
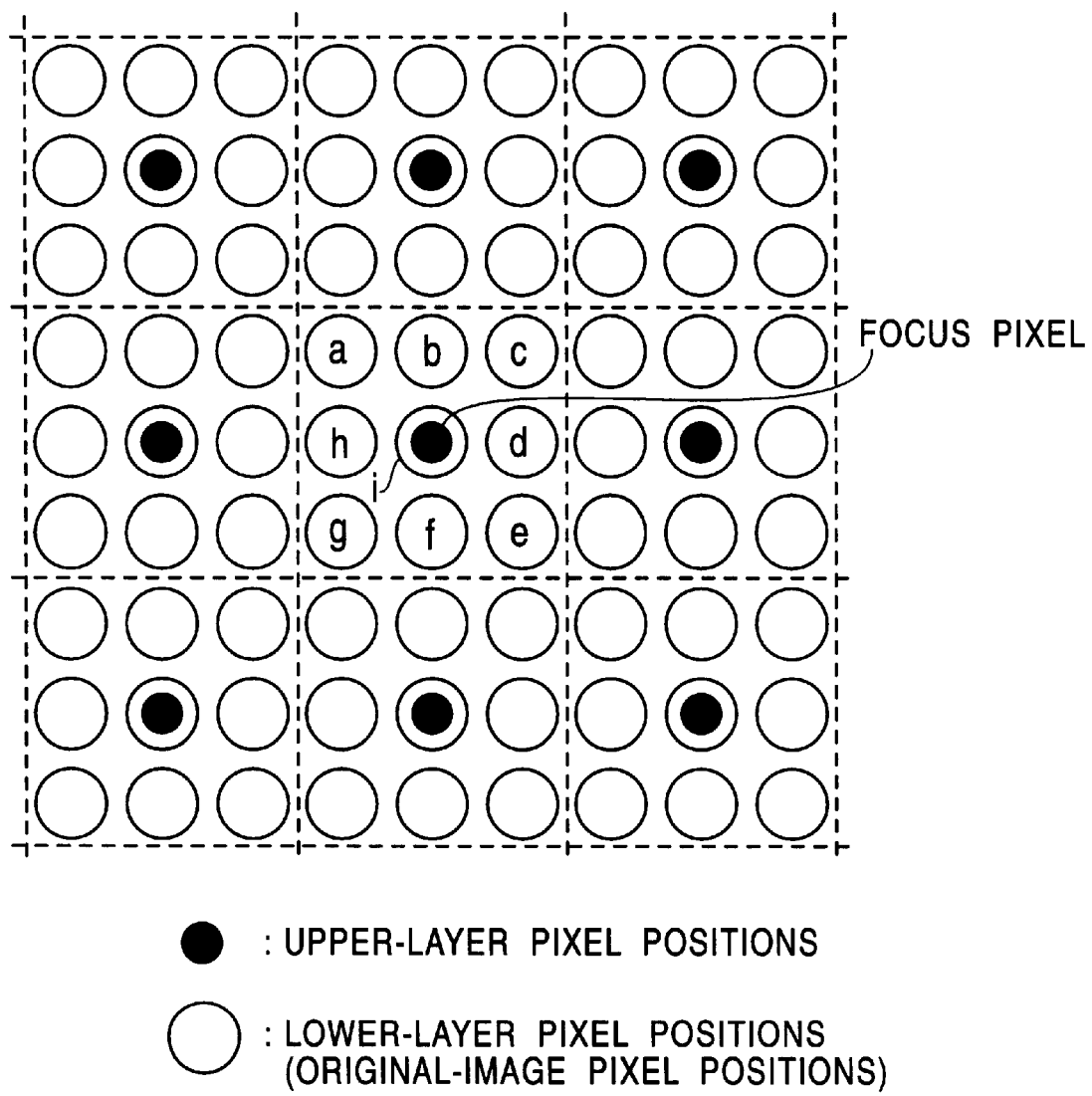
FIG. 5 is a view showing the arrangement of pixels.

The pre-processing is formed of steps S11 and S12 as shown in FIG. 3. Processing for generating an initial upper-layer image to be performed in the step S11 will be described below by referring to a flowchart shown in FIG. 4. In a step S21, the pre-processing circuit 2 divides the input original image into blocks each having a predetermined size (for example, three by three pixels as shown in FIG. 5).

Figure 6:
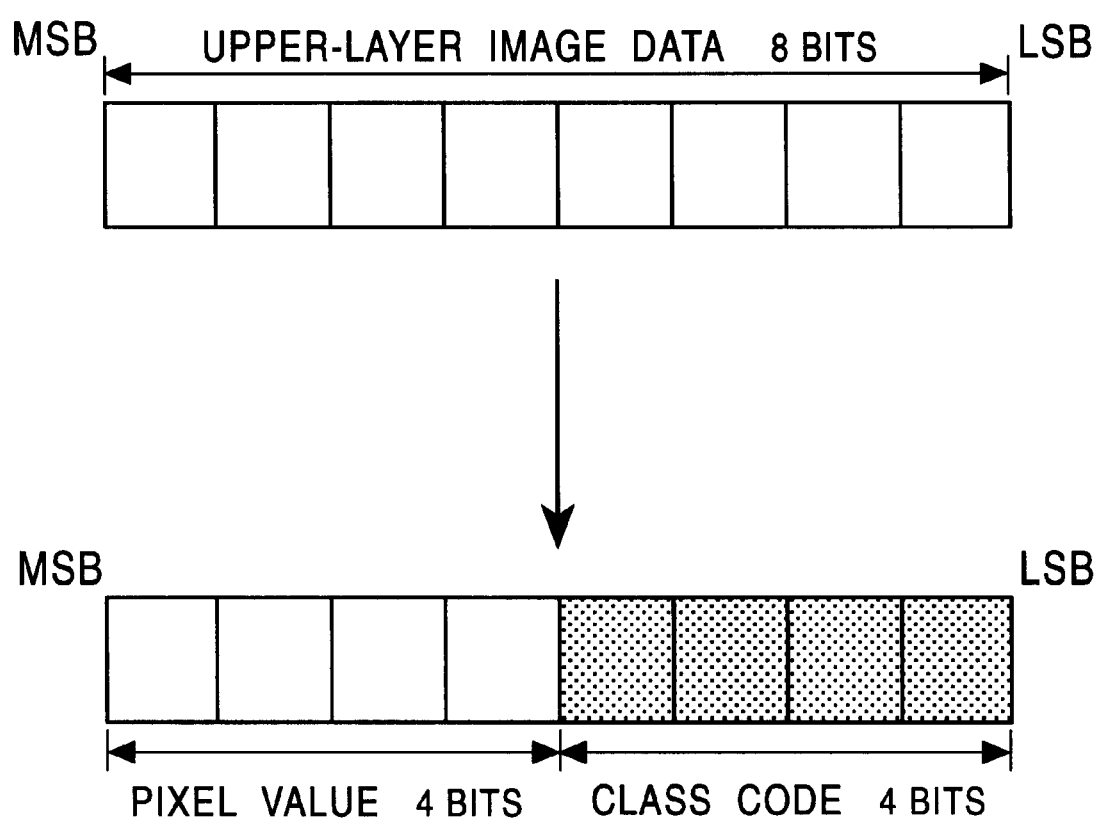
FIG. 6 is a view showing pixel data.

In a step S22, the pre-processing circuit 2 calculates the average of the pixel values of a plurality of (in this case, nine) pixels contained in each block generated in the step S21, and records the higher four bits at the MSB side of the average (having eight bits) in the higher four bits at the MSB side of the upper-layer image data (having eight bits) as the pixel value of the pixel corresponding to each block in the initial upper-layer image, as shown in FIG. 6.

In all circuits which use the four bits recorded at the MSB side of the upper-layer image data as a pixel value, such as the prediction-coefficient update circuit 7, the class-code selection circuit 8, and the local decoding circuit 9, the four-bit value is changed to an eight-bit value. If the four-bit value at the MSB side is just multiplied by 16, the luminance of the entire image is lowered. To prevent this happening, an offset value (for example, 7 or 8) is added to the value obtained by multiplying the four-bit value by 16 and the result is used as a pixel value.

As a method for determining a pixel value of an initial upper-layer image, not only the averaging method, described above, but also a method in which the original image is thinned out directly or with the use of a low-pass filter, such as a Gaussian filter, may be used.

Figure 7:
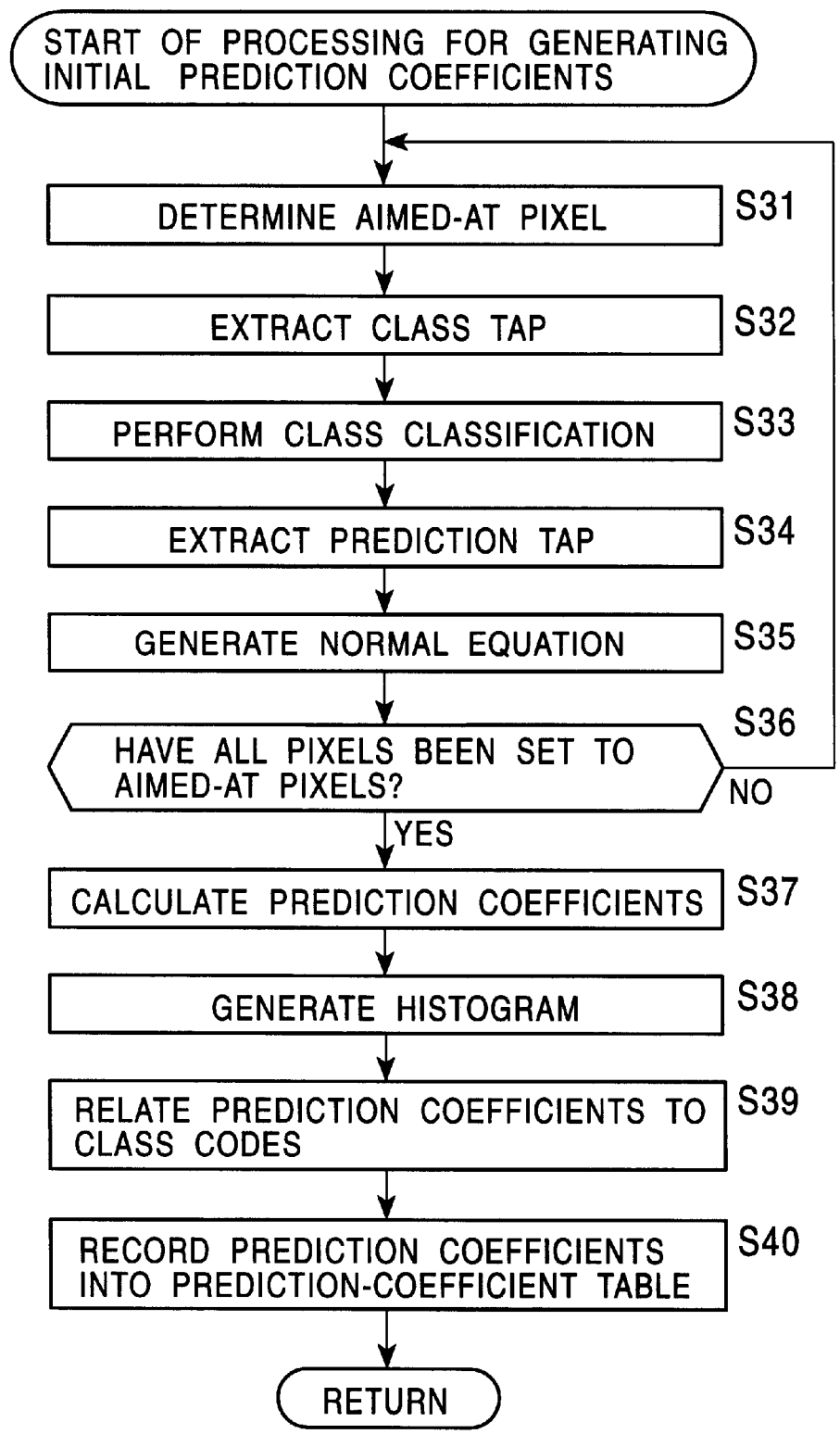
FIG. 7 is a flowchart of detailed processing executed in a step S12 shown in FIG. 3.

Back to FIG. 3, after the processing described above is performed in the step S11, processing for generating initial prediction coefficients is executed in the step S12. This processing will be described below by referring to a flowchart shown in FIG. 7. In a step S31, the pre-processing circuit 2 selects a pixel in the initial upper-layer image for which only the pixel values (the four bits at the MSB side in each pixel data (having eight bits)) were determined in the step S11 of FIG. 3 (the corresponding class codes have not yet been determined), as an aimed-at pixel.

In a step S32, the pre-processing circuit 2 extracts the pixel values (each having four bits) of class taps (for example, a total of five pixels, the aimed-at pixel and the pixels adjacent thereto right and left and up and down) according to the aimed-at pixel.

In a step S33, the pre-processing circuit 2 applies one-bit adaptive dynamic range coding (ADRC) processing to each of the five pixel values (the higher four bits at the MSB side) to convert it to one bit, and obtains a five-bit class code, for example, by arranging the five one-bit values in the order corresponding to the positions of the pixels. The pre-processing circuit 2 also sets the lower four bits at the LSB side of the pixel data (having eight bits) of the aimed-at pixel to any value (for example, to the higher four bits at the MSB side of the five-bit class code), as shown in FIG. 6. The above-described one-bit ADRC processing is, for example, described in U.S. Pat. No. 5,912,708, and hereby incorporated by reference.

In a step S34, the pre-processing circuit 2 extracts the pixel values of prediction taps having a predetermined size (for example, five by five pixels) with their center placed on the aimed-at pixel. In a step S35, the pre-processing circuit 2 generates a normal equation formed of the pixel values of the known original image and prediction taps, and an unknown prediction-coefficient set.

In a step S36, the pre-processing circuit 2 determines whether all pixels in the initial upper-layer image have been set to aimed-at pixels. The processes from the step S31 to the step S36 are repeated until it is determined that all the pixels have been set to aimed-at pixels. When it is determined in the step S36 that all the pixels have been set to aimed-at pixels, the procedure proceeds to a step S37.

In the step S37, the pre-processing circuit 2 generates the same normal equation as that generated in the step S35 for each of five-bit classes, applies the least squares method to the equation to solve it, and obtains the prediction-coefficient set corresponding to each of 32 (five bits) class codes. In a step S38, the pre-processing circuit 2 generates a histogram indicating the number of aimed-at pixels related to each class code in the step S33.

In a step S39, the pre-processing circuit 2 references the histogram generated in the step S38, relates the prediction-coefficient sets corresponding to the 16 class codes having the larger numbers of aimed-at pixels to new four-bit class codes (0000 to 1111) in a desired way.

In a step S40, the pre-processing circuit 2 outputs the prediction-coefficient sets related to the four-bit (16-type) class codes to the prediction-coefficient memory 4. The pre-processing circuit 2 also outputs the initial upper-layer image having pixel data formed of pixel values disposed at the higher four bits at the MSB side and class codes disposed at the lower four bits at the LSB side, to the upper-layer image memory 3.

As a method for generating an initial prediction-coefficient set, random numbers may be related to the four-bit class codes (0000 to 1111). The class codes may be random numbers. The prediction-coefficient set may be random numbers. Alternatively, both class codes and prediction-coefficient sets may be random numbers.

Figure 2:
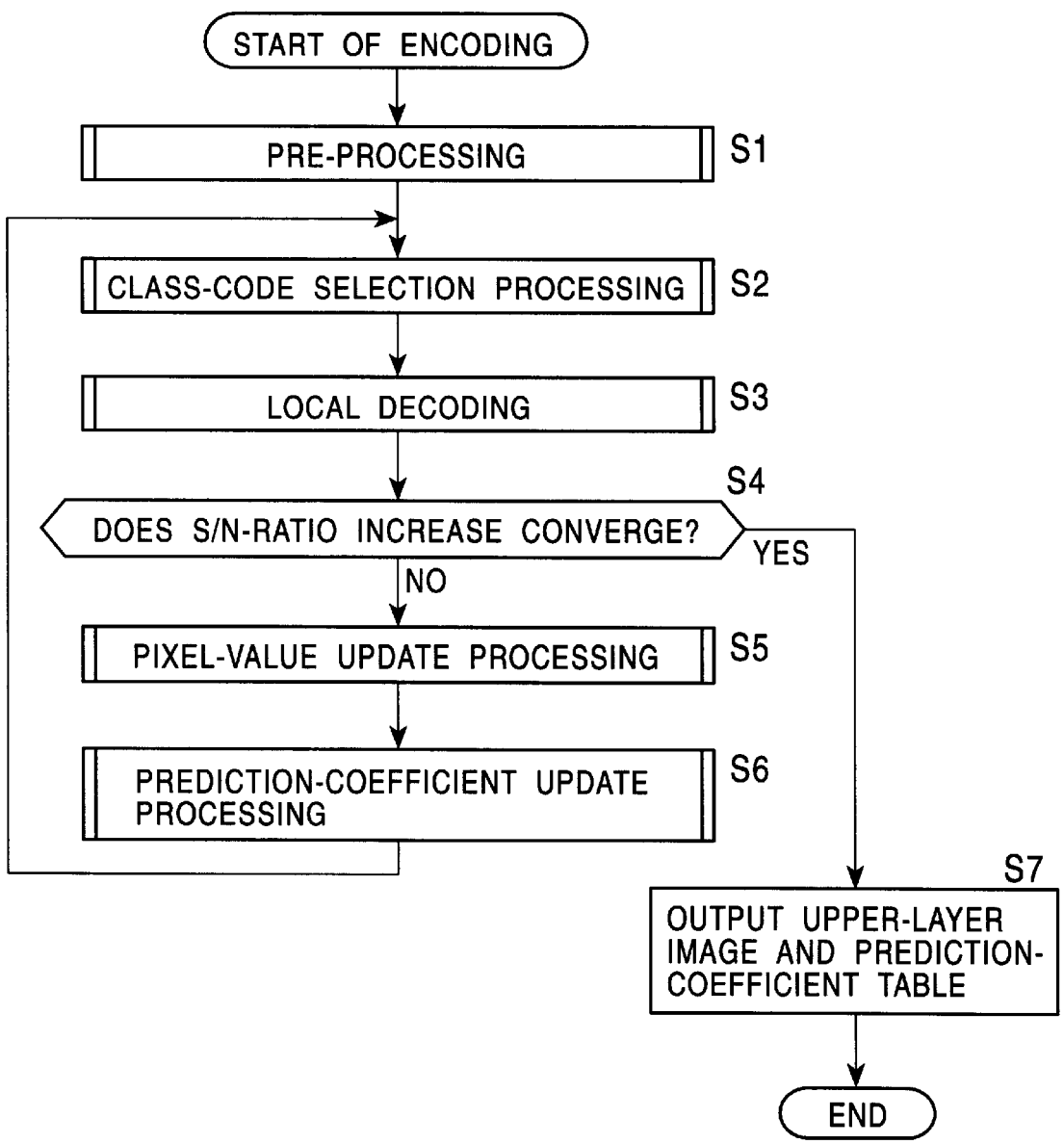
FIG. 2 is a flowchart of the operation of the encoder shown in FIG. 1.

Back to FIG. 2, after the pre-processing is performed as described above in the step S1, the class-code selection circuit 8 selects an appropriate prediction-coefficient set from those of 16 types stored in the prediction-coefficient memory 4, for each pixel of the input upper-layer image. The operation and an example structure of the class-code selection circuit 8 will be described later by referring to FIG. 14 and FIG. 15.

In a step S3, local decoding is executed. The upper-layer image sent from the upper-layer image memory 3 to the selector 5 is sent to the local decoding circuit 9 according to the control signal sent from the update-count counter 11 to the selector 5. The local decoding circuit 9 generates a lower-layer image with the use of the upper-layer image (in this case, the initial upper-layer image) sent from the selector 5 and the prediction-coefficient table (in this case, the initial prediction-coefficient table) sent from the prediction-coefficient memory 4, and outputs the image to the convergence determination circuit 10. In the lower-layer image, as shown in FIG. 5, three by three pixels (pixels "a" to "i") with the pixel "i" disposed in the lower-layer image at the position corresponding to that of one aimed-at pixel in the upper-layer image are generated. The operation and a structure of the local decoding circuit 9 will be described later by referring to FIG. 16 and FIG. 17.

In a step S4, the convergence determination circuit 10 calculates the s/n ratio of the lower-layer image input from the local decoding circuit 9 to the original image, obtains the increase between the s/n ratio and that calculated at the previous time, and determines whether the s/n-ratio increase converges. When the convergence determination circuit 10 determines that the s/n-ratio increase converges, or when it receives a control signal from the update-count counter 11, the procedure proceeds to a step S7. When the convergence determination circuit 10 determines that the s/n-ratio increase has not yet converged and it has not yet received a control signal from the update-count counter 11, the procedure proceeds to a step S5.

In this case, since the convergence determination processing is applied to the lower-layer image decoded at the first time, neither the s/n-ratio increase is obtained nor a control signal is received from the update-count counter 11. Therefore, the procedure proceeds to the step S5.

When the convergence determination circuit 10 has finished the determination processing, the update-count counter 11 sends a control signal to the selector 5.

In the step S5, the upper-layer image input from the upper-layer image memory 3 to the selector 5 is sent to the pixel-value update circuit 6 according to the control signal sent from the update-count counter 11. The pixel-value update circuit 6 updates the pixel values (the higher four bits at the MSB side of the pixel data) of the input upper-layer image.

Figure 8:
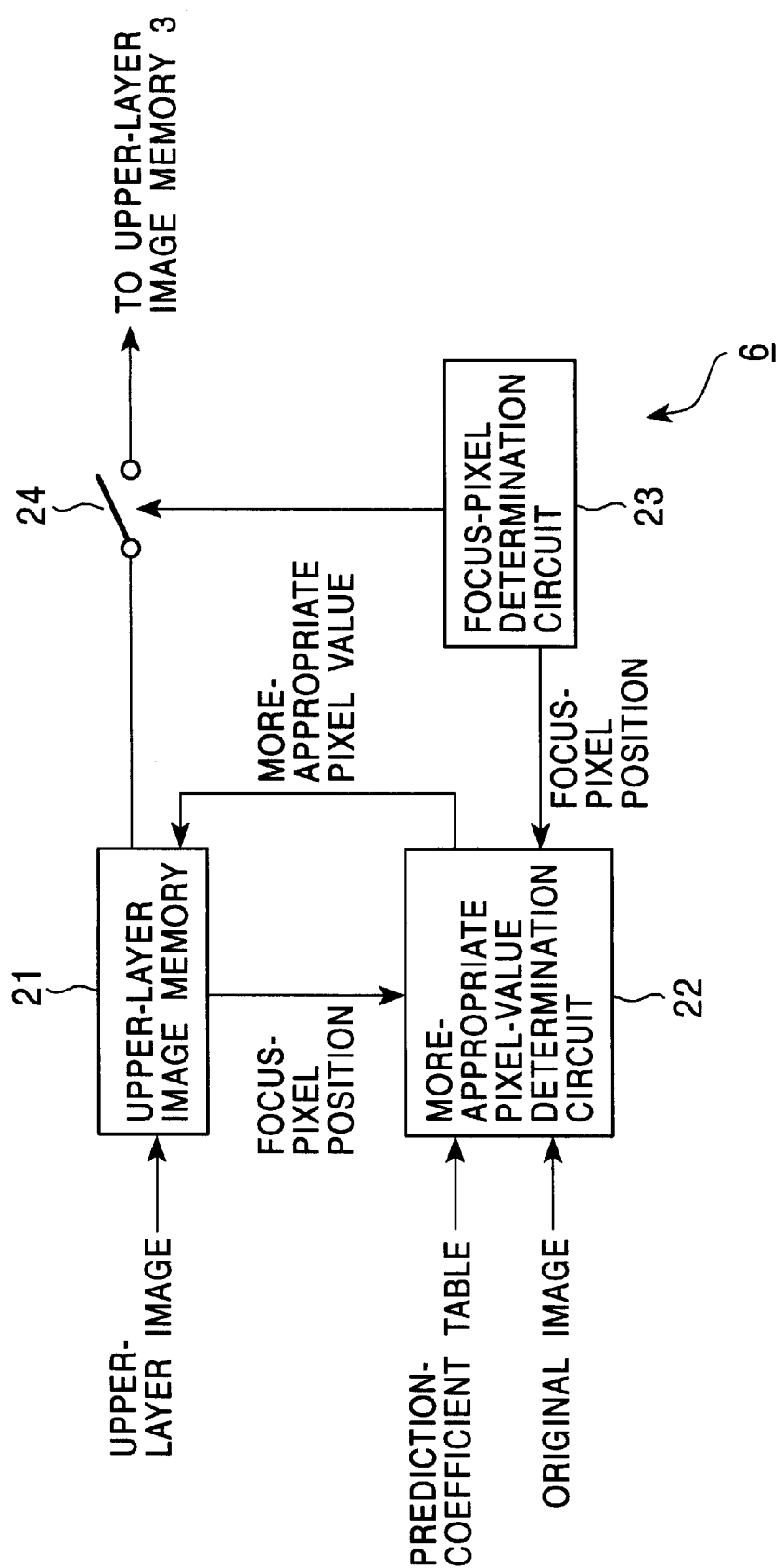
FIG. 8 is a block diagram of a first example structure of a pixel-value update circuit 6 shown in FIG. 1.

Before pixel-value update processing is described, a first example structure of the pixel-value update circuit 6 will be described below by referring to FIG. 8 and FIG. 9. In the pixel-value update circuit 6, the upper-layer image input from the selector 5 is stored in an upper-layer image memory 21. The upper-layer image memory 21 sends the stored upper-layer image to a more-appropriate pixel-value determination circuit 22. The upper-layer image memory 21 updates the pixel values (the higher four bits at the MSB side of the pixel data) of the stored upper-layer image by the use of the pixel values (each having four bits) made more appropriate at the current state in the more-appropriate pixel-value determination circuit 22. The upper-layer image in which the pixel values of all pixels have been made more appropriate is output to the upper-layer image memory 3 through a switch 24.

The more-appropriate pixel-value determination circuit 22 also receives the original image, and the prediction-coefficient table from the prediction-coefficient memory 4. The more-appropriate pixel-value determination circuit 22 makes the pixel value of a focus pixel specified by a focus-pixel determination circuit 23 more appropriate and outputs it to the upper-layer image memory 21. The focus-pixel determination circuit 23 sequentially assigns pixels in the upper-layer image to focus pixels, and outputs focus-pixel position information to the more-appropriate pixel-value determination circuit 22. The focus-pixel determination circuit 23 also outputs a control signal to turn on the switch 24 after all the pixels in the upper-layer image have been assigned to focus pixels.

Figure 9:
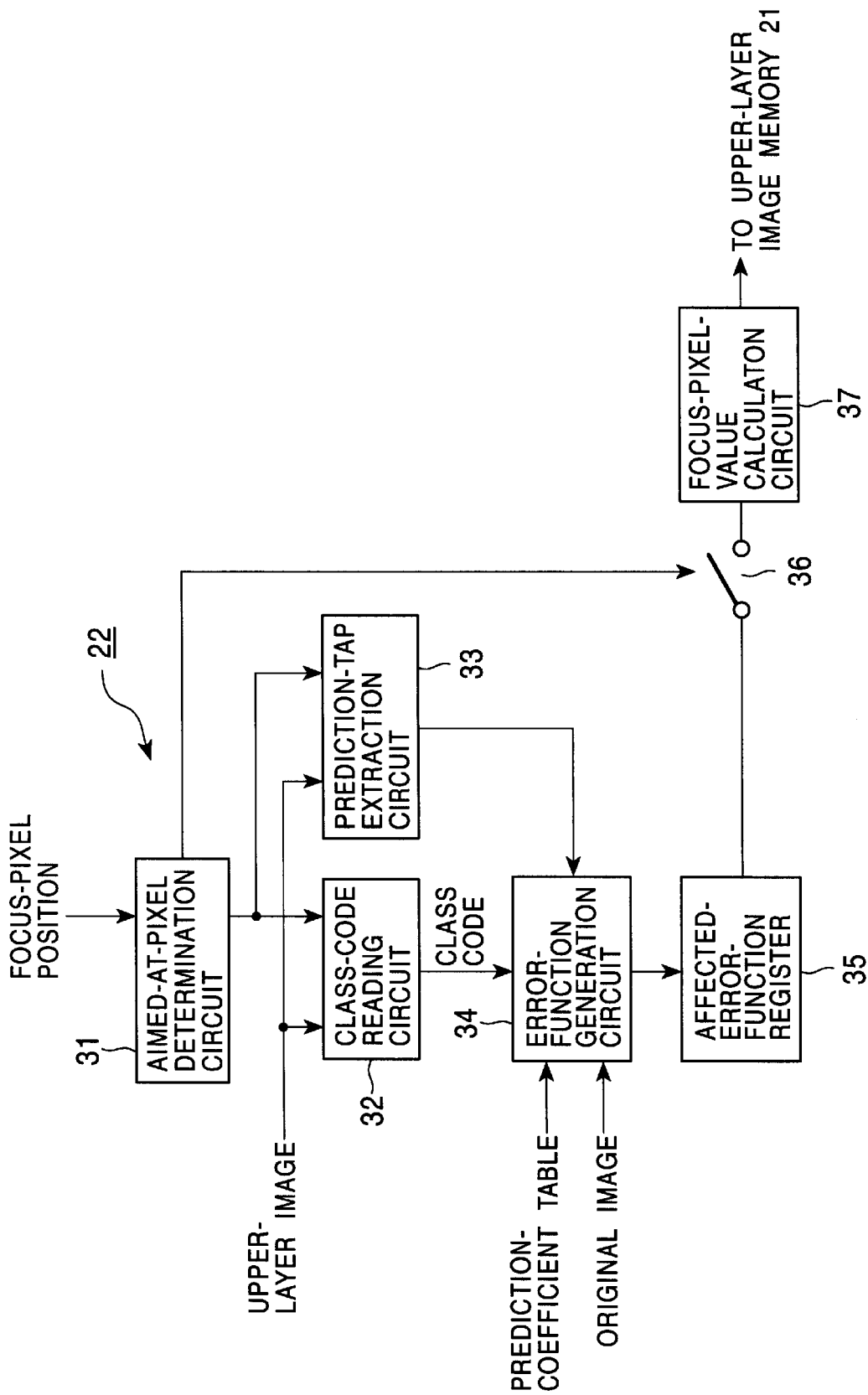
FIG. 9 is a block diagram of an example structure of more-appropriate pixel-value determination circuit 22 shown in FIG. 8.

FIG. 9 shows a detailed example structure of the more-appropriate pixel-value determination circuit 22. The more-appropriate pixel-value determination circuit 22 makes the pixel value of a focus pixel more appropriate while the pixel values of the pixels other than the focus pixel is being fixed.

An aimed-at-pixel determination circuit 31 specifies an area (a set of pixels at the center zone of prediction taps which include a focus pixel, hereinafter called an affected area) where an effect is caused in decoding due to a change in the pixel value of the focus pixel determined by the focus-pixel determination circuit 23, sequentially assigns the pixels disposed in the affected area of the upper-layer image, and outputs the corresponding position information to a class-code reading circuit 32 and to a prediction-tap extraction circuit 33. The aimed-at-pixel determination circuit 31 outputs a control signal to turn on a switch 36 when all the pixels in the affected area have been assigned to aimed-at pixels.

The class-code reading circuit 32 reads the class code (the lower four bits at the LSB side of the pixel data) of an aimed-at pixel and outputs it to an error-function generation circuit 34. The prediction-tap extraction circuit 33 extracts the pixel values (the higher four bits at the MSB side of the pixel data) of prediction taps formed of five by five pixels with the aimed-at pixel disposed at the center, from the upper-layer image, and outputs them to the error-function generation circuit 34.

The error-function generation circuit 34 generates the error function (its details will be described later) corresponding to each aimed-at pixel, and outputs it to an affected-error-function register 35. The affected-error-function register 35 adds the error functions corresponding to all aimed-at pixels in the affected area to generate an affected error function, and outputs it to a focus-pixel-value calculation circuit 37 through the switch 36.

The focus-pixel-value calculation circuit 37 solves the affected error function input through the switch 36 to obtain a new pixel value of the focus pixel (details will be described later).

The operation of the first example structure of the pixel-value update circuit 6 will be described below by referring to a flowchart shown in FIG. 10. Pixel-value update processing starts when the upper-layer image input from the selector 5 is stored in the upper-layer image memory 21 in the pixel-value update circuit 6.

Figure 11A:
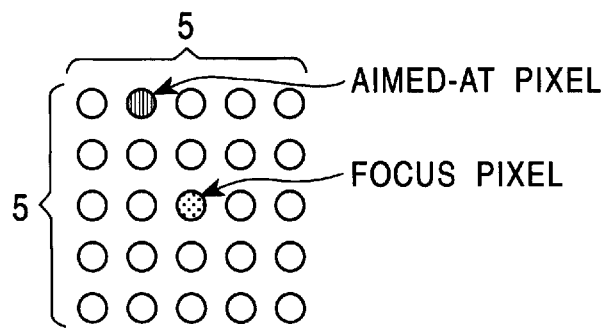
FIGS. 11A to 11C are views showing pixel arrangements.
Figure 11B:
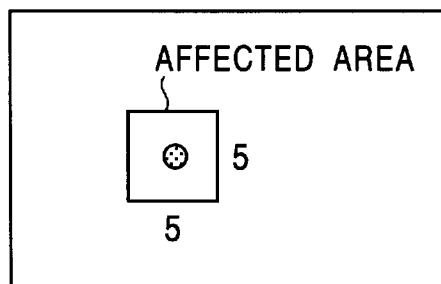
Figure 11C:
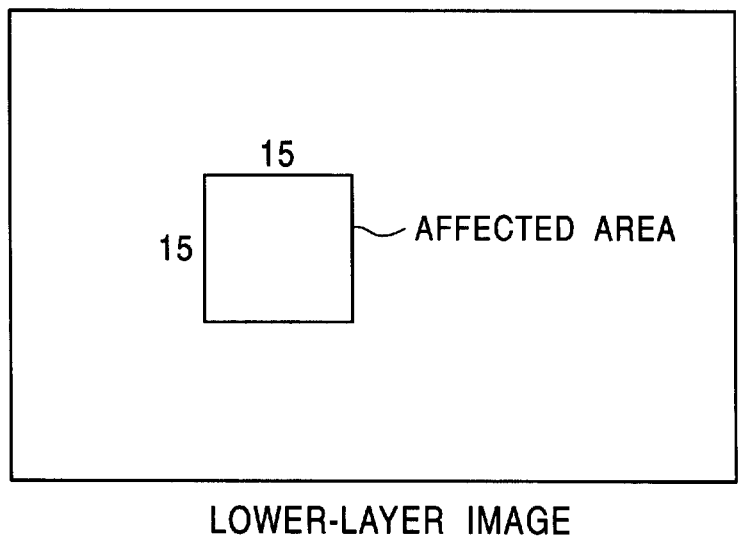

In a step S51, the focus-pixel determination circuit 23 determines a focus pixel in the upper-layer image as shown in FIG. 11A, and outputs the position information of the focus pixel to the more-appropriate pixel-value determination circuit 22. The aimed-at-pixel determination a circuit 31 in the more-appropriate pixel-value determination circuit 22 determines an area (affected area) which is affected when the pixel value of the focus pixel is changed, in a step S52. When prediction taps have five by five pixels, for example, an area having five by five pixels with the focus pixel disposed at the center is set to the affected area, as shown in FIG. 11B. In a lower-layer image generated from the upper-layer image, an area having 15 by 15 pixels serves as the affected area, as shown in FIG. 11C.

In a step S53, the aimed-at-pixel determination circuit 31 sets one pixel in the affected area to an aimed-at pixel, and outputs the position information of the pixel to the class-code reading circuit 32 and to the prediction-tap extraction circuit 33.

In a step S54, the class-code reading circuit 32 reads the class code (the lower four bits at the LSB side of the pixel data) of the aimed-at pixel, and outputs it to the error-function generation circuit 34. The prediction-tap extraction circuit 33 extracts the five-by-five-pixel prediction taps having the focus pixel at the center, and outputs them to the error-function generation circuit 34. The prediction taps include the aimed-at pixel.

In a step S55, the error-function generation circuit 34 generates an error function for the aimed-at pixel, and outputs it to the affected-error-function register 35.

An error function will be described below. The pixel values (predicted values) y'$_i$ (i=1, 2, . . . , and 9, which is different from "i" used in pixel "i" in FIG. 5) of the three-by-three, nine, pixels (for example, pixels "a" to "i" in the lower-layer image shown in FIG. 5) corresponding to one aimed-at pixel (for example, the focus pixel of the upper-layer image shown in FIG. 5) of the upper-layer image can be expressed with a liner combination of prediction coefficients "w" and the pixel values "x" of the upper-layer image as shown below by expression (1). A high-order expression can be used instead of the linear combination.

$$y'_i = w_{i1} \cdot x_1 + w_{i2} \cdot x_2 + \cdots + w_{ik} \cdot x_k + \cdots + w_{i25} \cdot x_{25} = \sum_{j=1}^{25} w_{ij} \cdot x_j \quad (1)$$

In this expression, W$_{i1}$ to W$_{i25}$ indicate the prediction coefficients corresponding to the class code of the aimed-at pixel, and x$_1$ to x$_{25}$ indicate the pixel values of the pixels contained in the prediction taps, which have the aimed-at pixel at the center. Among these, a pixel value x$_k$ and a prediction coefficient W$_{ik}$ show the pixel value of the focus pixel and the corresponding prediction coefficient.

The sum E$_k$ of the square errors of the nine pixels in the lower-layer image corresponding to the aimed-at pixel can be expressed by the following expression (2) where y$_i$ indicates the pixel value (true value) of the original image corresponding to a pixel value (predicted value) y'$_i$ of the lower-layer image.

$$E_k = \sum_{i=1}^{9} (y_i - y'_i)^2 = \sum_{i=1}^{9} \left( \left( y_i - \sum_{j=1}^{25(j \neq k)} w_{ij} \cdot x_i \right) - w_{ik} \cdot x_k \right)^2 \quad (2)$$

In the expression (2), the pixel value x$_k$ of the focus pixel is set to a more appropriate value, namely, is a variable, whereas the true value y$_i$, prediction coefficients w$_{ij}$ and w$_{ik}$, and a pixel value x$_j$ are constants. Therefore, the expression (2) can be expressed by the following expression (3) as a second-order expression of the pixel value x$_k$ of the focus pixel.

$$E_k = a_k(x_k)^2 + b_k x_k + c_k \quad (3)$$

where, $$a_k = \sum_{i=1}^{9} w_{ik}^2$$

$$b_k = -\sum_{i=1}^{9} 2 \cdot w_{ik} \cdot \left( y_i - \sum_{j=1}^{25(j \neq k)} w_{ij} \cdot x_i \right)$$

$$c_k = \sum_{i=1}^{9} \left( y_i - \sum_{j=1}^{25(j \neq k)} w_{ji} \cdot x_i \right)^2$$

Hereinafter, E$_k$ is called an error function.

Figure 10:
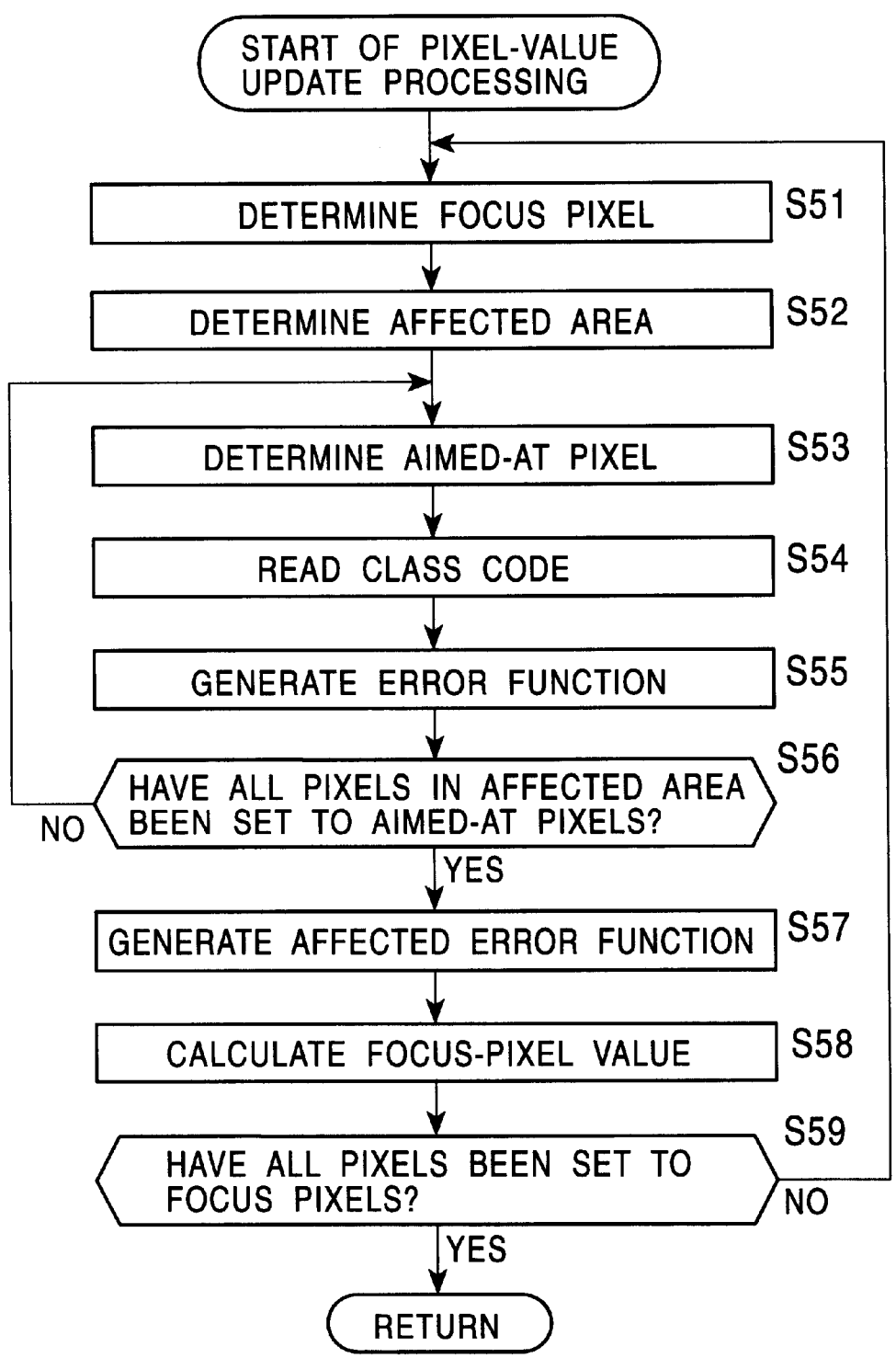
FIG. 10 is a flowchart of the operation of the pixel-value update circuit 6 shown in FIG. 8.

Back to FIG. 10, In a step S56, the aimed-at-pixel determination circuit 31 determines whether all pixels in the affected area have been set to aimed-at pixels. When it is determined that all the pixels in the affected area have not yet been set to aimed-at pixels, the procedure returns to the step S53, and the subsequent processes are repeated.

When it is determined in the step S56 that all the pixels in the affected area have been set to aimed-at pixels, the procedure proceeds to a step S57. In the step S57, the aimed-at-pixel determination circuit 31 outputs a control signal to turn on the switch 36. The affected-error-function register 35 sequentially adds up the error function E$_k$ (expression (3)) obtained for an aimed-at pixel to which each pixel in the affected area is set, to generate an affected error function E$_{check}$, and outputs it to the focus-pixel-value calculation circuit 37 through the switch 36.

$$E_{check} = \sum_{k^p=1}^{25} E_k$$

Since the affected error function E$_{check}$ is the sum of the error functions E$_k$, each of which is a second-order expression of the pixel value x$_k$ of the focus pixel, the affected error function can be expressed by the following expression (4) as a second-order expression of the pixel value x$_k$ of the focus pixel.

$$E_{check} = a'(x_k)^2 + b' x_k + c' \quad (4)$$

where, $$a' = \sum_{k^a=1}^{25} a_k$$

$$b' = \sum_{k^b=1}^{25} b_k$$

$$c' = \sum_{k^c=1}^{25} c_k$$

In a step S58, the focus-pixel-value calculation circuit 37 calculates a pixel value xk=−b'/2a', which makes the second-order affected error function E$_{check}$ minimum, as a more appropriate pixel value of the focus pixel, and outputs it to the upper-layer image memory 21. The upper-layer image memory 21 uses the input more-appropriate pixel value to update the stored pixel value of the focus pixel. In other words, the pixel value of the focus pixel, which has been stored so far, is replaced with the input more-appropriate pixel value.

In a step S59, the focus-pixel determination circuit 23 determines whether all pixels in the upper-layer image have already been set to focus pixels. When it is determined that all the pixels have not yet been set to focus pixels, the procedure returns to the step S51, and the subsequent processes are repeated.

When it is determined in the step S59 that all the pixels in the upper-layer image have already been set to focus pixels, the focus-pixel determination circuit 23 outputs a control signal to turn on the switch 24. When the switch 24 is turned on, the upper-layer image in which pixel values have been made more appropriate, stored in the upper-layer image memory 21, is output to the upper-layer image memory 3, located at a subsequent stage. When the processing in the pixel-value update circuit 6 has been finished, the update-count counter 11 outputs a control signal to the selector 5.

Back to FIG. 2, when the pixel-value update processing is finished in the step S5 as described above, the upper-layer image input from the upper-layer image memory 3 to the selector 5 is sent to the prediction-coefficient update circuit 7 in response to the control signal sent from the update-count counter 11, in a step S6. The prediction-coefficient update circuit 7 uses the input upper-layer image and the input original image to update the prediction-coefficient table to be stored in the prediction-coefficient memory 4.

Figure 12:
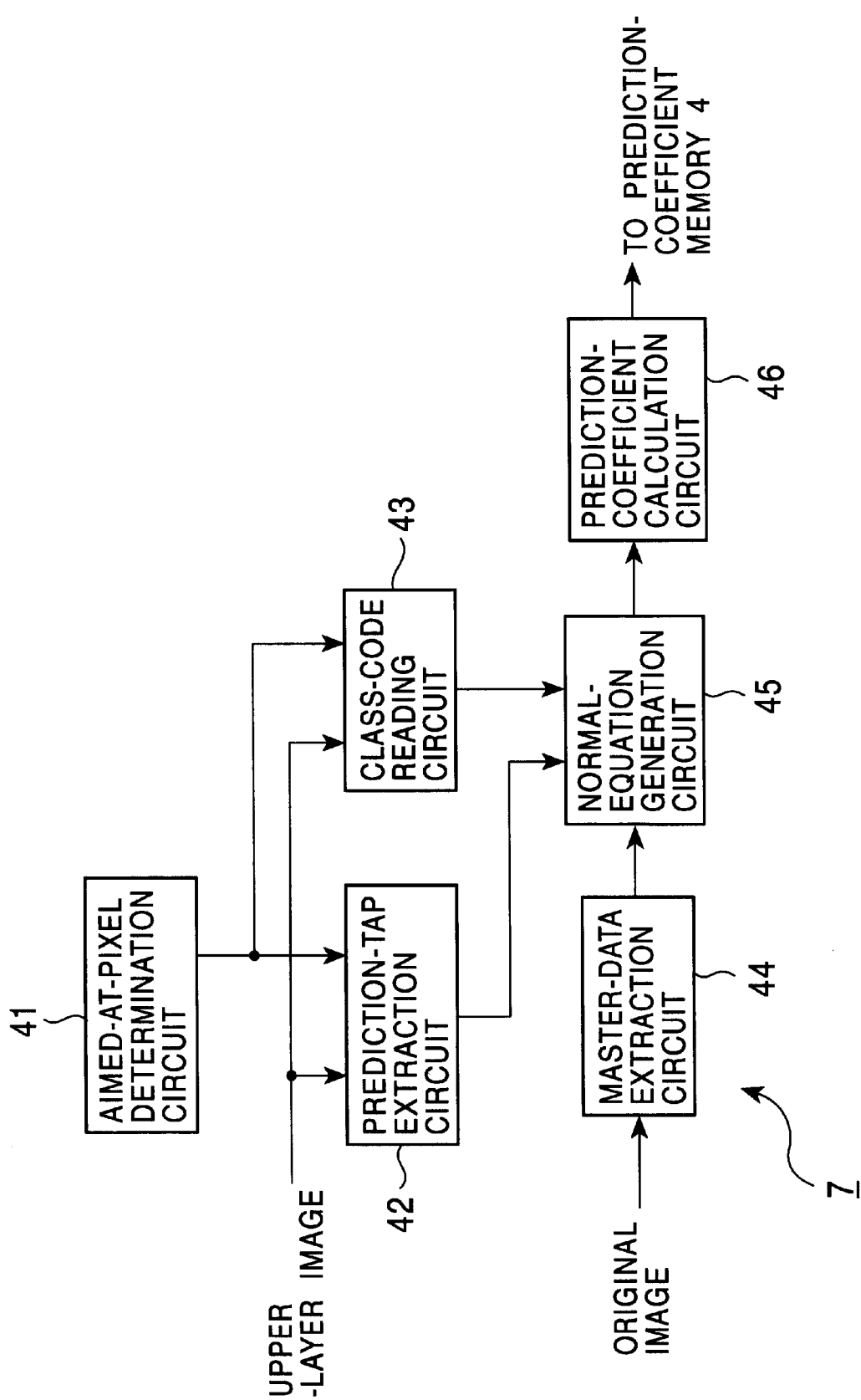
FIG. 12 is a block diagram of an example structure of a prediction-coefficient update circuit 7 shown in FIG. 1.

Before prediction-coefficient update processing is described, a detailed example structure of the prediction-coefficient update circuit 7 will be described below by referring to FIG. 12. In the prediction-coefficient update circuit 7, the upper-layer image input from the selector 5 is sent to a prediction-tap extraction circuit 42 and to a class-code reading circuit 43. An aimed-at-pixel determination circuit 41 sequentially sets pixels in the upper-layer image to aimed-at pixels, and outputs the corresponding position information to the prediction-tap extraction circuit 42 and to the class-code reading circuit 43.

The prediction-tap extraction circuit 42 extracts the pixel values (the higher four bits at the MSB side of the pixel data) of five-by-five prediction taps having an aimed-at pixel at the center, and outputs them to a normal-equation generation circuit 45. The class-code reading circuit 43 reads the class code (the lower four bits at the LSB side of the pixel data) of the aimed-at pixel, and outputs it to the normal-equation generation circuit 45.

A master-data extraction circuit 44 extracts master data (true data corresponding to pixel values in the lower-layer image) from the original image, and outputs it to the normal-equation generation circuit 45. The normal-equation generation circuit 45 generates a normal equation formed of the master data and the pixel values of the prediction taps, which are known, and prediction coefficients serving as variables, for the class code of each aimed-at pixel, and outputs it to a prediction-coefficient calculation circuit 46.

The prediction-coefficient calculation circuit 46 applies the least squares method to the input normal equation to obtain the prediction-coefficient set corresponding to each of the 16-type class codes, and outputs to the prediction-coefficient memory 4.

In this case, since nine pixels in the original image correspond to each aimed-at pixel in the upper-layer image, the original image has nine types of positional relationships with each aimed-at pixel for each class code. Therefore, a prediction-coefficient set is required for each positional relationship and nine (nine-mode) prediction-coefficient sets are obtained.

Figure 13:
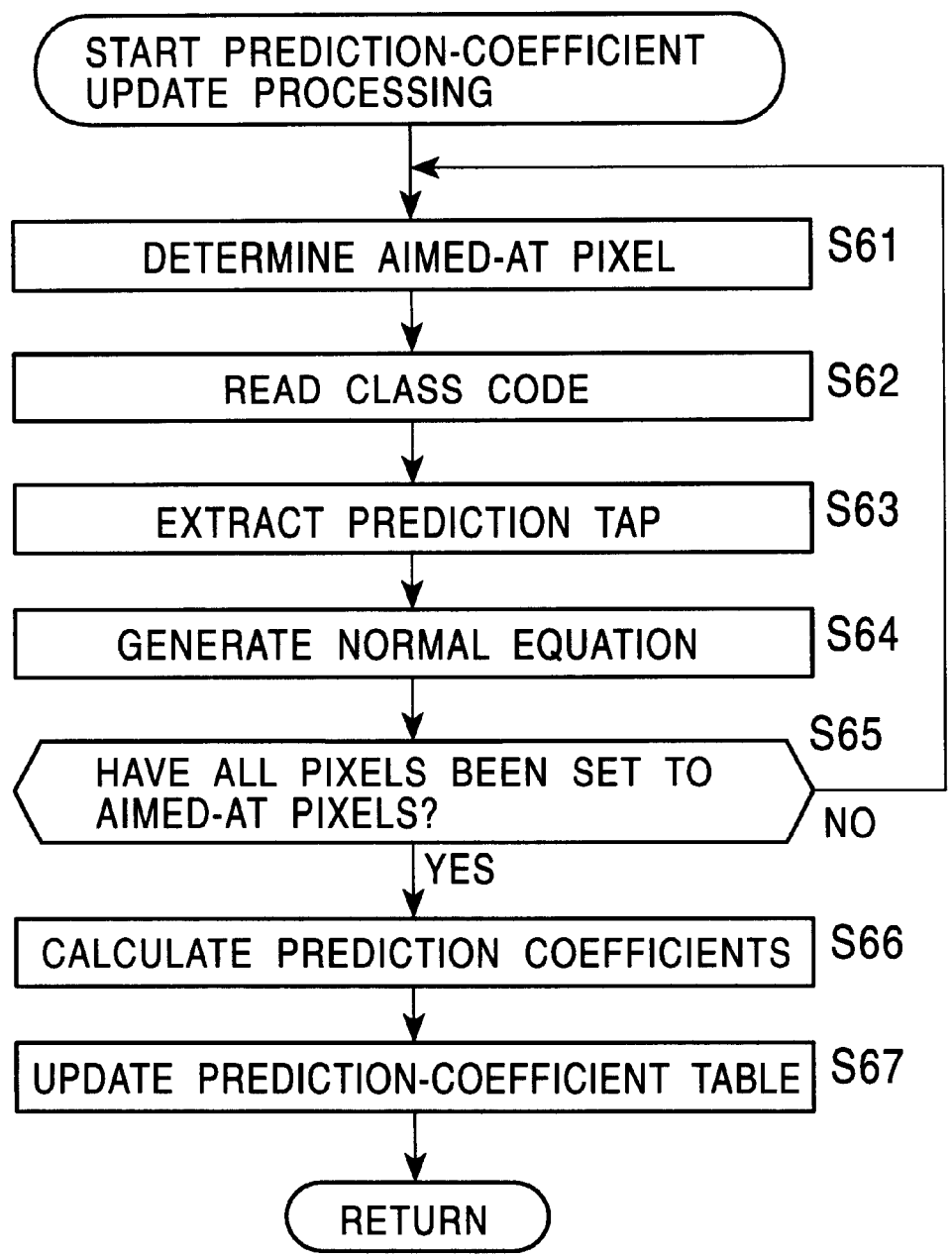
FIG. 13 is a flowchart of the operation of the prediction-coefficient update circuit 7 shown in FIG. 12.

The operation of the prediction-coefficient update circuit 7 will be described next by referring to a flowchart shown in FIG. 13. Prediction-coefficient update processing starts when the upper-layer image is input from the selector 5 to the prediction-coefficient update circuit 7.

In a step S61, the aimed-at-pixel determination circuit 41 sets one pixel in the upper-layer image to an aimed-at pixel, and outputs the position information of the aimed-at pixel to the prediction-tap extraction circuit 42 and to the class-code reading circuit 43.

In a step S62, the class-code reading circuit 43 reads the class code (the lower four bits at the LSB side of the pixel data) of the aimed-at pixel, and outputs it to the normal-equation generation circuit 45. In a step S63, the prediction-tap extraction circuit 42 extracts the pixel values (the higher four bits at the MSB side of the pixel data) of the five-by-five prediction taps having the aimed-at pixel at the center, and outputs them to the normal-equation generation circuit 45.

In a step S64, the normal-equation generation circuit 45 generates a normal equation formed of the master data and the pixel values of the prediction taps, which are known, for the class code of each aimed-at pixel, and outputs it to the prediction-coefficient calculation circuit 46.

In a step S65, the aimed-at-pixel determination circuit 41 determines whether all pixels in the upper-layer image have been set to aimed-at pixels. When it is determined that all the pixels have not yet been set to aimed-at pixels, the procedure returns to the step S61 and the subsequent processes are repeated. When it is determined in the step S65 that all pixels have already been set to aimed-at pixels, the procedure proceeds to a step S66.

In the step S66, the prediction-coefficient calculation circuit 46 applies the least squares method to the normal equation generated by the normal-equation generation circuit 45 to obtain the prediction-coefficient set corresponding to each of the 16-type class codes. In a step S67, the prediction-coefficient calculation circuit 46 outputs the obtained prediction-coefficient sets (prediction-coefficient table) to the prediction-coefficient memory 4. The prediction-coefficient memory 4 updates the stored prediction-coefficient table by the use of the input prediction-coefficient table. When the processing of the prediction-coefficient update circuit 7 has finished, the update-count counter 11 outputs a control signal to the selector 5.

Back to FIG. 2, when the prediction-coefficient update processing has been executed in the step S6, the procedure returns to the step S2. In the step S2, the upper-layer image input from the upper-layer image memory 3 to the selector 5 is sent to the class-code selection circuit 8 in response to the control signal sent from the update-count counter 11. The class-code selection circuit 8 selects the prediction-coefficient set corresponding to each pixel in the input upper-layer image among the 16 types of prediction-coefficient sets stored in the prediction-coefficient memory 4.

Figure 14:
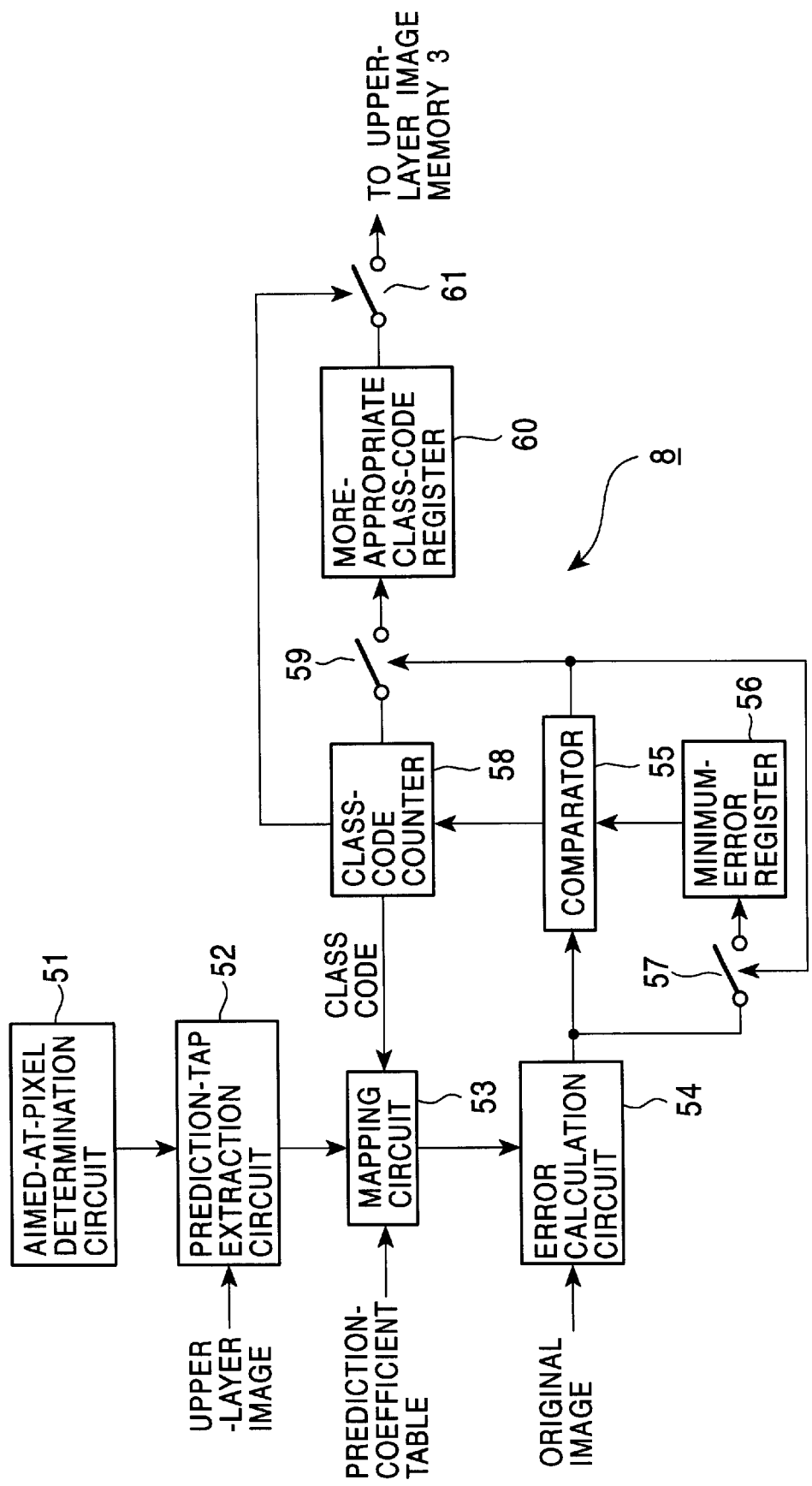
FIG. 14 is a block diagram of an example structure of a class-code selection circuit 8 shown in FIG. 1.

Before the class-code selection processing is described, a detailed example structure of the class-code selection circuit 8 will be described below by referring to FIG. 14. An aimed-at-pixel determination circuit 51 sequentially sets pixels in the upper-layer image to aimed-at pixels, and outputs the corresponding information to a prediction-tap extraction circuit 52. The prediction-tap extraction circuit 52 extracts the pixel values (the higher four bits at the MSB side of the pixel data) of the pixels contained in five-by-five-pixel prediction taps having an aimed-at pixel at the center, from the upper-layer image input from the selector 5, and outputs them to a mapping circuit 53.

The mapping circuit 53 reads the prediction-coefficient set corresponding to the class code input from a class-code counter 58, calculates a linear combination of the read prediction-coefficient set and the pixel value of each pixel in the prediction taps, and outputs the calculation result to an error calculation circuit 54 as pixel values (predicted values) in the lower-layer image.

The error calculation circuit 54 calculates an error (s/n ratio) of the predicted values input from the mapping circuit 53 against the pixel values (true values) of the corresponding original image, and outputs it to a comparator 55 and to a switch 57. The comparator 55 compares the error input from the error calculation circuit 54 with an error input from a minimum-error register 56, and outputs a control signal to turn on the switch 57 and a switch 59 when the error input from the error calculation circuit 54 is smaller (the s/n ratio is higher). The comparator 55 outputs a control signal to increment the count of the class-code counter 58 after the errors are compared, irrespective of the result of the comparison.

The minimum-error register 56 sends the stored error value to the comparator 55. The minimum-error register 56 also updates the stored value by the use of a value input through the switch 57. In other words, the value which has been so far stored is replaced with an input value.

The class-code counter 58 is a four-bit counter and outputs the count to the mapping circuit 53 and to the switch 59 as a class code (0000 to 1111). The count (class code) is incremented by 1 in response to the control signal input from the comparator 55. The class-code counter 58 outputs a control signal to turn on a switch 61 and resets the count to 0000 when the count reaches 1111.

A more-appropriate class-code register 60 replaces the class code which has been so far stored with a class code input through the switch 59. Therefore, the more-appropriate class-code register 60 holds the more-appropriate class code corresponding to the prediction-coefficient set which produces the minimum error. The more-appropriate class-code register 60 outputs the more-appropriate class code of the aimed-at pixel to the upper-layer image memory 3 in a subsequent stage through the switch 61.

Figure 15:
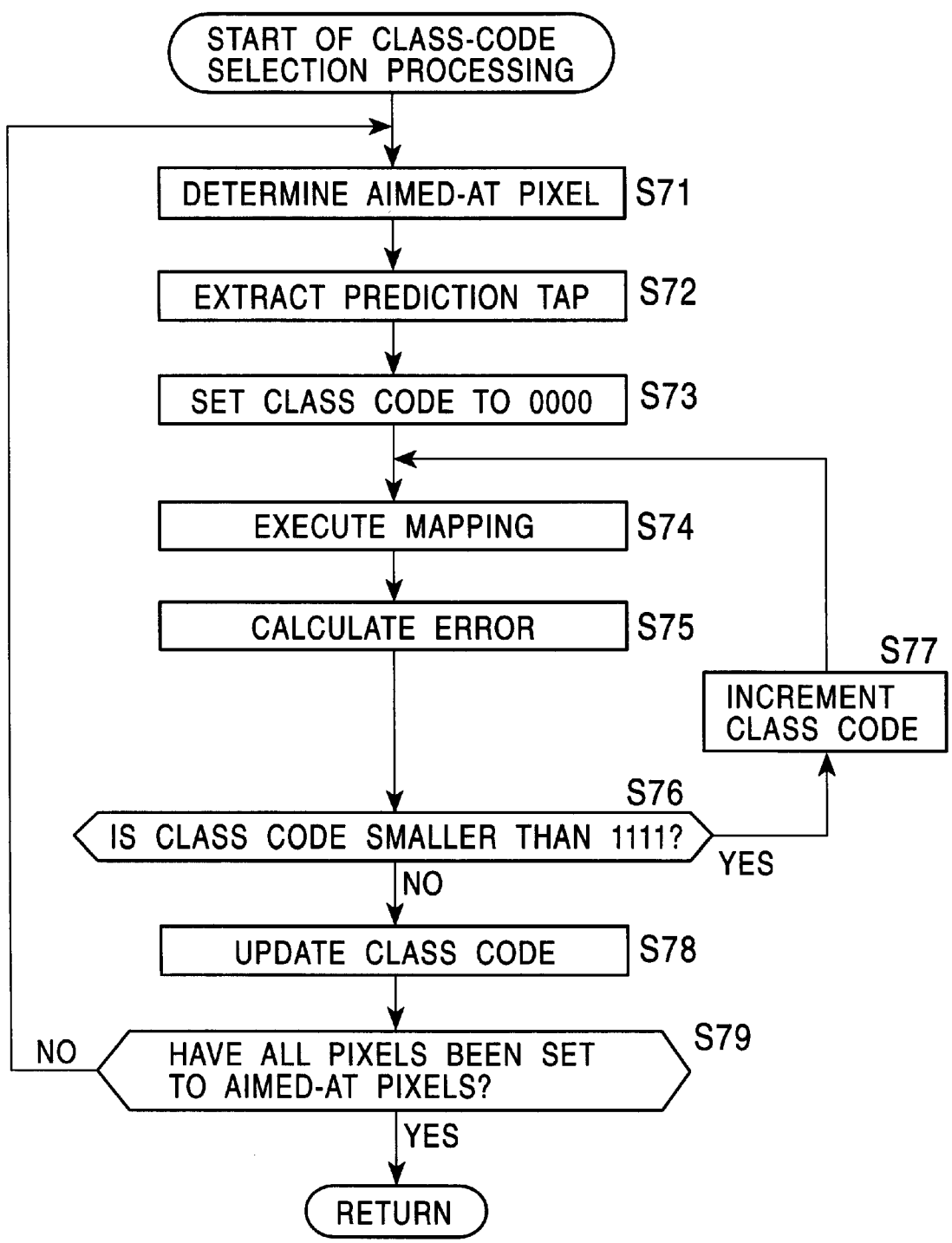
FIG. 15 is a flowchart of the operation of the class-code selection circuit 8 shown in FIG. 14.

The operation of the class-code selection circuit 8 will be described below by referring to a flowchart shown in FIG. 15. The class-code selection processing starts when the upper-layer image is input from the selector 5 to the class-code selection circuit 8.

In a step S71, the aimed-at-pixel determination circuit 51 sets one pixel in the upper-layer image to an aimed-at pixel, and outputs the information of the aimed-at pixel to the prediction-tap extraction circuit 52. In a step S72, the prediction-tap extraction circuit 52 extracts the pixel values of the pixels contained in five-by-five-pixel prediction taps having the aimed-at pixel at the center, from the upper-layer image input from the selector 5, and outputs them to the mapping circuit 53.

In a step S73, the class-code counter 58 outputs a count of 0000 to the mapping circuit 53 as a class code. In a step S74, the mapping circuit 53 reads the prediction-coefficient set corresponding to the class code input from the class-code counter 58, from the prediction-coefficient memory 4, calculates a linear combination of each prediction coefficient of the read prediction-coefficient set and the pixel value of each pixel in the prediction taps, and outputs the calculation result to the error calculation circuit 54 as a pixel value (predicted value) in the lower-layer image.

In a step S75, the error calculation circuit 54 calculates an error (s/n ratio) of the predicted value input from the mapping circuit 53 against the pixel value (true value) of the corresponding original image, and outputs the result to the comparator 55 and to the switch 57. The comparator 55 compares the error input from the error calculation circuit 54 with an error input from the minimum-error register 56, and outputs a control signal to turn on the switches 57 and 59 when the error input from the error calculation circuit 54 is smaller (the s/n ratio is higher). With this operation, the current count of the class-code counter 58 is sent to the more-appropriate class-code register 60 through the switch 59, and stored. The current output of the error calculation circuit 54 is also sent to the minimum-error register 56 and stored. The comparator 55 also outputs a control signal to the class-code counter 58.

In a step S76, the class-code counter 58 determines whether the count (class code) is smaller than 1111. When the count is smaller than 1111, the count is incremented by 1, and the count is output to the mapping circuit 53 and to the switch 59 as a class code in a step S77.

Until it is determined in the step S76 that the count is not smaller than 1111, the processes from the step S74 to the step S77 are repeated. When it is determined in the step S76 that the count is not smaller than 1111 (actually, the count is 1111), the procedure proceeds to a step S78.

In the step S78, the class-code counter 58 outputs a control signal to turn on the switch 61 and resets the count to 0000. In response to this control signal, the switch 61 is turned on, and the more-appropriate class code of the aimed-at pixel held by the more-appropriate class-code register 60 is output to the upper-layer image memory 3 in a subsequent stage. The upper-layer image memory 3 uses the input more-appropriate class code to update the lower four bits at the LSB side of the pixel data of the corresponding pixel.

In a step S79, the aimed-at-pixel determination circuit 51 determines whether all pixels in the upper-layer image have already been set to aimed-at pixels. Until it is determined that all the pixels have been set to aimed-at pixels, the processes from the step S71 to the step S79 are repeated. When it is determined in the step S79 that all the pixels have already been set to aimed-at pixels, the procedure returns to the step S3 in FIG. 2.

Figure 16:
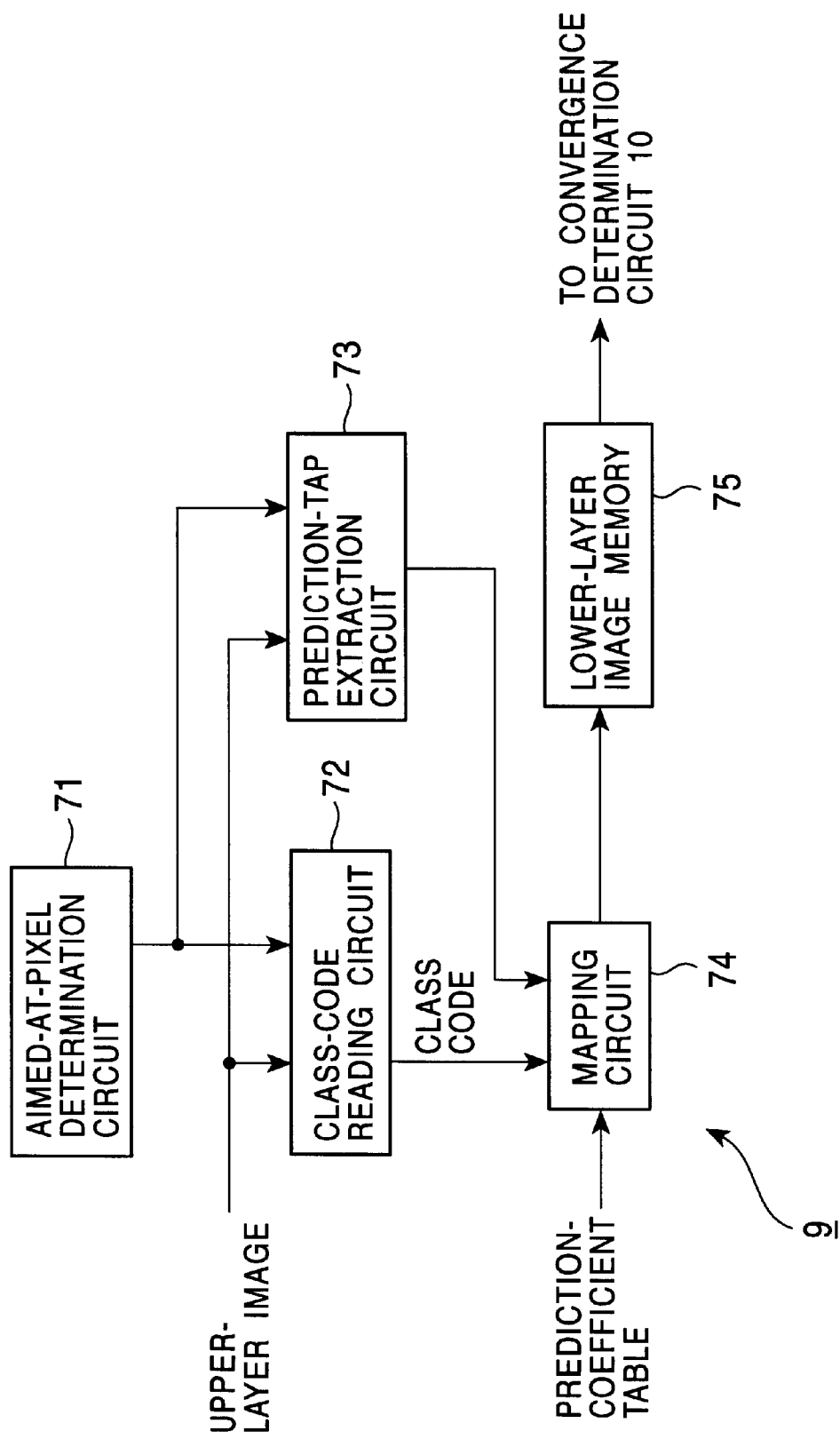
FIG. 16 is a block diagram of an example structure of a local decoding circuit 9 shown in FIG. 1.

Before the decoding in the step S3 is described, a detailed example structure of the local decoding circuit 9 will be described below by referring to FIG. 16. An aimed-at-pixel determination circuit 71 sequentially sets pixels in the upper-layer image to aimed-at pixels, and outputs the corresponding information to a class-code reading circuit 72 and to a prediction-tap extraction circuit 73. The class-code reading circuit 72 reads the class code (the lower four bits at the LSB side of the pixel data) of an aimed-at pixel from the upper-layer image input from the selector 5, and outputs it to a mapping circuit 74. The prediction-tap extraction circuit 73 extracts the pixel values (the higher four bits at the MSB side of the pixel data) of the pixels contained in five-by-five-pixel prediction taps having the aimed-at pixel at the center, from the upper-layer image input from the selector 5, and outputs them to the mapping circuit 74.

The mapping circuit 74 reads the prediction-coefficient set corresponding to the class code input from the class-code reading circuit 72, from the prediction-coefficient memory 4, calculates a liner combination of each prediction coefficient of the read prediction-coefficient set and the pixel value of each pixel contained in the prediction taps sent from the prediction-tap extraction circuit 73, and outputs the calculation result to a lower-layer image memory 75 as a pixel value in the lower-layer image.

The lower-layer image memory 75 stores the pixel value of the lower-layer image, input from the mapping circuit 74, and outputs stored pixel values for one frame to the convergence determination circuit 10 at a subsequent stage.

Figure 17:
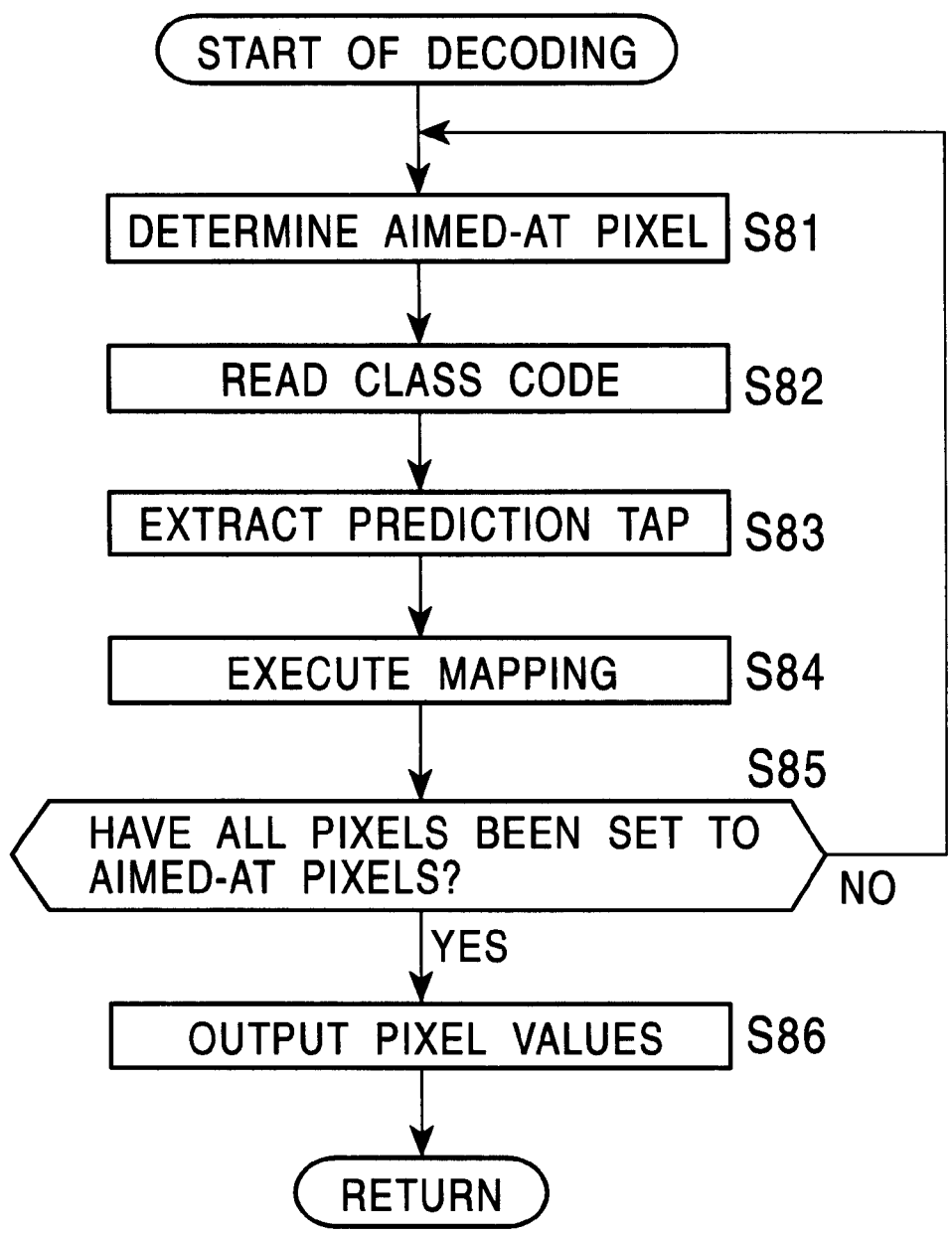
FIG. 17 is a flowchart of the operation of the local decoding circuit 9 shown in FIG. 16.

The decoding processing to be performed by the local decoding circuit 9 will be described below by referring to a flowchart shown in FIG. 17. This decoding processing starts when the upper-layer image is input from the selector 5 to the local decoding circuit 9.

In a step S81, the aimed-at-pixel determination circuit 71 sets one pixel in the upper-layer image to an aimed-at pixel, and outputs the information of the aimed-at pixel to the class-code reading circuit 72 and to the prediction-tap extraction circuit 73. In a step S82, the class-code reading circuit 72 reads the class code (the lower four bits at the LSB side of the pixel data) of the aimed-at pixel from the upper-layer image input from the selector 5, and outputs it to the mapping circuit 74. In a step S83, the prediction-tap extraction circuit 73 extracts the pixel values (the higher four bits at the MSB side of the pixel data) of the pixels contained in five-by-five-pixel prediction taps having the aimed-at pixel at the center, from the upper-layer image input from the selector 5, and outputs them to the mapping circuit 74.

In a step S84, the mapping circuit 74 reads the prediction-coefficient set corresponding to the class code input from the class-code reading circuit 72, from the prediction-coefficient memory 4, calculates a linear combination of each prediction coefficient of the read prediction-coefficient set and the pixel value of each pixel in the prediction taps sent from the prediction-tap extraction circuit 73, and outputs the calculation result to the lower-layer image memory 75 as a pixel value in the lower-layer image.

In a step S85, the aimed-at-pixel determination circuit 71 determines whether all pixels in the upper-layer image have been set to aimed-at pixels. When it is determined that all the pixels have not yet been set to aimed-at pixels, the procedure returns to the step S81 and the subsequent processes are repeated. When it is determined in the step S85 that all pixels have already been set to aimed-at pixels, pixel values of the lower-layer image are output in units of frames from the lower-layer image memory 75 to the convergence determination circuit 10 in a subsequent stage.

Back to FIG. 2, in the step S4 again, the convergence determination circuit 10 calculates the s/n ratio of the lower-layer image input from the local decoding circuit 9 to the original image, obtains the increase between the s/n ratio and that calculated at the previous time, and determines whether the s/n-ratio increase converges. Until the convergence determination circuit 10 determines that the s/n-ratio increase converges, or until it receives a control signal from the update-count counter 11, the processes from the step S2 to the step S6 are repeated.

In the step S4, when it is determined that the s/n-ratio increase converges, or when it receives a control signal from the update-count counter 11, the procedure proceeds to the step S7. In the step S7, the convergence determination circuit 10 outputs the upper-layer image and the prediction-coefficient table to a decoder 81 (shown in FIG. 18) through a medium not shown.

As described above, the encoder 1 uses the higher four bits at the MSB side of pixel data (having eight bits) in the upper-layer image as a pixel value and the lower four bits at the LSB side as a class code, links them, and updates them independently. With this operation, while either of the pixel value or the class code is made more appropriate, the other factor does not change. Therefore both factors can be made more appropriate independently.

In the encoder according to the present embodiment, pixel data of the upper-layer image is divided into the higher four bits at the MSB side and the lower four bits at the LSB side, and they serve as a pixel value and a class code. The present invention is not limited to this case. The present invention can be applied to a case in which all eight bits of pixel data in the upper-layer image serve as a pixel value and the corresponding class code is linked to the pixel value and stored at a different place.

In encoding shown in FIG. 2, the step S2 performed at the first time, namely, the class-code selection processing performed immediately after pre-processing shown in FIG. 1, may be omitted. In this case, the result of convergence determination performed in the step S4 at the first time, that is, the s/n ratio of the upper-layer image to which only pre-processing of the step S1 has been applied, to the original image, becomes better than the s/n ratio of the initial upper-layer image to the original image in an encoder proposed (in Unexamined Japanese Patent Publication No. Hei-8-206552) by the assignee of the present invention. The pixel-value update circuit 6 may be eliminated from the encoder 1 shown in FIG. 1 with the pixel-value update processing shown in the step S5 of FIG. 2 being omitted. In other words, even when pixel values (the higher four bits at the MSB side of the pixel data) in the upper-layer image are not updated, and only the prediction-coefficient update processing and the class-code selection processing are executed, an upper-layer image better than that generated by the encoder proposed before can be generated.

Figure 18:
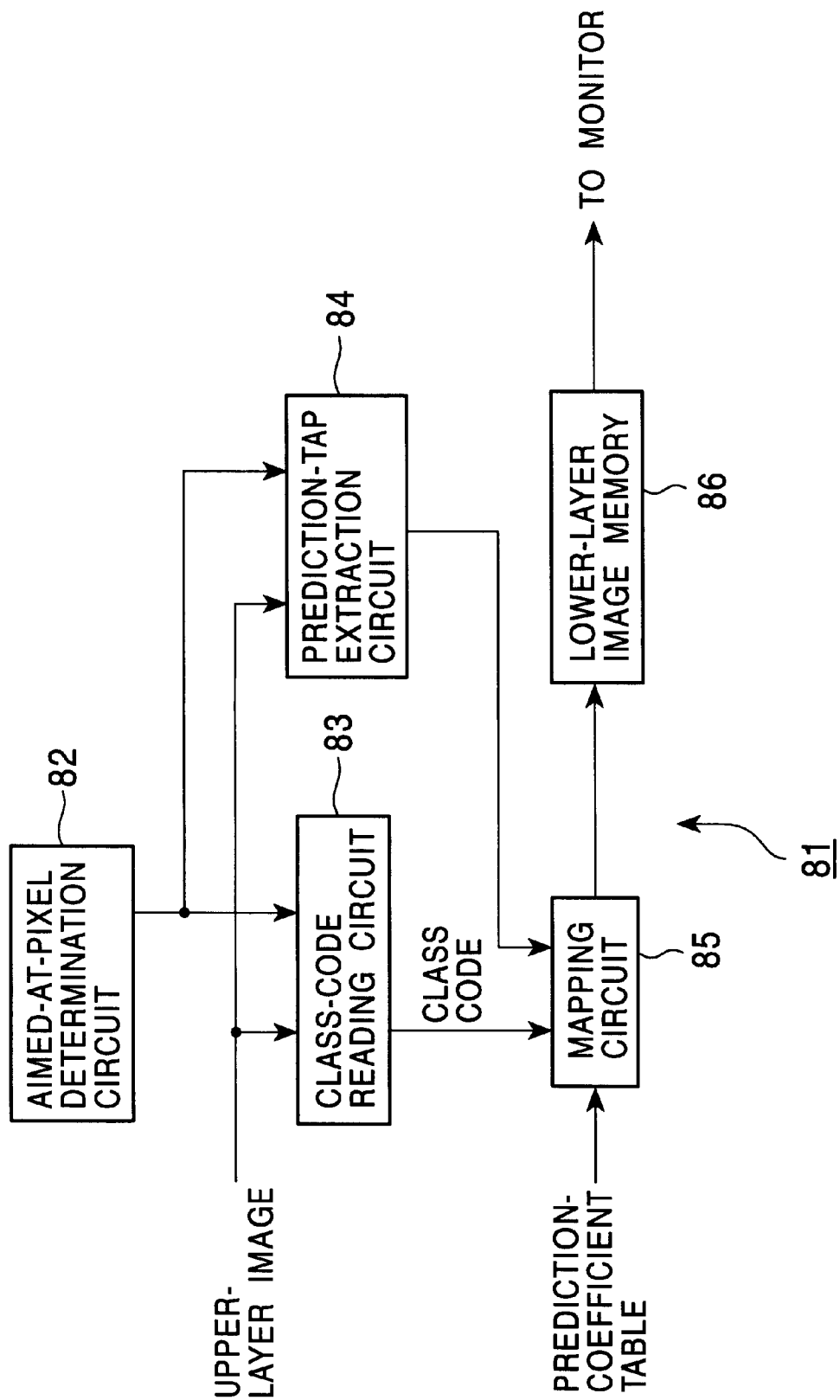
FIG. 18 is a block diagram of an example structure of a decoder 81 corresponding to the encoder 1 shown in FIG. 1.

FIG. 18 shows an example structure of a decoder for recovering the original image (for generating a lower-layer image) from an upper-layer image generated by the encoder 1. In this decoder 81, the upper-layer image sent from the encoder 1 is sent to a class-code reading circuit 83 and to a prediction-tap extraction circuit 84. A prediction-coefficient table is sent to a mapping circuit 85.

An aimed-at-pixel determination circuit 82 sequentially sets pixels in the upper-layer image to aimed-at pixels, and outputs the corresponding position information to the class-code reading circuit 83 and to the prediction-tap extraction circuit 84. The class-code reading circuit 83 reads the class code (the lower four bits at the LSB side of the pixel data) of an aimed-at pixel from the upper-layer image, and outputs it to the mapping circuit 85. The prediction-tap extraction circuit 84 extracts the pixel values (the higher four bits at the MSB side of the pixel data) of the pixels contained in five-by-five-pixel prediction taps having the aimed-at pixel at the center, from the upper-layer image, and outputs them to the mapping circuit 85.

The mapping circuit 85 reads the prediction-coefficient set corresponding to the class code input from the class-code reading circuit 83, from the prediction-coefficient table, calculates a liner combination of each prediction coefficient of the read prediction-coefficient set and the pixel value of each pixel contained in the prediction taps sent from the prediction-tap extraction circuit 84, and outputs the calculation result to a lower-layer image memory 86 as a pixel value in the lower-layer image.

The lower-layer image memory 86 stores the pixel value of the lower-layer image, input from the mapping circuit 85, and outputs stored pixel values, for example, to a monitor not shown.

Figure 19:
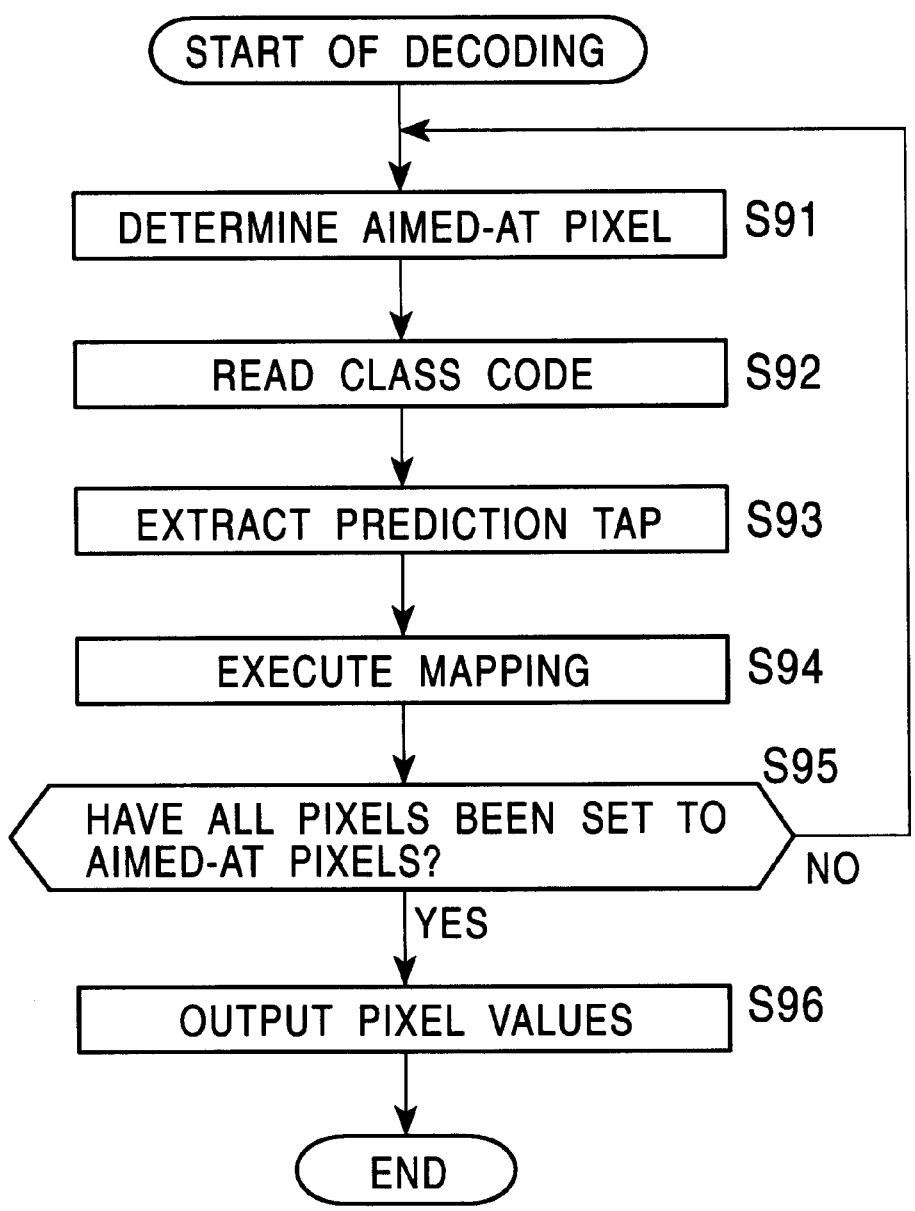
FIG. 19 is a flowchart of the operation of the decoder 81 shown in FIG. 18.

The operation of the decoder 81 will be described below by referring to a flowchart shown in FIG. 19. This decoding processing is applied to sequentially input upper-layer images after the prediction-coefficient table is sent from the encoder 1 to the mapping circuit 85.

The timing when the decoding processing is performed is not limited to this timing. The decoding processing can be performed at any timing after the prediction-coefficient table and the upper-layer images have been received. It is unnecessary to receive the prediction-coefficient table and the upper-layer images by the same method, for example, with the use of the same transmission line and the same recording medium. They can be received by different methods.

In a step S91, the aimed-at-pixel determination circuit 82 sets one pixel in the upper-layer image to an aimed-at pixel, and outputs the position information of the aimed-at pixel to the class-code reading circuit 83 and to the prediction-tap extraction circuit 84. In a step S92, the class-code reading circuit 83 reads the class code (the lower four bits at the LSB side of the pixel data) of the aimed-at pixel from the upper-layer image, and outputs it to the mapping circuit 85.

In a step S93, the prediction-tap extraction circuit 84 extracts the pixel values (the higher four bits at the MSB side of the pixel data) of the pixels contained in five-by-five-pixel prediction taps having the aimed-at pixel at the center, from the input upper-layer image, and outputs them to the mapping circuit 85.

In a step S94, the mapping circuit 85 reads the prediction-coefficient set corresponding to the class code input from the class-code reading circuit 83, from the prediction-coefficient table, calculates a linear combination of each prediction coefficient of the read prediction-coefficient set and the pixel value of each pixel in the prediction taps sent from the prediction-tap extraction circuit 84, and outputs the calculation result to the lower-layer image memory 86 as a pixel value in the lower-layer image.

In the present embodiment, it is clear from the condition in which the number of pixels in the lower-layer image is larger than the number of aimed-at pixels in the upper-layer image that the processing in the step S94 is executed for each of the pixel values of a plurality of pixels in the lower-layer image, corresponding to each aimed-at pixel in the upper-layer image. In other words, a prediction-coefficient set for each of the pixel values of each lower-layer image is used.

In a step S95, the aimed-at-pixel determination circuit 82 determines whether all pixels in the upper-layer image have been set to aimed-at pixels. When it is determined that all the pixels have not yet been set to aimed-at pixels, the procedure returns to the step S91 and the subsequent processes are repeated. When it is determined in the step S95 that all pixels have already been set to aimed-at pixels, pixel values of the lower-layer image are output from the lower-layer image memory 86 to a monitor not shown.

Figure 20:
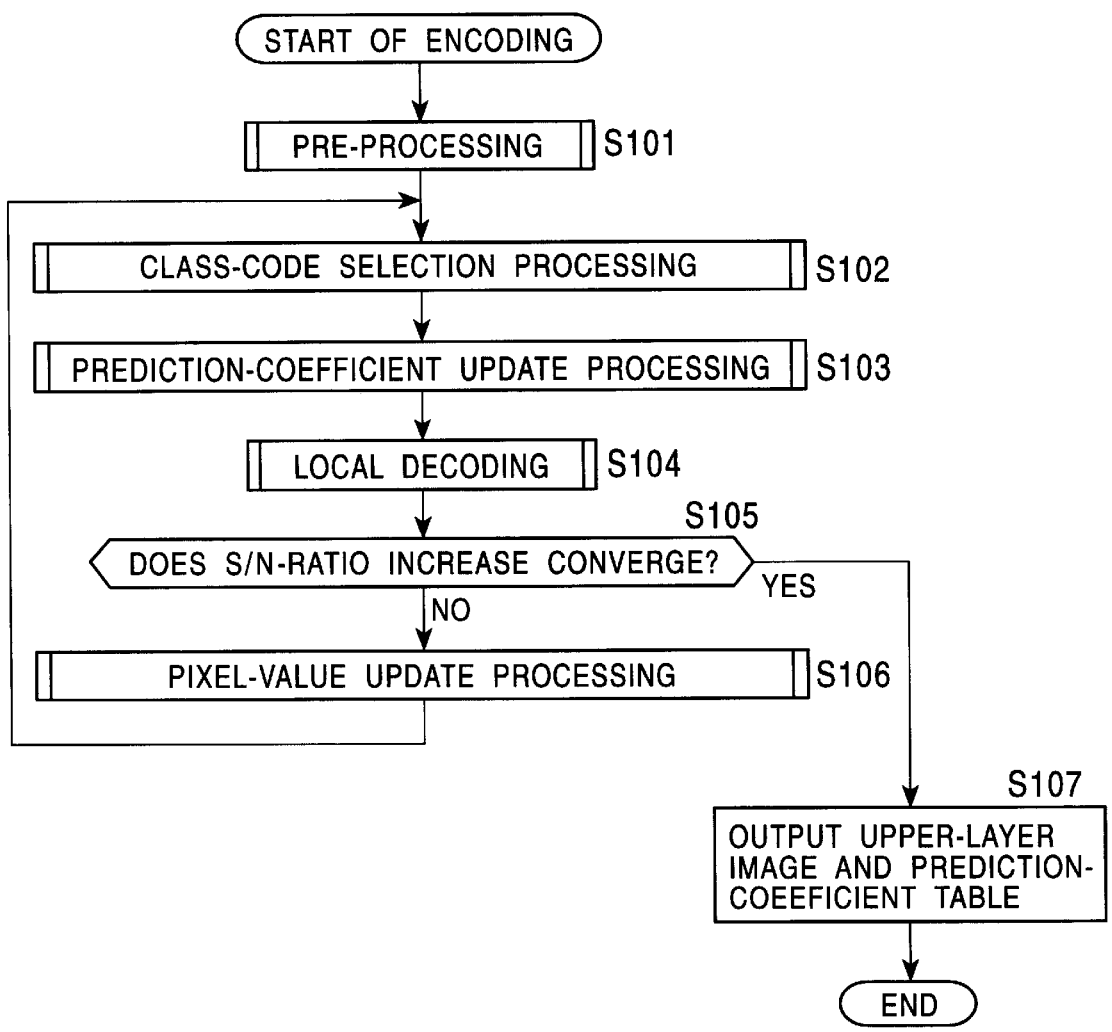
FIG. 20 is a flowchart of another operation of the encoder 1 shown in FIG. 1.

FIG. 20 is a flowchart of the operation of the encoder 1, performed in a different order from that in the encoding processing (shown in FIG. 2) described above. After the pre-processing is executed first, the class-code selection processing is performed, and then the prediction-coefficient update processing is executed.

Since processes in a step S101 to a step S107 shown in FIG. 20 are the same as those in the steps S1, S6, S5, S2, S3, S4, and S7, descriptions thereof will be omitted.

To execute the processes in the order shown in the flowchart of FIG. 20, the selector 5 (shown in FIG. 1) needs to sequentially output the upper-layer image input from the upper-layer image memory 3 to the class-code selection circuit 8, to the prediction-coefficient update circuit 7, to the local decoding circuit 9 and the convergence determination circuit 10, and to the pixel-value update circuit 6, in response to a control signal input from the update-count counter 11.

Figure 21:
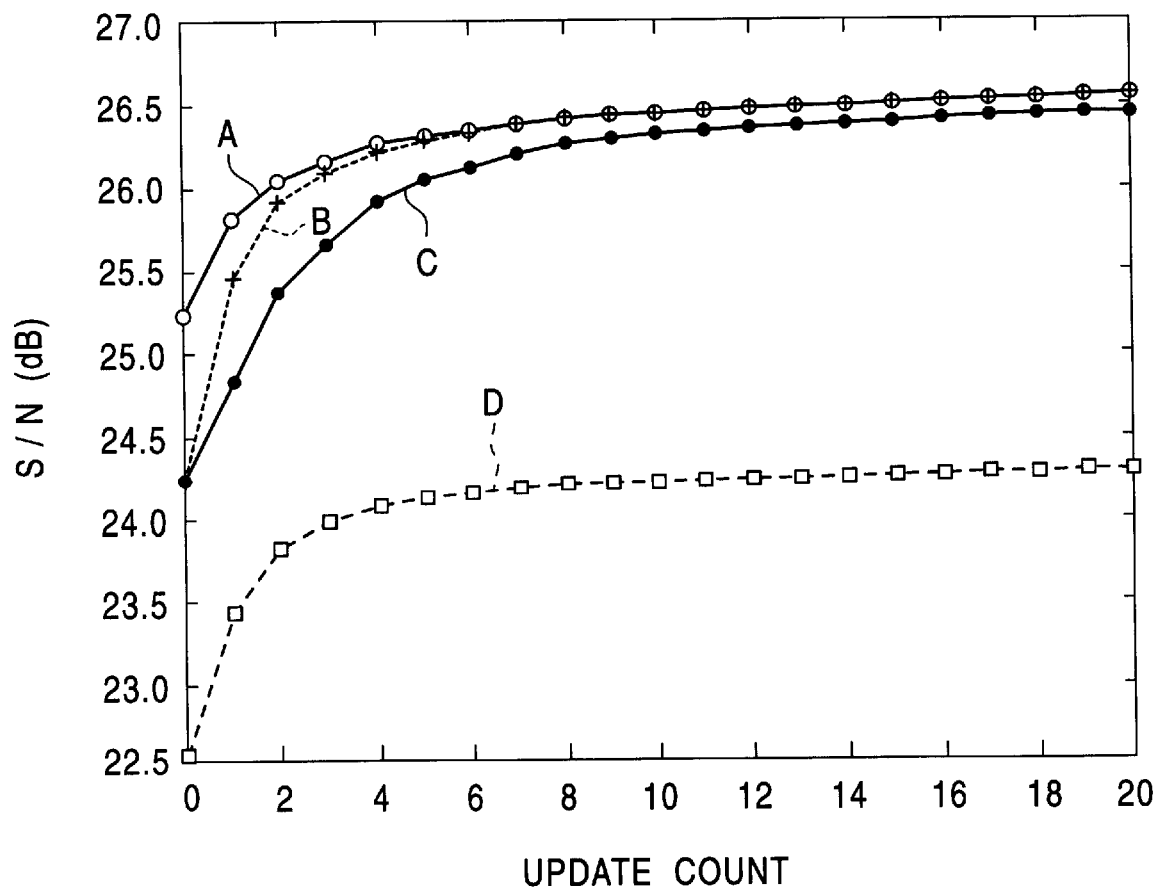
FIG. 21 is a view showing the result of simulation.

FIG. 21 shows the result of simulation in which the s/n ratios of lower-layer images recovered from a plurality of upper-layer images generated from an identical original image to the original image are calculated. The vertical axis indicates the s/n ratio and the horizontal axis indicates the number of times (update count) a series of encoding processing is executed.

In FIG. 21, a curve A indicates the s/n ratio of the lower-layer image recovered from an upper-layer image generated according to the flowchart shown in FIG. 20. A curve B indicates the s/n ratio of the lower-layer image recovered from an upper-layer image generated according to the flowchart shown in FIG. 2. A curve C indicates the s/n ratio of the lower-layer image recovered from an upper-layer image generated according to the flowchart shown in FIG. 20 without executing the pixel-value update processing in the step S4. A curve D indicates the s/n ratio of the lower-layer image recovered from an upper-layer image generated according to the method (disclosed in Unexamined Japanese Patent Publication No. Hei-8-206552) proposed in advance.

It is clear from the curve A that the lower-layer image recovered from the upper-layer image generated according to the flowchart shown in FIG. 20 shows a higher s/n ratio than the other curves, especially at a stage where the update count is small. This means that an upper-layer image which allows a lower-layer image having a desired s/n ratio to be recovered can be generated within a short processing time according to the flowchart shown in FIG. 20.

Figure 22:
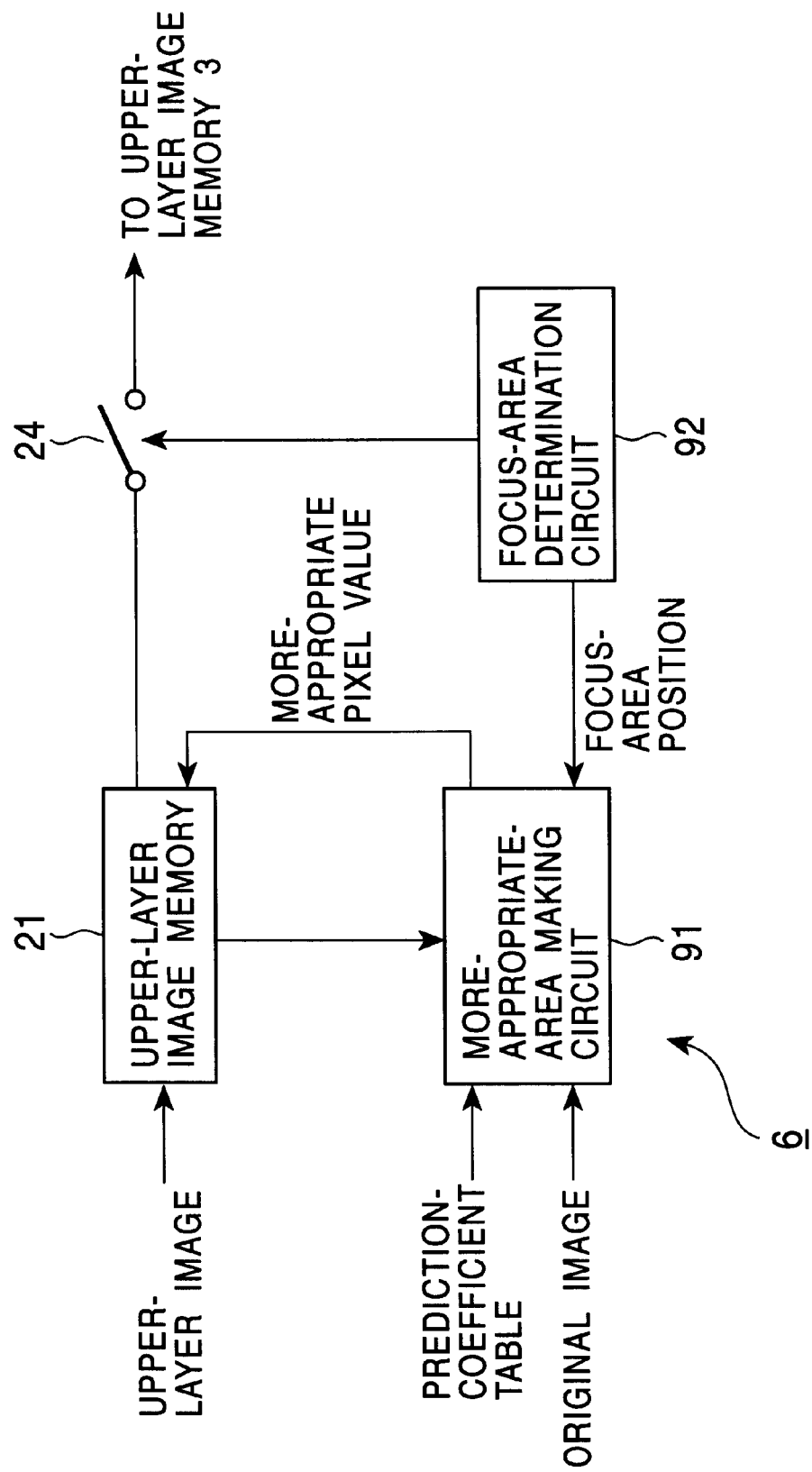
FIG. 22 is a block diagram of a second example structure of the pixel-value update circuit 6 shown in FIG. 1.

A second example structure of the pixel-value update circuit 6 will be described below by referring to FIG. 22. In this example structure, the more-appropriate pixel-value determination circuit 22 and the focus-pixel determination circuit 23 in the first example structure of the pixel-value update circuit 6, shown in FIG. 8, are replaced with a more-appropriate-area making circuit 91 and a focus-area determination circuit 92. Whereas the more-appropriate pixel-value determination circuit 22 makes the pixel value of only a focus pixel more appropriate, the more-appropriate-area making circuit 91 makes the pixel values of a plurality of pixels contained in a focus area more appropriate at the same time.

The focus-area determination circuit 92 sequentially sets areas each having a predetermined size (such as seven-by-seven-pixel areas) in the upper-layer image to focus areas, and output the corresponding position information to the more-appropriate-area making circuit 91. The focus-area determination circuit 92 outputs a control signal to turn on the switch 24 after it has set all pixels in the upper-layer image to focus pixels.

Figure 23:
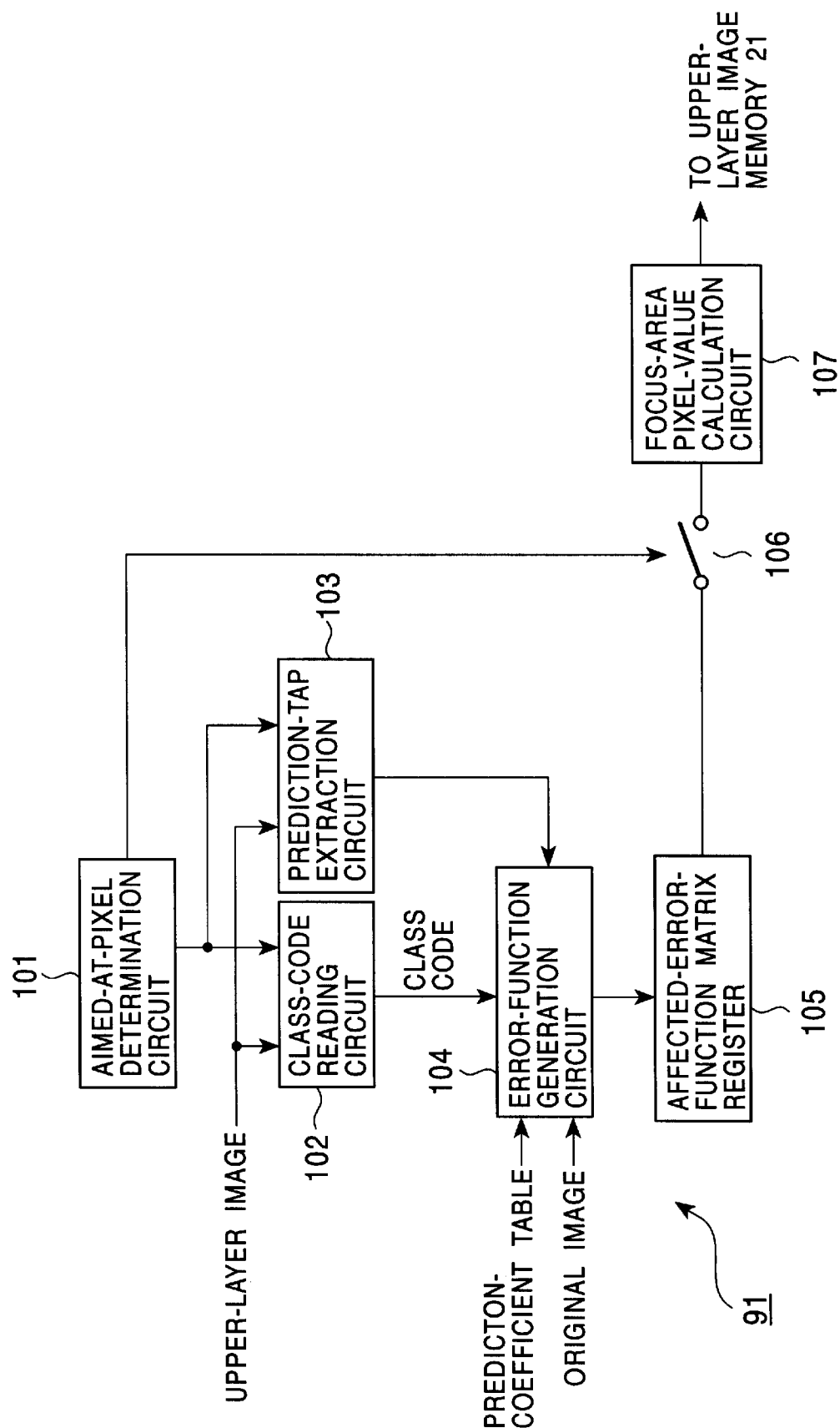
FIG. 23 is a block diagram of an example structure of a more-appropriate-area making circuit 91 shown in FIG. 22.

FIG. 23 shows a detailed example structure of the more-appropriate-area making circuit 91. An aimed-at-pixel determination circuit 101 sequentially assigns pixels in the focus area to aimed-at pixels, and outputs the corresponding position information to a class-code reading circuit 102 and to a prediction-tap extraction circuit 103. The aimed-at-pixel determination circuit 101 also outputs a control signal to turn on a switch 106 when all pixels in the focus area have been assigned to aimed-at pixels.

The class-code reading circuit 102 reads the class code (the lower four bits at the LSB side of the pixel data) of the aimed-at pixel from the upper-layer image memory 3, and outputs it to an error-function generation circuit 104. The prediction-tap extraction circuit 103 extracts prediction taps formed of five by five pixels with the aimed-at pixel disposed at the center, from the upper-layer image memory 3, and outputs them to the error-function generation circuit 104.

The error-function generation circuit 104 generates the error function (its details will be described later) corresponding to the aimed-at pixel, and outputs it to an affected-error-function matrix register 105. The affected-error-function matrix register 105 uses the error functions corresponding to all aimed-at pixels in the focus area to generate an affected-error-function matrix, and outputs it to a focus-area pixel-value calculation circuit 107 through the switch 106.

The focus-area pixel-value calculation circuit 107 solves the affected-error-function matrix input through the switch 106 to obtain the pixel value of a pixel in the focus area (details will be described later).

The operation of the second example structure of the pixel-value update circuit 6 will be described below by referring to a flowchart shown in FIG. 24. In pixel-value update processing, the pixel values of pixels disposed outside the focus area are fixed, and the pixel values of pixels in the focus area are made more appropriate. The pixel-value update processing starts when the upper-layer image input from the selector 5 is stored in the upper-layer image memory 21 in the pixel-value update circuit 6.

In a step S111, the focus-area determination circuit 92 sets a seven-by-seven-pixel area in the upper-layer image to a focus area, and outputs the position information thereof to the more-appropriate-area making circuit 91. The aimed-at-pixel determination circuit 101 of the more-appropriate-area making circuit 91 sets one pixel in the focus area to an aimed-at pixel, and outputs the position information thereof to the class-code reading circuit 102 and to the prediction-tap extraction circuit 103, in a step S112.

In a step S113, the class-code reading circuit 102 reads the class code (the lower four bits at the LSB side of the pixel data) of the aimed-at pixel, and outputs it to the error-function generation circuit 104. The prediction-tap extraction circuit 103 extracts five-by-five-pixel prediction taps having the aimed-at pixel at the center, and outputs them to the error-function generation circuit 104.

In a step S114, the error-function generation circuit 104 generates the error function corresponding to the aimed-at pixel, and outputs it to the affected-error-function matrix register 105.

In a step S115, the aimed-at-pixel determination circuit 101 determines whether all pixels in the focus area have already been set to aimed-at pixels. When it is determined that all the pixels have not yet been set to aimed-at pixels, the procedure returns to the step S112, and the subsequent processes are repeated. It is determined in the step S115 that all the pixels in the focus area have already been set to aimed-at pixels, the procedure proceeds to a step S116.

In the step S116, the aimed-at-pixel determination circuit 101 outputs a control signal to turn on the switch 106. The affected-error-function matrix register 105 generates an affected-error-function matrix from the input error functions corresponding to aimed-at pixels, and outputs it to the focus-area pixel-value calculation circuit 107 through the switch 106.

Figure 25A:
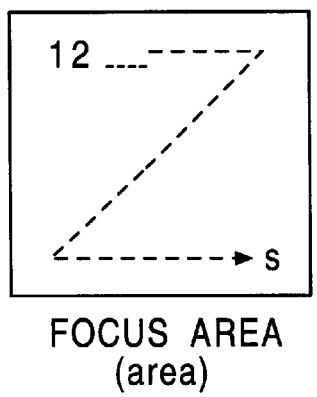
FIGS. 25A to 25C are views used for describing an affected-error-function matrix.
Figure 25B:
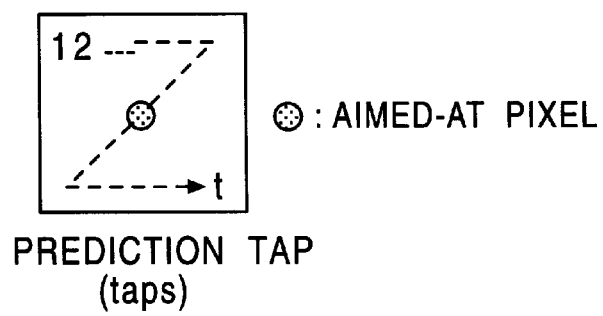
Figure 25C:
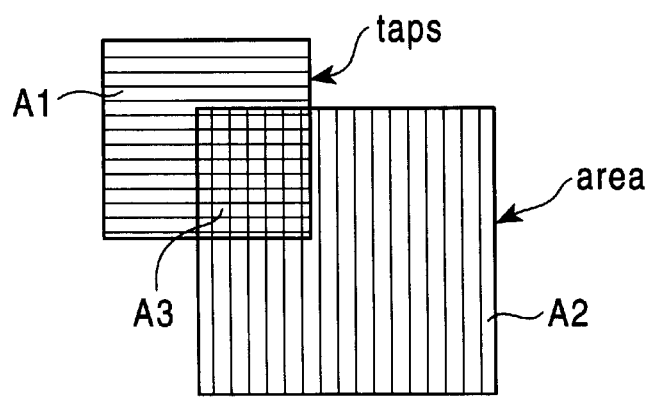

A focus area, a prediction taps, an error function, and an affected-error-function matrix will be described below. The focus area is formed of seven-by-seven, 49, pixels as shown in FIG. 25A. Assuming that a pixel disposed at the upper left corner is called a pixel "1" and a pixel "j" disposed at the j-th position is set to an aimed-at pixel, prediction taps (taps j) for the aimed-at pixel "j" are formed of five-by-five, 25, pixels. Therefore, "s" equals 49 in FIG. 25A, and "t" is equal to 25 in FIG. 25B.

Three types of areas (A1j to A3j) are generated by the focus area (area) and the prediction taps (taps j) for the aimed-at pixel "j". The area A1j is an area which is inside the prediction taps (taps j) but outside the focus area (area), the area A2j is an area which is outside the prediction taps (taps j) but inside the focus area (area), and the area A3j is an area which is inside both prediction taps (taps j) and focus area (area).

The pixel value (predicted value) $y'^j$ in a lower-layer image, corresponding to the aimed-at pixel "j" in the upper-layer image can be expressed by the following expression (5). In the following descriptions, superscripts (such as "j" in $y^j$) indicate numbers in a focus area, and subscripts (such as "t" in $w_t$) indicate numbers in prediction taps.

$$y'^j = w_1^j \cdot x_1^j + w_2^j \cdot x_2^j + \cdots + w_t^j \cdot x_t^j \quad (5)$$

$$= \sum_{p=1}^{t} w_p^j \cdot x_p^j$$

$$= \sum_{h \in A1^j} w_h^j \cdot x_h^j + \sum_{m \in A3^j} w_m^j \cdot x_m^j$$

In the above expression, $x_p^j$ indicates the pixel value of the p-th pixel in the prediction taps (taps j) for the aimed-at pixel "j", and $w_p^j$ indicates a coefficient applied to the coefficient vector $x_p^j$ corresponding to the class code of the aimed-at pixel "j". Since one aimed-at pixel in the upper-layer image actually corresponds to nine pixels in a lower-layer image, the same type of eight expressions as the expression (5) are created.

When the true value (pixel value of the original image) corresponding to the predicted value $y'_j$ is called $y^j$, an error $e^j$ is expressed by the following expression (6).

$$e^j = y^j - y'^j = \left(y^j - \sum_{h \in A1^j} w_h^j \cdot x_h^j\right) - \sum_{m \in A3^j} w_m^j \cdot x_m^j \quad (6)$$

$$= y''^j - \sum_{m \in A3^j} w_m^j \cdot x_m^j = y''^j - \sum_{n=1}^{s} w'^{nj} \cdot x'^{nj}$$

where, $$y''^j = y^j - \sum_{h \in A1^j} w_h^j \cdot x_h^j \quad (7)$$

$$w'^{nj} = \begin{cases} w_n^j \text{ for } n \in A3^j \\ 0 \text{ for } n \in A1^j \cup n \in A2^j \end{cases}$$

$$x'^{nj} = \begin{cases} x_n^j \text{ for } n \in A3^j \\ 0 \text{ for } n \in A1^j \cup n \in A2^j \end{cases}$$

In the foregoing expressions, n' indicates a number in the prediction taps (taps j), converted from the number "n" in the focus area (area). Since the pixel values of pixels disposed in the area A1j are not updated, $y''^j$ is a fixed value. Therefore, to obtain the square error corresponding to the aimed-at pixel, the same type of eight expressions as the expression (6) are formed and they are squared and added to each other. The result is called an error function Ek.

The error functions Ek corresponding to all pixels in the focus area (area) are added to each other to form an affected error function $E_{area}$.

$$E_{area} = \sum_{k=1}^{s} E^k \quad (8)$$

As described above, Ek is the sum of 9 $(e_k)^2$. For simplicity, Ek is set to $(e_k)^2$.

Pixel values $x^1$ to $x^s$ which make the affected error function E,r., minimum will be obtained next by the least squares method, with the pixel value of the pixel corresponding to the number "n" in the focus area (area) being set to $x^i$.

A partial differential coefficient (shown in the following expression (9)) for the pixel value $x^i$ shown in the expression (8) is obtained first, and then the pixel value $x^i$ is determined such that the coefficient becomes zero.

$$\frac{\partial E_{area}}{\partial x^i} = \sum_{k=1}^{s} 2\left(\frac{\partial e^k}{\partial x^i}\right) e^k = \sum_{k=1}^{s} 2 \cdot w'^{ni} \cdot e^k \quad (9)$$

According to the expression (7), $W_{ji}$ and $Y_i$ are defined as shown in the following expression (10).

$$w_{ji} = \sum_{k=1}^{s} w'^{jk} \cdot w'^{ik} \quad (10)$$

$$Y_i = \sum_{k=1}^{s} w'^{ik} \cdot y'^k$$

The following determinant (11) is obtained with the value of the expression (9) being set to zero.

$$\begin{bmatrix} W_{11} & W_{12} & \cdots & W_{1s} \\ W_{12} & W_{22} & \cdots & W_{2s} \\ \vdots & \vdots & \ddots & \vdots \\ W_{s1} & W_{s2} & \cdots & W_{ss} \end{bmatrix} \begin{bmatrix} x^1 \\ x^2 \\ \vdots \\ x^s \end{bmatrix} = \begin{bmatrix} Y_1 \\ Y_2 \\ \vdots \\ Y_s \end{bmatrix} \quad (11)$$

Since $W_{ji}$ and $Y_i$ shown in the expression (10) correspond to each of nine pixels, the determinants (11) are added up to form an affected-error-function matrix.

Figure 24:
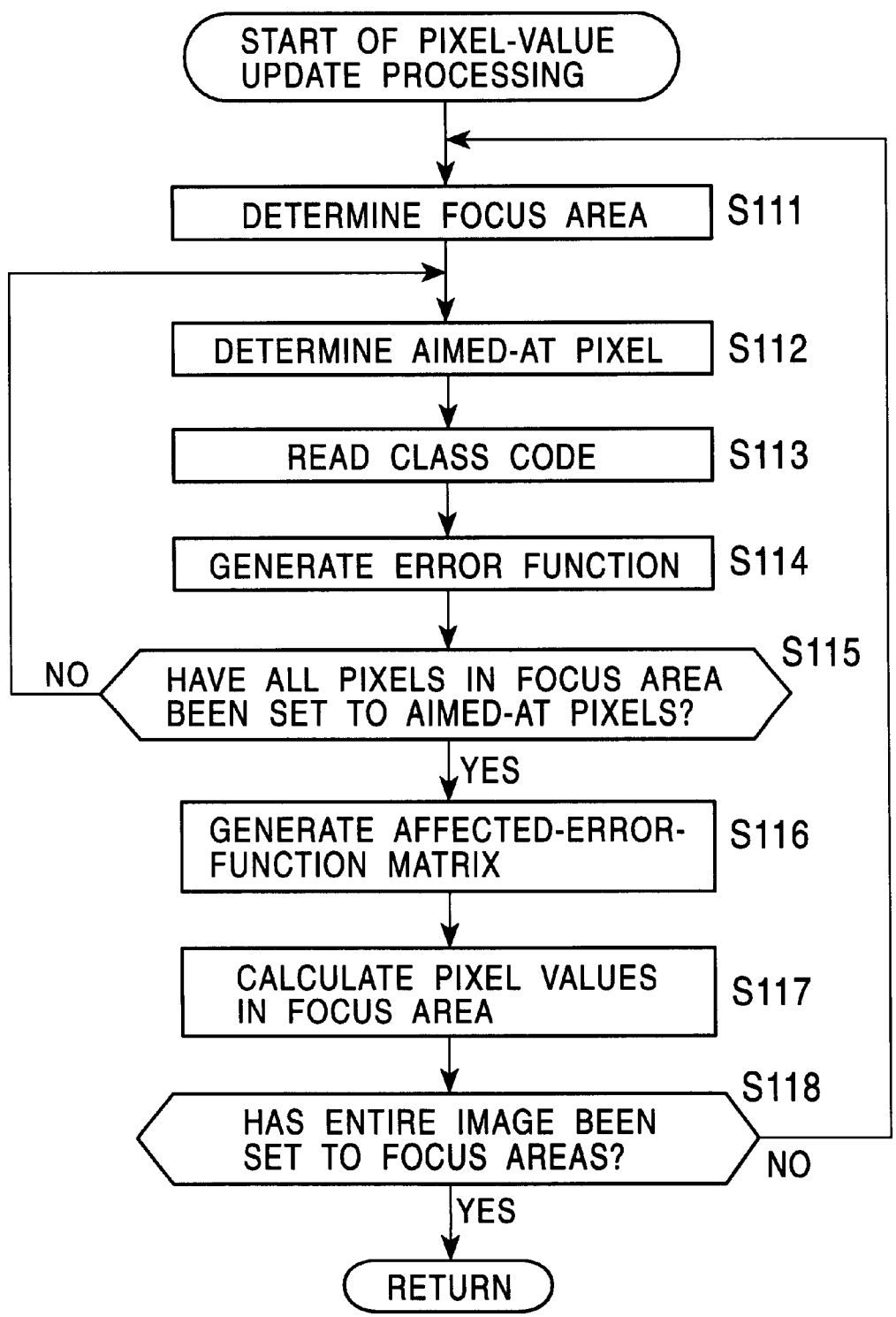
FIG. 24 is a flowchart of the operation of the pixel-value update circuit 6 shown in FIG. 22.

Back to a step S117 shown in FIG. 24, the focus-area pixel-value calculation circuit 107 applies a usual matrix solving method such as a sweeping method to the input affected-error-function matrix to calculate the pixel values $x^1$ to $x^s$, and outputs them to the upper-layer image memory 21. The upper-layer image memory 21 updates the stored values by the use of the input pixel values $x^1$ to $x^s$.

In a step S118, the focus-area determination circuit 92 determines whether all pixels in the upper-layer image have already been included in focus areas. When it is determined that all the pixels have not yet been included in focus areas, the procedure returns to the step S111, and the subsequent processes are repeated.

When it is determined in the step S118 that all the pixels in the upper-layer image have already been included in focus areas, the focus-area determination circuit 92 outputs a control signal to turn on the switch 24. With the switch 24 being turned on, the upper-layer image in which pixel values have been made more appropriate, stored in the upper-layer image memory 21, is output to the upper-layer image memory 3.

As described above, an image having a higher s/n ratio is obtained when processing is executed in units of areas.

Figure 26:
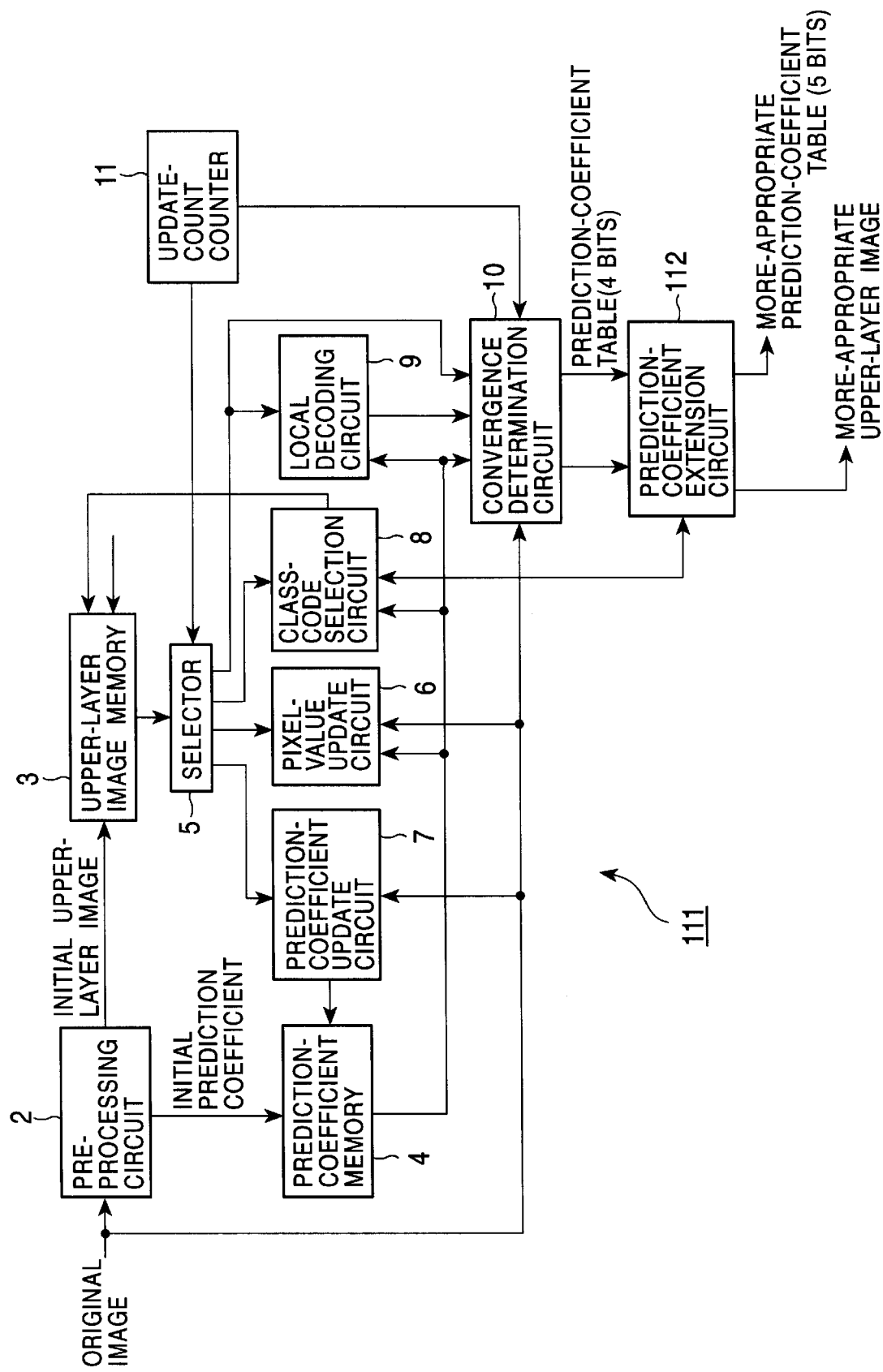
FIG. 26 is a block diagram of a second example structure of the encoder 1 according to the present invention.

FIG. 26 shows a second example structure of the encoder according to the present invention. In this encoder 111, a prediction-coefficient extension circuit 112 is provided at a subsequent stage of the convergence determination circuit 10 in the encoder 1 shown in FIG. 1. The prediction-coefficient extension circuit 112 modifies the prediction-coefficient table corresponding to the four-bit (16-type) class codes, output from the convergence determination circuit 10, to that corresponding to five-bit (32-type) extended class codes.

Figure 27:
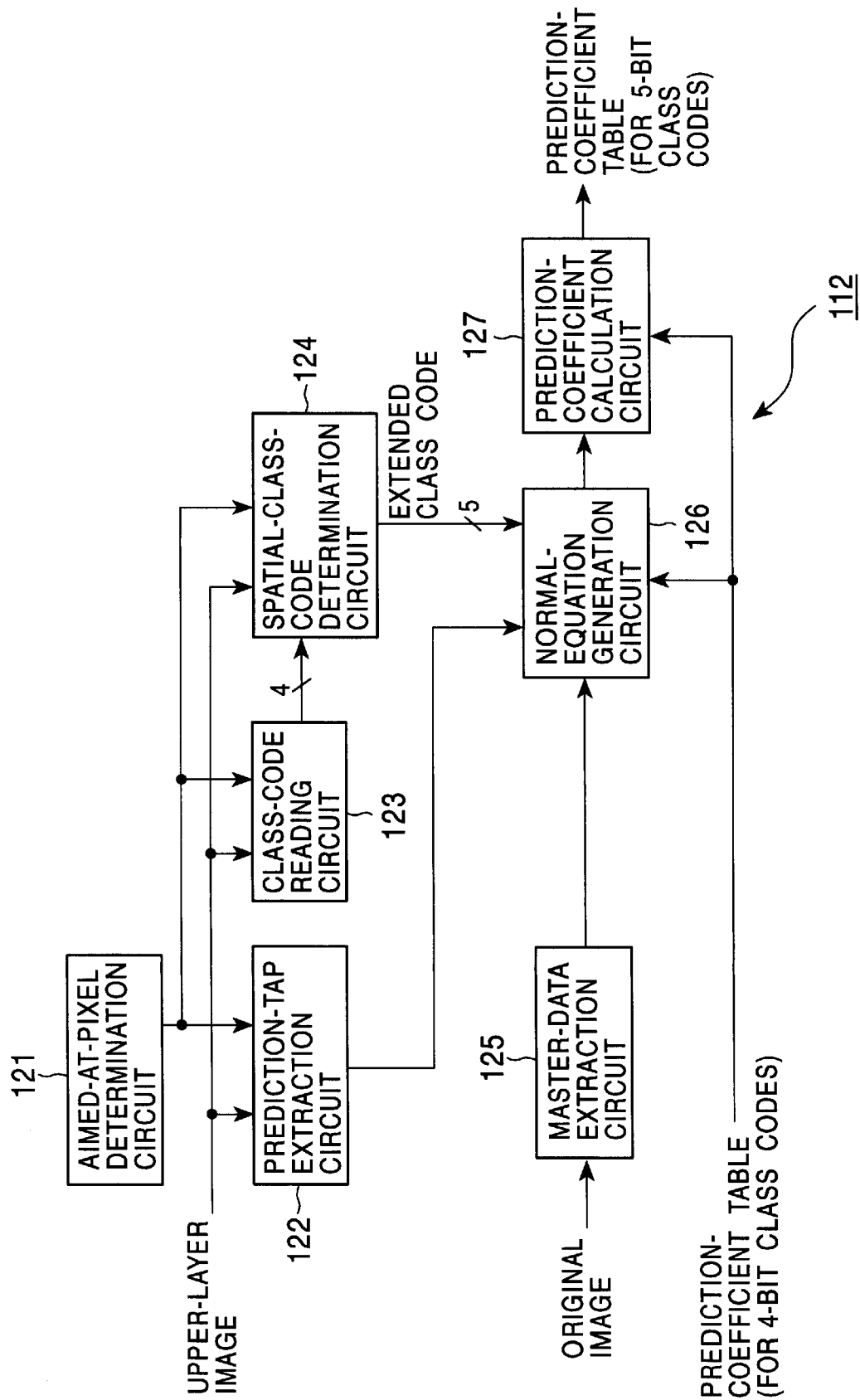
FIG. 27 is a block diagram of an example structure of a prediction-coefficient extension circuit 112 shown in FIG. 26.

A detailed example structure of the prediction-coefficient extension circuit 112 will be described below by referring to FIG. 27. In the prediction-coefficient extension circuit 112, an upper-layer image input from the convergence determination circuit 10 is sent to a prediction-tap extraction circuit 122, to a class-code reading circuit 123, and to a spatial-class-code determination circuit 124. An aimed-at-pixel determination circuit 121 sequentially sets pixels in the upper-layer image to aimed-at pixels, and sends the corresponding position information to the prediction-tap extraction circuit 122, to the class-code reading circuit 123, and to the spatial-class-code determination circuit 124.

The prediction-tap extraction circuit 122 extracts the pixel values (the higher four bits at the MSB side of the pixel data) of five-by-five-pixel prediction taps having an aimed-at pixel at the center, and outputs them to a normal-equation generation circuit 126. The class-code reading circuit 123 reads the class code (the lower four bits at the LSB side of the pixel data) of the aimed-at pixel, and outputs it to the spatial-class-code determination circuit 124.

Figure 28:
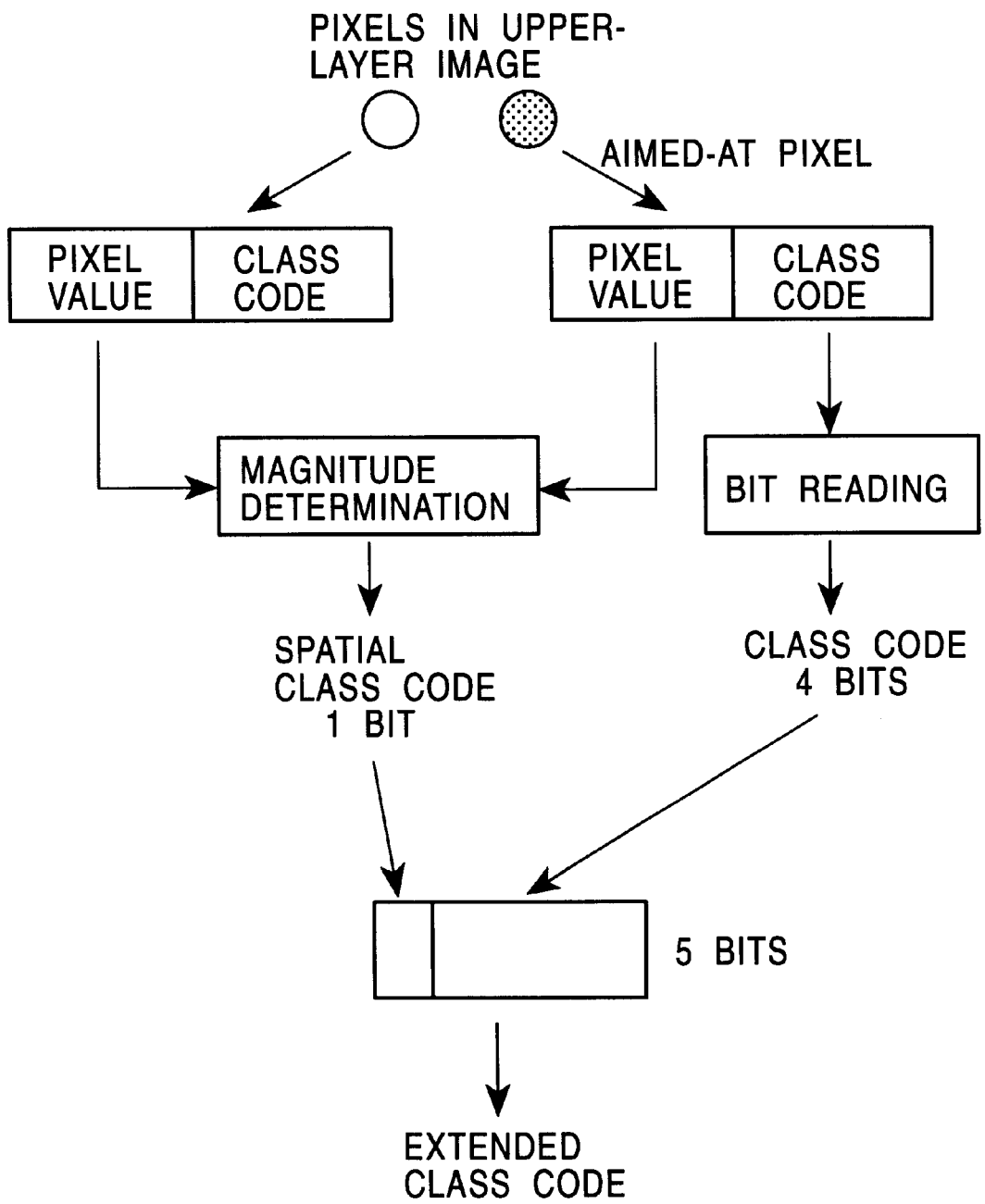
FIG. 28 is a view showing an extended class code.

The spatial-class-code determination circuit 124 determines the spatial class code of the aimed-at pixel. Specifically, as shown in FIG. 28, the pixel value of the aimed-at pixel is compared with that of a pixel in the vicinity thereof (for example, adjacent to the aimed-at pixel on the left). When the pixel value of the aimed-at pixel is larger, the spatial class code (having one bit) is set to zero. When the pixel value of the vicinity pixel is larger, the spatial class code is set to 1. In addition, the spatial-class-code determination circuit 124 adds the spatial class code to the four-bit class code input from the class-code reading circuit 123 at the MSB side to form an extended class code (having five bits), and outputs it to the normal-equation generation circuit 126.

The number of bits in a spatial class code is not limited to one, and may be more than one. A spatial class code may be determined by the one-bit ADRC processing, by a differential value, or by a difference, instead of the above-described method.

A master-data extraction circuit 125 extracts master data (the true pixel values of a lower-layer image generated by the use of prediction taps) from the original image, and outputs to the normal-equation generation circuit 126. The normal-equation generation circuit 126 generates a normal equation formed of the master data and the pixel values of the prediction taps, both of which are known, and prediction coefficients serving as variables, for each extended class code of an aimed-at pixel, and outputs it to a prediction-coefficient calculation circuit 127.

The prediction-coefficient calculation circuit 127 applies the least squares method to the input normal equation to obtain the prediction coefficients corresponding to 32-type (five-bit) extended class codes, and outputs to a subsequent stage. If the normal equation sent from the normal-equation generation circuit 126 cannot be solved due to a small number of samples, the prediction-coefficient calculation circuit 127 outputs the prediction-coefficient table corresponding to the 16-type (four-bit) class codes sent from the prediction-coefficient memory 4.

Figure 29:
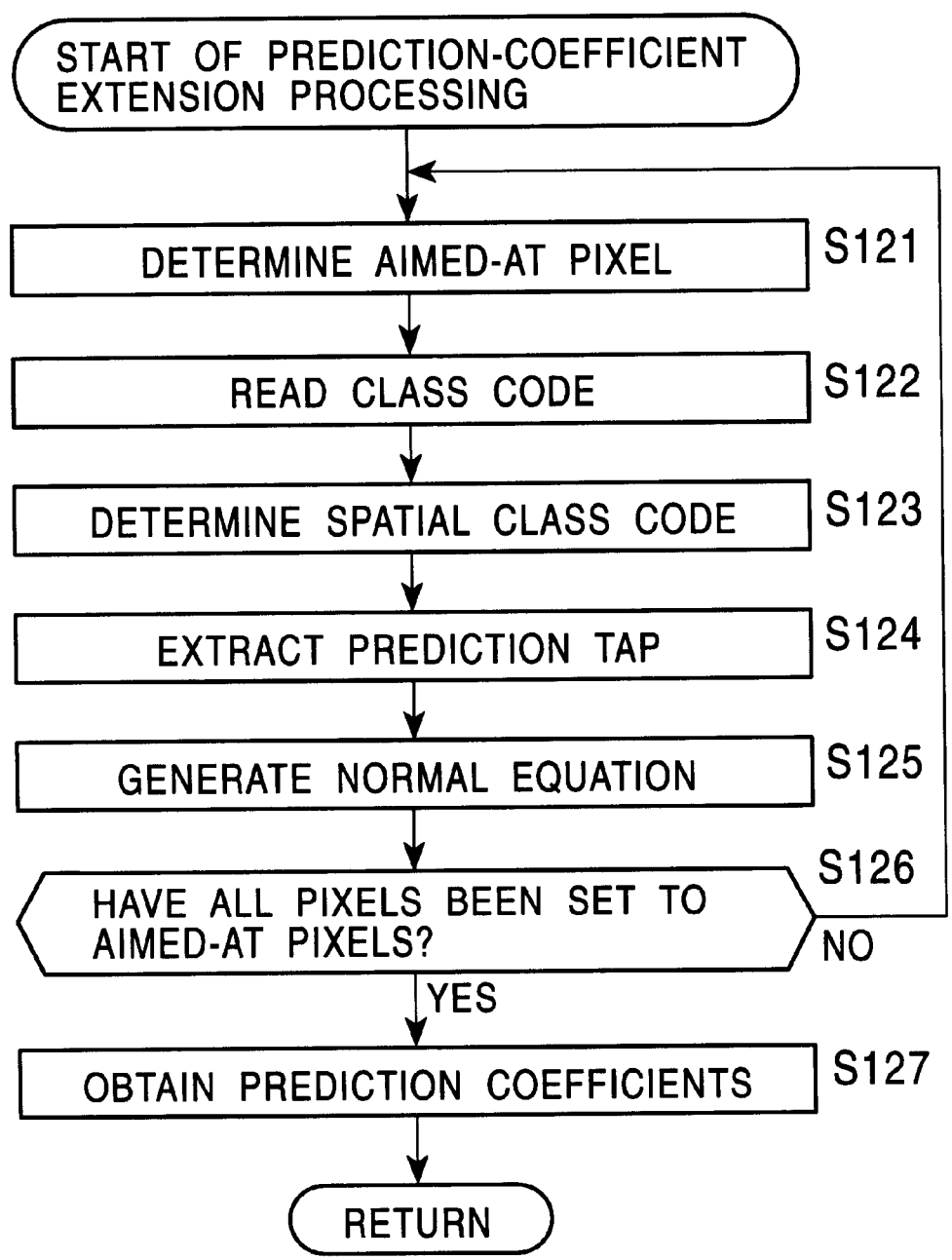
FIG. 29 is a flowchart of the operation of the prediction-coefficient extension circuit 112 shown in FIG. 27.

The operation of the prediction-coefficient extension circuit 112 will be described below by referring to a flowchart shown in FIG. 29. Prediction-coefficient extension processing starts when the convergence determination circuit 10 inputs a more-appropriate upper-layer image.

In a step S121, the aimed-at-pixel determination circuit 121 sets one pixel in the upper-layer image to an aimed-at pixel, and outputs the position information thereof to the prediction-tap extraction circuit 122, to the class-code reading circuit 123, and to the spatial-class-code determination circuit 124.

In a step S122, the class-code reading circuit 123 reads the class code (the lower four bits at the LSB side of the pixel data) of the aimed-at pixel, and outputs it to the spatialclass-code determination circuit 124. In a step S123, the spatial-class-code determination circuit 124 compares the pixel value of the aimed-at pixel with that of a pixel in the vicinity thereof. When the pixel value of the aimed-at pixel is larger, the spatial class code (having one bit) is set to zero. When the pixel value of the vicinity pixel is larger, the spatial class code is set to 1. The spatial-class-code determination circuit 124 also adds the spatial class code to the four-bit class code input from the class-code reading circuit 123 at the MSB side to generate an extended class code (having five bits), and outputs it to the normal-equation generation circuit 126.

In a step S124, the prediction-tap extraction circuit 122 extracts the pixel values (the higher four bits at the MSB side of the pixel data) of the five-by-five-pixel prediction taps having the aimed-at pixel at the center, and outputs them to the normal-equation generation circuit 126.

In a step S125, the normal-equation generation circuit 126 generates a normal equation formed of the master data and the pixel values of the prediction taps, both of which are known, and prediction coefficients serving as variables, for each class code of the aimed-at pixel, and outputs it to the prediction-coefficient calculation circuit 127.

In a step S126, the aimed-at-pixel determination circuit 121 determines whether all pixels in the upper-layer image have been set to aimed-at pixels. When it is determined that all the pixels have not yet been set to aimed-at pixels, the procedure returns to the step S121 and the subsequent processes are repeated. When it is determined in the step S126 that all the pixels have already been set to aimed-at pixels, the procedure proceeds to a step S127.

In the step S127, the prediction-coefficient calculation circuit 127 applies the least squares method to the normal equation generated in the step S125 by the normal-equation generation circuit 126 to obtain the prediction-coefficient sets corresponding to 32-type (five-bit) extended class codes, and outputs the obtained prediction-coefficient sets (prediction-coefficient table) to a subsequent stage.

As described above, the prediction-coefficient extension circuit 112 relates the prediction-coefficient sets to the extended class codes (having five bits), but an extended class code is not written at the lower five bits at the LSB side of the pixel data of the aimed-at pixel.

Since the pixel values (the higher four bits at the MSB side of the pixel data) of the aimed-at pixel do not change, graduation is not lost in a lower-layer image generated from the upper-layer image.

Figure 30:
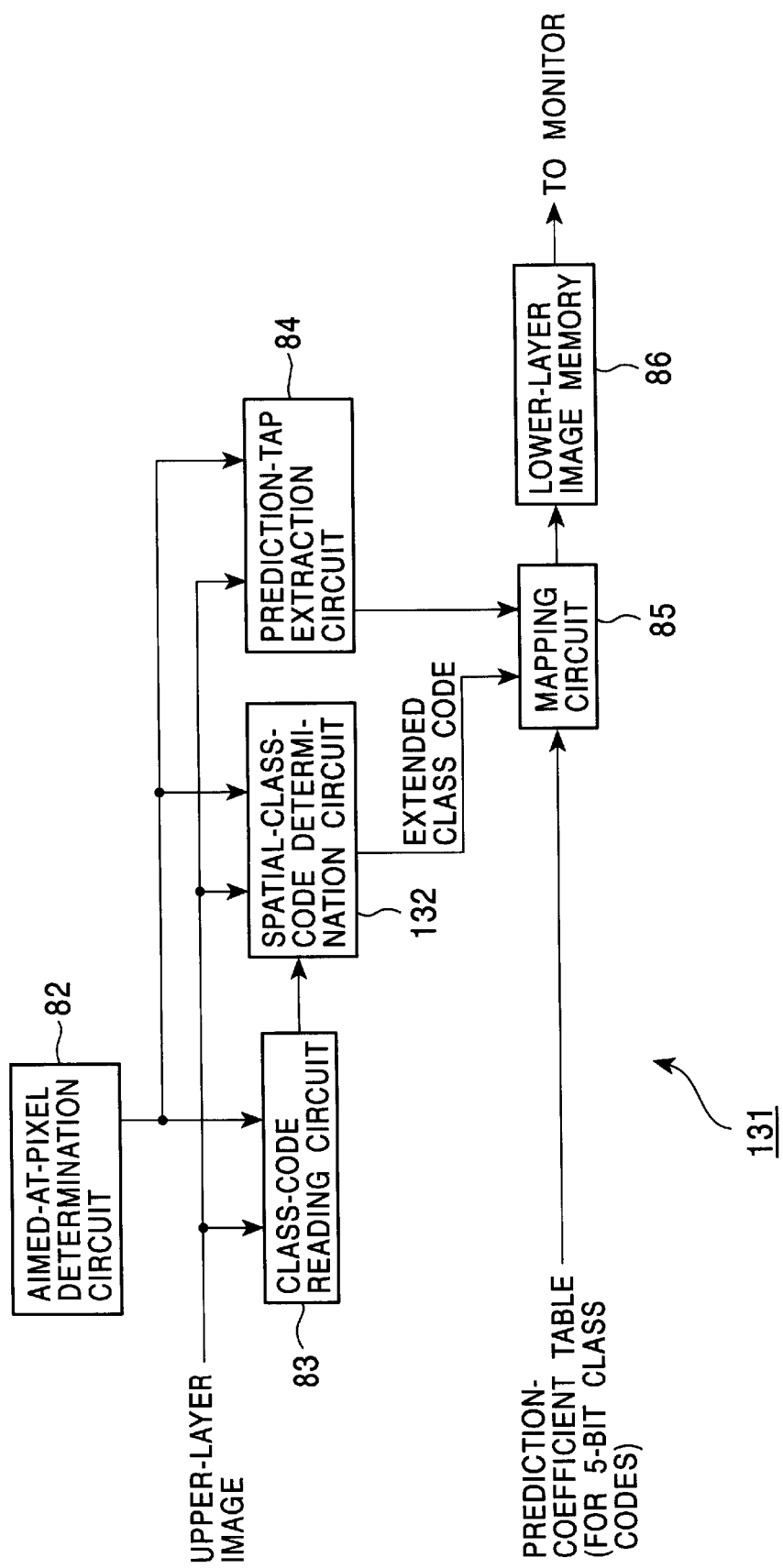
FIG. 30 is a block diagram of an example structure of a decoder 131 corresponding to the encoder 1 shown in FIG. 26.

FIG. 30 shows an example structure of a decoder (for generating a lower-layer image) for recovering the original image from the upper-layer image generated by the encoder 111 shown in FIG. 26.

This decoder 131 is formed by adding a spatial-class-code determination circuit 132 to the decoder 81 shown in FIG. 18. The spatial-class code determination circuit 132 receives an upper-layer image from the encoder 1, the position information of an aimed-at pixel from the aimed-at-pixel determination circuit 82, and a class code (the lower four bits at the LSB side of the pixel data of the aimed-at pixel) from the class-code reading circuit 83.

The spatial class-code determination circuit 132 compares the pixel value of the aimed-at pixel with that of a pixel in the vicinity thereof (in this case, adjacent thereto on the left). When the pixel value of the aimed-at pixel is larger, a spatial class code (having one bit) is set to zero. When the pixel value of the vicinity pixel is larger, the spatial class code is set to 1. The spatial-class-code determination circuit 132 also adds the spatial class code to the four-bit class code input from the class-code reading circuit 83 at the MSB side to generate an extended class code (having five bits), and outputs it to the mapping circuit 85. Since the circuits other than the spatial-class-code determination circuit 132 are the same as those shown in FIG. 18, descriptions thereof will be omitted.

Figure 31:
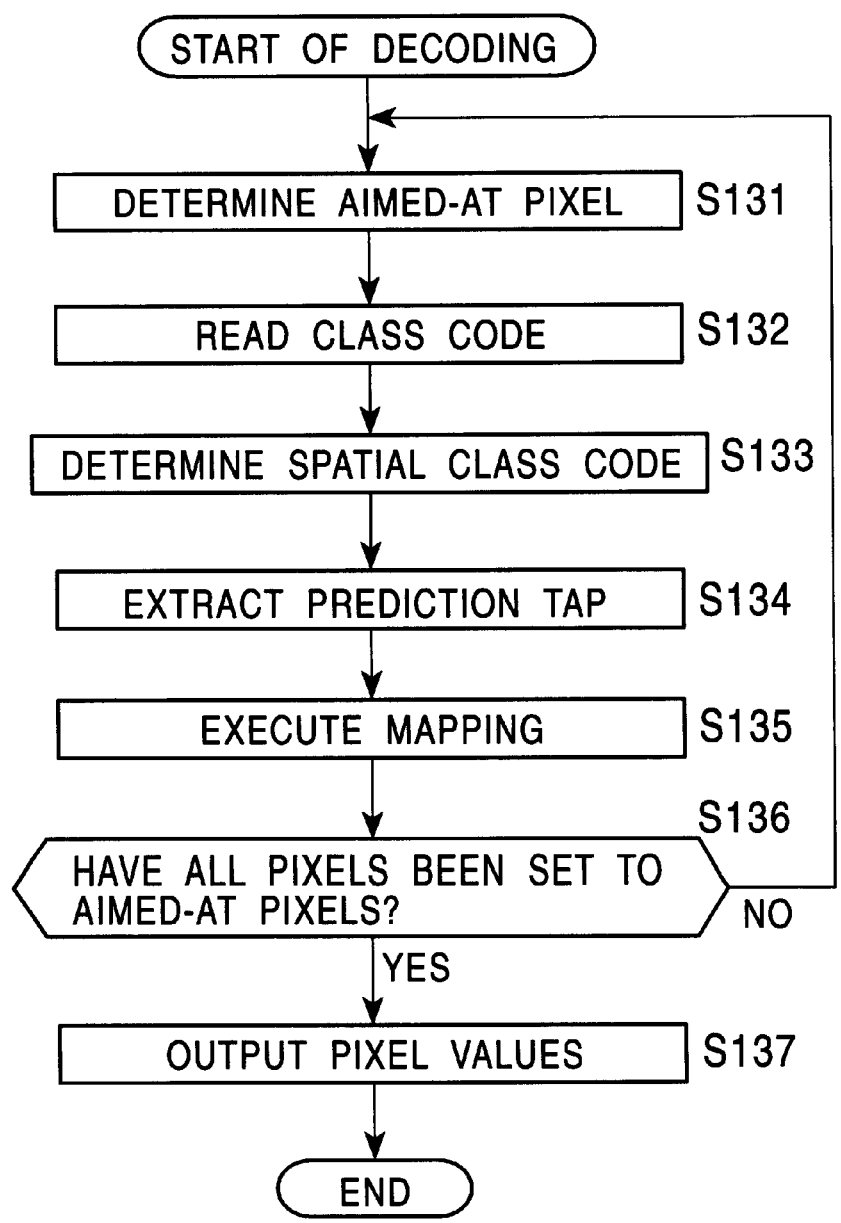
FIG. 31 is a flowchart of the operation of the decoder 131 shown in FIG. 30.

The operation of the decoder 131 will be described below by referring to a flowchart shown in FIG. 31. This decoding processing is, for example, applied to upper-layer images sequentially input in units of frames, after a prediction-coefficient table output from the encoder 111 is sent to the mapping circuit 85.

In a step S131, the aimed-at-pixel determination circuit 82 sets one pixel in the upper-layer image to an aimed-at pixel, and outputs the position information -thereof to the class-code reading circuit 83, to the prediction-tap extraction circuit 84, and to the spatial-class-code determination circuit 132. In a step S132, the class-code reading circuit 83 reads the class code (the lower four bits at the LSB side of the pixel data) of the aimed-at pixel, and outputs it to the spatial-class-code determination circuit 132.

In a step S133, the spatial-class-code determination circuit 132 compares the pixel value of the aimed-at pixel with that of a pixel disposed on the left thereof. When the pixel value of the aimed-at pixel is larger, a spatial class code (having one bit) is set to zero. When the pixel value of the vicinity pixel is larger, the spatial class code is set to 1. The spatial-class-code determination circuit 132 also adds the spatial class code to the four-bit class code input from the class-code reading circuit 83 at the MSB side to generate an extended class code (having five bits), and outputs it to the mapping circuit 85.

In a step S134, the prediction-tap extraction circuit 84 extracts the pixel values (the higher four bits at the MSB side of the pixel data) of five-by-five-pixel prediction taps having the aimed-at pixel at the center, from the input upper-layer image, and outputs them to the mapping circuit 85.

In a step S135, the mapping circuit 85 reads the prediction-coefficient set corresponding to the extended class code input from the spatial-class-code determination circuit 132, from the prediction-coefficient table, calculates a linear combination of each prediction coefficient of the read prediction-coefficient set and the pixel value of each pixel of the prediction taps, and outputs the calculation result to the lower-layer image memory 86 as a pixel value of the lower-layer image.

In a step S136, the aimed-at-pixel determination circuit 82 determines whether all pixels in the upper-layer image have been set to aimed-at pixels. Until it is determined that all the pixels have already been set to aimed-at pixels, the processes from the step S131 to the step S136 are repeated. It is determined in the step S136 that all the pixels have already been set to aimed-at pixels, the pixel values of the lower-layer image are output in units of frames from the lower-layer image memory 86 to a monitor not shown, in a step S137.

Figure 32:
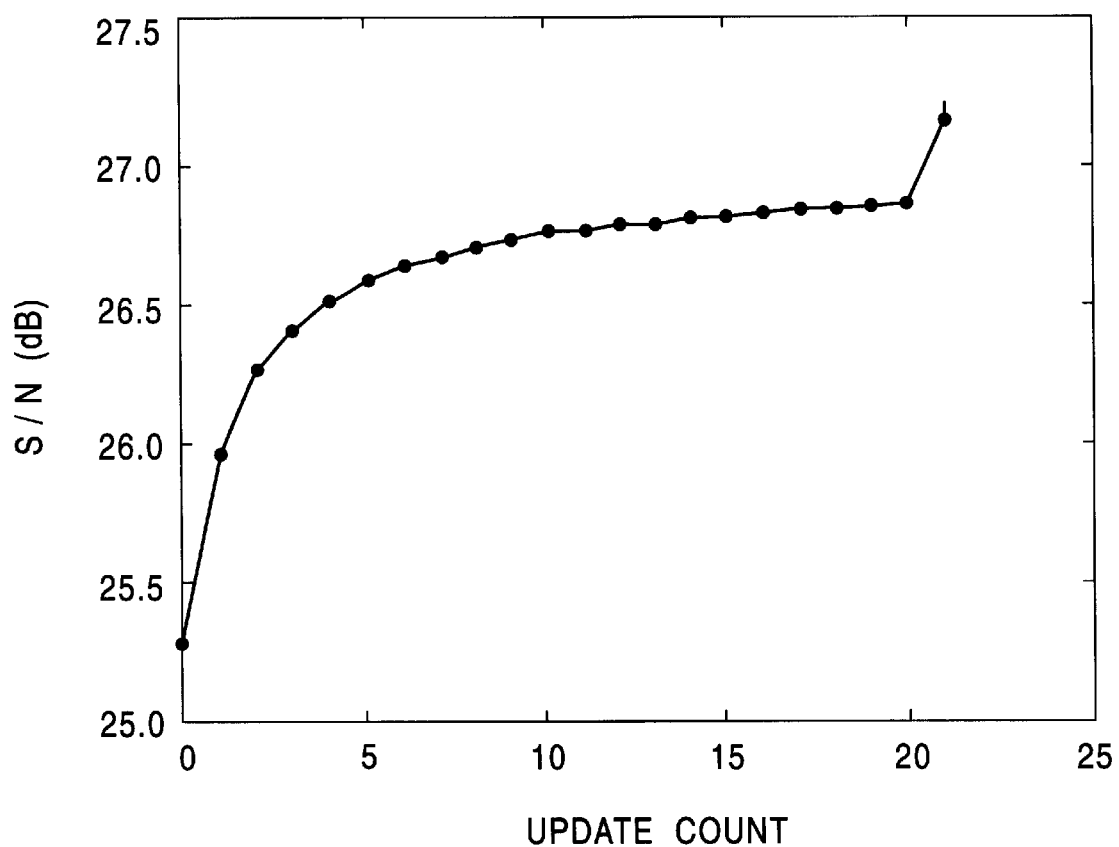
FIG. 32 is a view showing the result of simulation.

FIG. 32 shows the result of simulation in which the s/n ratios of lower-layer images recovered by the decoder 131 shown in FIG. 30 from an upper-layer image generated by the encoder 111 shown in FIG. 26 are calculated. It is clear from the figure that after the s/n ratio has converged (at an update count of 20) by repeatedly updating the class code, the lower four bits at the LSB side, the s/n ratio further increases at an update count of 21 by relating the prediction-coefficient sets to 32-type (five-bit) extended class codes.

In the present embodiment, pixel data has eight bits with the higher four bits at the MSB side being set to a pixel value and the lower four bits at the LSB side being set to a class code. The numbers of bits assigned as above may be changed. It may be possible that MSB-side bits are assigned to a class code and LSB-side bits are assigned to a pixel value. Alternatively, a pixel value and a class code may be stored separately.

The shapes of class taps, prediction taps, and an area where pixel values are updated are not limited to those described above. They can be circular, or discontinuous shapes. Alternatively, they may be symmetrical shapes, or unsymmetrical shapes.

In the present embodiment, the original image is converted to an image which has a lower number of pixels than the original image and from which the original image can be recovered. The present invention can also be applied to a case in which the original image is converted to an image which has the same number of pixels as the original image, which has a lower amount of information (for example, five bits) per one pixel than information (for example, eight bits) per one pixel in the original image, and from which the original image can be recovered.

In this case, an upper-layer image is generated with the use of processing of reducing the number of bits for each pixel, rather than reducing the number of pixels in the original image. For example, an upper-layer image can be set such that it has the same number of pixels as a lower-layer image and each pixel data is five bits long with three bits being assigned to a pixel value and two bits to a class code, rather than eight bits long. The number of bits in the upper-layer image needs to be increased to the same number of bits as in the original image, in local decoding.

In each of the above embodiments, the processing is executed by hardware. It can also be performed by software.

An encoding apparatus for executing the series of processing by software will be described below.

Figure 33:
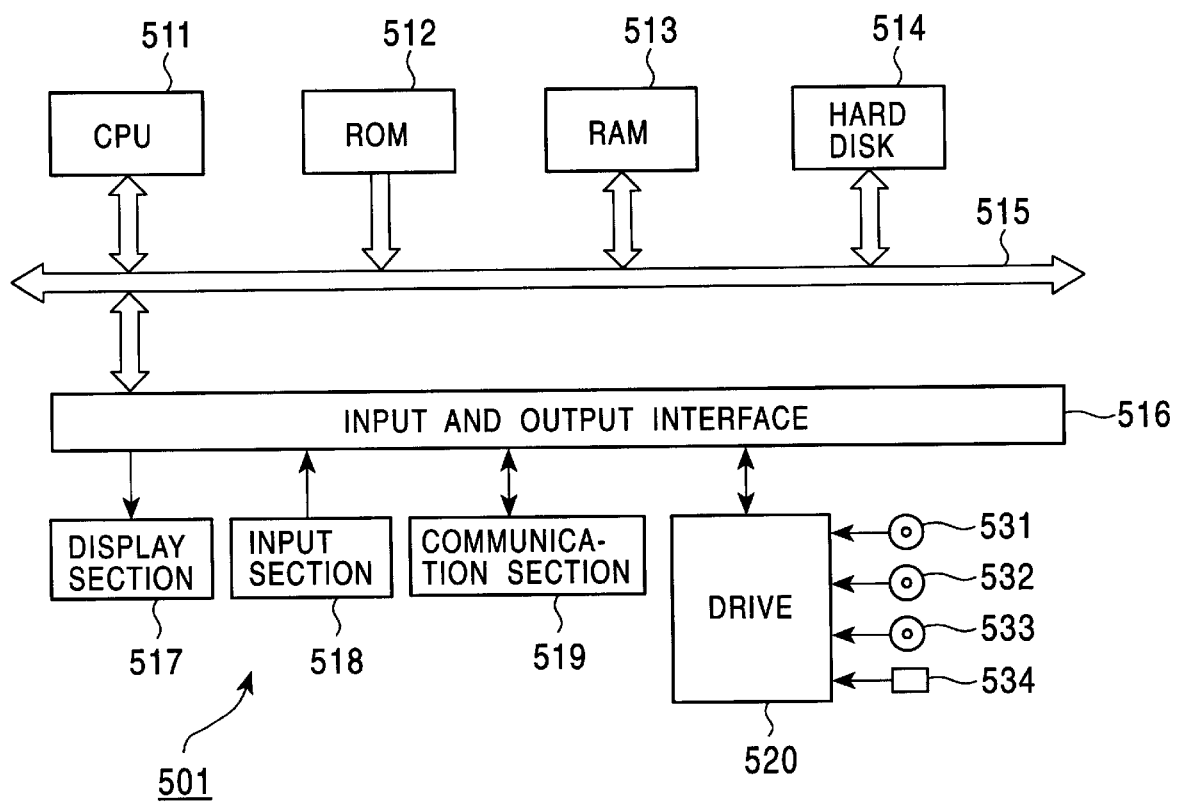
FIG. 33 is a block diagram of an example structure of an information processing apparatus 501.

FIG. 33 is an information processing apparatus formed, for example, of a computer. When a software program which executes the operations shown in each flowchart (for example, shown in FIGS. 2, 3, and 4) used in each of the above embodiments is installed in the information processing apparatus, it serves as an encoding apparatus according to the present invention.

The information processing apparatus shown in FIG. 33 will be described below. In the information processing apparatus, a central processing unit (CPU) 511 is connected to an input and output interface 516 through a bus 515. When the user inputs an instruction on an input section 518 formed of a keyboard and a mouse, the CPU 511 receives it through the input and output interface 516, loads a software program according to the present invention stored in a recording medium, such as a read-only memory (ROM) 512, a hard disk 514, or a magnetic disk 531, an optical disk, a magneto-optical disk 533, or a semiconductor memory 534 mounted to a drive 520, into a random access memory (RAM) 513, and executes it. Then, the CPU 511 outputs the processing result, for example, to a display section 517 formed of a liquid crystal display (LCD) through the input and output interface 516, as required. The program can be stored in the hard disk 514 or the ROM 512 in advance, so that it is provided together with the information processing apparatus 501 as a unit for the user. The program can also be provided as a package medium, such as the magnetic disk 531, the optical disk 532, the magneto-optical disk 533, or the semiconductor memory 534, or can be sent to the hard disk 514 through a communication section 519 from a satellite or a network.

In each of the above embodiments, an image signal is encoded. The present invention is not limited to this case. It can also be applied to an audio signal.

Within the scope of the present invention, various modifications and applications can be considered. Therefore, the scope of the present invention is not limited to the embodiments described above.

What is claimed is:

1. An image-signal conversion apparatus for converting an original-image signal to an output-image signal having a smaller amount of information than the original-image signal, comprising:

intermediate-image-signal generation means for generating an intermediate-image signal having the same amount of information as the output-image signal, from the original-image signal;

intermediate-image storage means for storing the pixel value of each pixel of the intermediate-image signal, the pixel value being linked to each class code;

prediction-coefficient storage means for storing a prediction coefficient linked to each class code;

prediction-coefficient update means for generating, according to the intermediate-image signal, the class code linked to an aimed-at pixel in the intermediate-image signal, and the original-image signal, a more-appropriate prediction coefficient linked to the class code, and for updating the prediction coefficient linked to each class code, stored in said prediction-coefficient storage means;

class-code update means for selecting a more appropriate class code linked to the aimed-at pixel in the intermediate-image signal, according to the intermediate-image signal, the prediction coefficient linked to the class code linked to the pixel value of the aimed-at pixel in the intermediate-image signal, and the original-image signal, and for updating the class code linked to the pixel value of the aimed-at pixel in the intermediate-image signal, stored in said intermediate-image storage means; and determination means for determining the intermediate-image signal as the output-image signal when a predetermined condition is satisfied.

2. An image-signal conversion apparatus according to claim 1, wherein said prediction-coefficient update means and said class-code update means repeatedly update the prediction coefficient and the class code, respectively, until said determination means determines that the predetermined condition is satisfied.

3. An image-signal conversion apparatus according to claim 2, further comprising prediction-image generation means for generating one or a plurality of pixel values for a prediction-image signal having the same amount of information as the original-image signal, according to each pixel value of the intermediate-image signal, stored in said intermediate-image storage means and the prediction coefficient linked to the class code linked to each pixel value, stored in said prediction-coefficient storage means, wherein said determination means uses a condition based on the result of a comparison between the intermediate-image signal and the original-image signal, as the predetermined condition.

4. An image-signal conversion apparatus according to claim 3, wherein said determination means determines that the predetermined condition is satisfied, when an error between the intermediate-image signal and the original-image signal is used as the comparison result, and the comparison result becomes equal to or less than a threshold.

5. An image-signal conversion apparatus according to claim 2, wherein said determination means determines that the predetermined condition is satisfied, when the number of times the prediction coefficient and the class code are updated reaches a threshold.

6. An image-signal conversion apparatus according to claim 2, further comprising initial-prediction-coefficient generation means for generating an initial prediction coefficient, according to the original-image signal and the intermediate-image signal, and for storing it in said prediction-coefficient storage means.

7. An image-signal conversion apparatus according to claim 1, further comprising:
   extended-class-code generation means for generating an extended class code, according to the pixel value of a pixel selected, according to the aimed-at pixel in the intermediate-image signal and the class code updated by said class-code update means; and
   extended-prediction-coefficient generation means for generating an extended prediction coefficient linked to the extended class code.

8. An image-signal conversion apparatus according to claim 1, wherein the output-image signal has a smaller number of pixels than the original-image signal.

9. An image-signal conversion apparatus according to claim 1, wherein said intermediate-image storage means stores pixel data which includes a pixel value and a class code, for each pixel in the intermediate-image signal.

10. An image-signal conversion apparatus according to claim 1, further comprising output means for outputting the output-image signal and a prediction coefficient stored in said prediction-coefficient storage means.

11. An image-signal conversion apparatus according to claim 1, further comprising pixel-value update means for generating a more-appropriate pixel value of a focus pixel in the intermediate-image signal, according to the prediction coefficient linked to the class code linked to an aimed-at pixel selected based on the focus pixel in the intermediate-image signal, at least one aimed-at pixel selected based on the focus pixel in the intermediate-image signal, and the original-image signal, and for updating the pixel value of the focus pixel, stored in the intermediate-image storage means.

12. An image-signal conversion apparatus for converting an original-image signal to an output-image signal having a smaller amount of information than the original-image signal, comprising:
   intermediate-image-signal generation means for generating an intermediate-image signal having the same amount of information as the output-image signal, from the original-image signal;
   intermediate-image storage means for storing information of a class code and a pixel value of each pixel of the intermediate-image signal, the pixel value being linked to each class code;
   prediction-coefficient storage means for storing a prediction coefficient linked to each class code;
   prediction-coefficient update means for generating, according to the intermediate-image signal, a class code linked to an aimed-at pixel in the intermediate-image signal, and the original-image signal, a more-appropriate prediction coefficient linked to each class code, and for updating the prediction coefficient linked to each class code, stored in said prediction-coefficient storage means;
   pixel-value update means for generating a more-appropriate pixel value of a focus pixel in the intermediate-image signal, according to the prediction coefficient linked to the class code linked to an aimed-at pixel selected based on the focus pixel in the intermediate-image signal, at least one aimed-at pixel selected based on the focus pixel in the intermediate-image signal, and the original-image signal, and for updating the pixel value of the focus pixel, stored in the intermediate-image storage means; and
   determination means for determining the intermediate-image signal as the output-image signal when a predetermined condition is satisfied.

13. An image-signal conversion apparatus according to claim 12, wherein said prediction-coefficient update means and said pixel-value update means repeatedly update the prediction coefficient and the pixel value, respectively, until said determination means determines that the predetermined condition is satisfied.

14. An image-signal conversion apparatus according to claim 13, further comprising prediction-image generation means for generating one or a plurality of pixel values for a prediction-image signal having the same amount of information as the original-image signal, according to each pixel value of the intermediate-image signal, stored in said intermediate-image storage means and the prediction coefficient linked to the class code linked to each pixel value, stored in said prediction-coefficient storage means,
   wherein said determination means uses a condition based on the result of a comparison between the intermediate-image signal and the original-image signal, as the predetermined condition.

15. An image-signal conversion apparatus according to claim 14, wherein said determination means determines that the predetermined condition is satisfied, when an error between the intermediate-image signal and the original-image signal is used as the comparison result, and the comparison result becomes equal to or less than a threshold.

16. An image-signal conversion apparatus according to claim 13, wherein said determination means determines that the predetermined condition is satisfied, when the number of times the prediction coefficient and the pixel value are updated reaches a threshold.

17. An image-signal conversion apparatus according to claim 13, further comprising initial-prediction-coefficient generation means for generating an initial prediction coefficient, according to the original-image signal and the intermediate-image signal, and for storing it in said prediction-coefficient storage means.

18. An image-signal conversion apparatus according to claim 12, wherein the output-image signal has a smaller number of pixels than the original-image signal.

19. An image-signal conversion apparatus according to claim 12, further comprising output means for outputting the output-image signal and a prediction coefficient stored in said prediction-coefficient storage means.

20. An image-signal conversion apparatus according to claim 12, wherein said pixel-value update means updates the pixel values of plural pixels in the focus area at the same time.

21. An image-signal conversion method for converting an original-image signal to an output-image signal having a smaller amount of information than the original-image signal, comprising:
   an intermediate-image-signal generation step of generating an intermediate-image signal having the same amount of information as the output-image signal, from the original-image signal;
   an intermediate-image storage step of storing the pixel value of each pixel of the intermediate-image signal, the pixel value being linked to each class code;

a prediction-coefficient storage step of storing a prediction coefficient linked to each class code;

a prediction-coefficient update step of generating, according to the intermediate-image signal, the class code linked to an aimed-at pixel in the intermediate-image signal, and the original-image signal, a more-appropriate prediction coefficient linked to the class code, and of updating the prediction coefficient linked to each class code, stored in said prediction-coefficient storage step;

a class-code update step of selecting a more appropriate class code linked to the aimed-at pixel in the intermediate-image signal, according to the intermediate-image signal, the prediction coefficient linked to the class code linked to the pixel value of the aimed-at pixel in the intermediate-image signal, and the original-image signal, and of updating the class code linked to the pixel value of the aimed-at pixel in the intermediate-image signal, stored in said intermediate-image storage step; and a determination step of determining the intermediate-image signal as the output-image signal when a predetermined condition is satisfied.

22. An image-signal conversion method according to claim 21, wherein said prediction-coefficient update step and said class-code update step are repeatedly executed, until it is determined in said determination step that the predetermined condition is satisfied.

23. An image-signal conversion method according to claim 22, further comprising a prediction-image generation step of generating one or a plurality of pixel values for a prediction-image signal having the same amount of information as the original-image signal, according to each pixel value of the intermediate-image signal, stored in said intermediate-image storage step and the prediction coefficient linked to the class code linked to each pixel value, stored in said prediction-coefficient storage step, wherein a condition based on the result of a comparison between the intermediate-image signal and the original-image signal is used as the predetermined condition in said determination step.

24. An image-signal conversion method according to claim 23, wherein it is determined in said determination step that the predetermined condition is satisfied, when an error between the intermediate-image signal and the original-image signal is used as the comparison result, and the comparison result becomes equal to or less than a threshold.

25. An image-signal conversion method according to claim 22, wherein it is determined in said determination step that the predetermined condition is satisfied, when the number of times the prediction coefficient and the class code are updated reaches a threshold.

26. An image-signal conversion method according to claim 22, further comprising an initial-prediction-coefficient generation step of generating an initial prediction coefficient, according to the original-image signal and the intermediate-image signal, and of storing it in said prediction-coefficient storage step.

27. An image-signal conversion method according to claim 21, wherein the output-image signal has a smaller number of pixels than the original-image signal.

28. An image-signal conversion method according to claim 21, further comprising an output step of outputting the output-image signal and the prediction coefficient.

29. An image-signal conversion method according to claim 21, further comprising a pixel-value update step of generating a more-appropriate pixel value of a focus pixel in the intermediate-image signal, according to the prediction coefficient linked to the class code linked to an aimed-at pixel selected based on the focus pixel in the intermediate-image signal, at least one aimed-at pixel selected based on the focus pixel in the intermediate-image signal, and the original-image signal, and of updating the pixel value of the focus pixel, stored in the intermediate-image storage step.

30. An image-signal conversion method according to claim 29, wherein the pixel values of plural pixels in the focus area are updated at the same time in said pixel-value update step.

31. An image-signal conversion method for converting an original-image signal to an output-image signal having a smaller amount of information than the original-image signal, comprising:

an intermediate-image-signal generation step of generating an intermediate-image signal having the same amount of information as the output-image signal, from the original-image signal;

an intermediate-image storage step of storing information of a class code and a pixel value of each pixel of the intermediate-image signal, the pixel value being linked to each class code;

a prediction-coefficient storage step of storing a prediction coefficient linked to each class code;

a prediction-coefficient update step of generating, according to the intermediate-image signal, the class code linked to an aimed-at pixel in the intermediate-image signal, and the original-image signal, a more-appropriate prediction coefficient linked to the class code, and of updating the prediction coefficient linked to each class code, stored in said prediction-coefficient storage step;

a pixel-value update step of generating a more-appropriate pixel value of a focus pixel in the intermediate-image signal, according to the prediction coefficient linked to the class code linked to an aimed-at pixel selected based on the focus pixel in the intermediate-image signal, at least one aimed-at pixel selected based on the focus pixel in the intermediate-image signal, and the original-image signal, and of updating the pixel value of the focus pixel, stored in the intermediate-image storage step; and a determination step of determining the intermediate-image signal as the output-image signal when a predetermined condition is satisfied.

32. An image-signal conversion method according to claim 31, wherein said prediction-coefficient update step and said pixel-value update step are repeatedly executed, until it is determined in said determination step that the predetermined condition is satisfied.

33. An image-signal conversion method according to claim 32, further comprising a prediction-image generation step of generating one or a plurality of pixel values for a prediction-image signal having the same amount of information as the original-image signal, according to each pixel value of the intermediate-image signal, stored in said intermediate-image storage step and the prediction coefficient linked to the class code linked to each pixel value, stored in said prediction-coefficient storage step, wherein a condition based on the result of a comparison between the intermediate-image signal and the original-image signal is used as the predetermined condition in said determination step.

34. An image-signal conversion method according to claim 33, wherein it is determined in said determination step that the predetermined condition is satisfied, when an error between the intermediate-image signal and the original-image signal is used as the comparison result, and the comparison result becomes equal to or less than a threshold.

35. An image-signal conversion method according to claim 32, wherein it is determined in said determination step that the predetermined condition is satisfied, when the number of times the prediction coefficient and the pixel value are updated reaches a threshold.

36. An image-signal conversion method according to claim 32, further comprising an initial-prediction-coefficient generation step of generating an initial prediction coefficient, according to the original-image signal and the intermediate-image signal, and of storing it in said prediction-coefficient storage step.

37. An image-signal conversion method according to claim 31, further comprising an output step of outputting the output-image signal and the prediction coefficient.

38. A recording medium for storing a computer-controllable program for converting an original-image signal to an output-image signal having a smaller amount of information than the original-image signal, the program comprising:

an intermediate-image-signal generation step of generating an intermediate-image signal having the same amount of information as the output-image signal, from the original-image signal;

an intermediate-image storage step of storing the pixel value of each pixel of the intermediate-image signal, the pixel value being linked to each class code;

a prediction-coefficient storage step of storing a prediction coefficient linked to each class code;

a prediction-coefficient update step of generating, according to the intermediate-image signal, the class code linked to an aimed-at pixel in the intermediate-image signal, and the original-image signal, a more-appropriate prediction coefficient linked to the class code, and of updating the prediction coefficient linked to each class code, stored in said prediction-coefficient storage step;

a class-code update step of selecting a more appropriate class code linked to the aimed-at pixel in the intermediate-image signal, according to the intermediate-image signal, the prediction coefficient linked to the class code linked to the pixel value of the aimed-at pixel in the intermediate-image signal, and the original-image signal, and of updating the class code linked to the pixel value of the aimed-at pixel in the intermediate-image signal, stored in said intermediate-image storage step; and a determination step of determining the intermediate-image signal as the output-image signal when a predetermined condition is satisfied.

39. A recording medium for storing a computer-controllable program for converting an original-image signal to an output-image signal having a smaller amount of information than the original-image signal, the program comprising:

an intermediate-image-signal generation step of generating an intermediate-image signal having the same amount of information as the output-image signal, from the original-image signal;

an intermediate-image storage step of storing information of a class code and a pixel value of each pixel of the intermediate-image signal, the pixel value being linked to each class code;

a prediction-coefficient storage step of storing a prediction coefficient linked to each class code;

a prediction-coefficient update step of generating, according to the intermediate-image signal, the class code linked to an aimed-at pixel in the intermediate-image signal, and the original-image signal, a more-appropriate prediction coefficient linked to the class code, and of updating the prediction coefficient linked to each class code, stored in said prediction-coefficient storage step;

a pixel-value update step of generating a more-appropriate pixel value of a focus pixel in the intermediate-image signal, according to the prediction coefficient linked to the class code linked to an aimed-at pixel selected based on the focus pixel in the intermediate-image signal, at least one aimed-at pixel selected based on the focus pixel in the intermediate-image signal, and the original-image signal, and of updating the pixel value of the focus pixel, stored in the intermediate-image storage step; and a determination step of determining the intermediate-image signal as the output-image signal when a predetermined condition is satisfied.

40. An information-signal conversion apparatus for converting an original-information signal to an output-information signal having a smaller amount of information than the original-information signal, comprising:

intermediate-information-signal generation means for generating an intermediate-information signal having the same amount of information as the output-information signal, from the original-information signal;

intermediate-information storage means for storing the sample value of each sample of the intermediate-information signal, the sample value being linked to each class code;

prediction-coefficient storage means for storing a prediction coefficient linked to each class code;

prediction-coefficient update means for generating, according to the intermediate-information signal, the class code linked to an aimed-at sample in the intermediate-information signal, and the original-information signal, a more-appropriate prediction coefficient linked to the class code, and for updating the prediction coefficient linked to each class code, stored in said prediction-coefficient storage means;

class-code update means for selecting a more appropriate class code linked to the aimed-at sample in the intermediate-information signal, according to the intermediate-information signal, the prediction coefficient linked to the class code linked to the sample value of the aimed-at sample in the intermediate-information signal, and the original-information signal, and for updating the class code linked to the sample value of the aimed-at sample in the intermediate-information signal, stored in said intermediate-information storage means; and determination means for determining the intermediate-information signal as the output-information signal when a predetermined condition is satisfied.

41. An information-signal conversion apparatus for converting an original-information signal to an output-information signal having a smaller amount of information than the original-information signal, comprising:

intermediate-information-signal generation means for generating an intermediate-information signal having the same amount of information as the output-information signal, from the original-information signal;

intermediate-information storage means for storing information of a class code and a sample value of each sample of the intermediate-information signal, the sample value being linked to each class code;

prediction-coefficient storage means for storing a prediction coefficient linked to each class code;

prediction-coefficient update means for generating, according to the intermediate-information signal, the class code linked to an aimed-at sample in the intermediate-information signal, and the original-information signal, a more-appropriate prediction coefficient linked to the class code, and for updating the prediction coefficient linked to each class code, stored in said prediction-coefficient storage means;

sample-value update means for generating a more-appropriate sample value of a focus sample in the intermediate-information signal, according to the prediction coefficient linked to the class code linked to an aimed-at sample selected based on the focus sample in the intermediate-information signal, at least one aimed-at sample selected based on the focus sample in the intermediate-information signal, and the original-information signal, and for updating the sample value of the focus sample, stored in the intermediate-information storage means; and determination means for determining the intermediate-information signal as the output-information signal when a predetermined condition is satisfied.

42. An information-signal conversion method for converting an original-information signal to an output-information signal having a smaller amount of information than the original-information signal, comprising:

an intermediate-information-signal generation step of generating an intermediate-information signal having the same amount of information as the output-information signal, from the original-information signal;

an intermediate-information storage step of storing the sample value of each sample of the intermediate-information signal, the sample value being linked to each class code;

a prediction-coefficient storage step of storing a prediction coefficient linked to each class code;

a prediction-coefficient update step of generating, according to the intermediate-information signal, the class code linked to an aimed-at sample in the intermediate-information signal, and the original-information signal, a more-appropriate prediction coefficient linked to the class code, and of updating the prediction coefficient linked to each class code, stored in said prediction-coefficient storage step;

a class-code update step of selecting a more appropriate class code linked to the aimed-at sample in the intermediate-information signal, according to the intermediate-information signal, the prediction coefficient linked to the class code linked to the sample value of the aimed-at sample in the intermediate-information signal, and the original-information signal, and of updating the class code linked to the sample value of the aimed-at sample in the intermediate-information signal, stored in said intermediate-information storage step; and a determination step of determining the intermediate-information signal as the output-information signal when a predetermined condition is satisfied.

43. An information-signal conversion method for converting an original-information signal to an output-information signal having a smaller amount of information than the original-information signal, comprising:

an intermediate-information-signal generation step of generating an intermediate-information signal having the same amount of information as the output-information signal, from the original-information signal;

an intermediate-information storage step of storing information of a class code and a sample value of each sample of the intermediate-information signal, the sample value being linked to each class code;

a prediction-coefficient storage step of storing a prediction coefficient linked to each class code;

a prediction-coefficient update step of generating, according to the intermediate-information signal, the class code linked to an aimed-at sample in the intermediate-information signal, and the original-information signal, a more-appropriate prediction coefficient linked to the class code, and of updating the prediction coefficient linked to each class code, stored in said prediction-coefficient storage step;

a sample-value update step of generating a more-appropriate sample value of a focus sample in the intermediate-information signal, according to the prediction coefficient linked to the class code linked to an aimed-at sample selected based on the focus sample in the intermediate-information signal, at least one aimed-at sample selected based on the focus sample in the intermediate-information signal, and the original-information signal, and of updating the sample value of the focus sample, stored in the intermediate-information storage step; and a determination step of determining the intermediate-information signal as the output-information signal when a predetermined condition is satisfied.

44. A recording medium for storing a computer-controllable program for converting an original-information signal to an output-information signal having a smaller amount of information than the original-information signal, the program comprising:

an intermediate-information-signal generation step of generating an intermediate-information signal having the same amount of information as the output-information signal, from the original-information signal;

an intermediate-information storage step of storing the sample value of each sample of the intermediate-information signal, the sample value being linked to each class code;

a prediction-coefficient storage step of storing a prediction coefficient linked to each class code;

a prediction-coefficient update step of generating, according to the intermediate-information signal, the class code linked to an aimed-at sample in the intermediate-information signal, and the original-information signal, a more-appropriate prediction coefficient linked to the class code, and of updating the prediction coefficient linked to each class code, stored in said prediction-coefficient storage step;

a class-code update step of selecting a more appropriate class code linked to the aimed-at sample in the intermediate-information signal, according to the intermediate-information signal, the prediction coefficient linked to the class code linked to the sample value of the aimed-at sample in the intermediate-information signal, and the original-information signal, and of updating the class code linked to the sample value of the aimed-at sample in the intermediate-information signal, stored in said intermediate-information storage step; and a determination step of determining the intermediate-information signal as the output-information signal when a predetermined condition is satisfied.

45. A recording medium for storing a computer-controllable program for converting an original-information signal to an output-information signal having a smaller amount of information than the original-information signal, the program comprising:

an intermediate-information-signal generation step of generating an intermediate-information signal having the same amount of information as the output-information signal, from the original-information signal;

an intermediate-information storage step of storing information of a class code and a sample value of each sample of the intermediate-information signal, the sample value being linked to each class code;

a prediction-coefficient storage step of storing a prediction coefficient linked to each class code;

a prediction-coefficient update step of generating, according to the intermediate-information signal, the class code linked to an aimed-at sample in the intermediate-information signal, and the original-information signal, a more-appropriate prediction coefficient linked to the class code, and of updating the prediction coefficient linked to each class code, stored in said prediction-coefficient storage step;

a sample-value update step of generating a more-appropriate sample value of a focus sample in the intermediate-information signal, according to the prediction coefficient linked to the class code linked to an aimed-at sample selected based on the focus sample in the intermediate-information signal, at least one aimed-at sample selected based on the focus sample in the intermediate-information signal, and the original-information signal, and of updating the sample value of the focus sample, stored in the intermediate-information storage step; and a determination step of determining the intermediate-information signal as the output-information signal when a predetermined condition is satisfied.

* * * * *